(12) United States Patent
Qiu

(10) Patent No.: US 11,454,358 B2
(45) Date of Patent: Sep. 27, 2022

(54) WORK LIGHT

(71) Applicant: NINGBO FUTAI ELECTRIC LIMITED, Ningbo (CN)

(72) Inventor: Fujun Qiu, Ningbo (CN)

(73) Assignee: NINGBO FUTAI ELECTRIC LIMITED, Zhejiang (CN)

( * ) Notice: Subject to any disclaimer, the term of this patent is extended or adjusted under 35 U.S.C. 154(b) by 0 days.

(21) Appl. No.: 17/515,370

(22) Filed: Oct. 29, 2021

(65) Prior Publication Data

US 2022/0136663 A1    May 5, 2022

(30) Foreign Application Priority Data

Oct. 29, 2020  (CN) .......................... 202011180763.0
Jul. 15, 2021  (CN) .......................... 202110799526.0

(51) Int. Cl.
| | | |
|---|---|---|
| *F21L 4/02* | (2006.01) | |
| *F21V 21/116* | (2006.01) | |
| *F21V 23/06* | (2006.01) | |
| *F21Y 103/10* | (2016.01) | |

(52) U.S. Cl.
CPC ............... *F21L 4/02* (2013.01); *F21V 21/116* (2013.01); *F21V 23/06* (2013.01); *F21Y 2103/10* (2016.08)

(58) Field of Classification Search
CPC .......... F21L 4/02; F21V 21/116; F21V 23/06; F21Y 2103/10
See application file for complete search history.

(56) References Cited

U.S. PATENT DOCUMENTS

| | | | | | |
|---|---|---|---|---|---|
| 3,601,598 | A * | 8/1971 | Horn | ........................ | F21V 21/26 362/418 |
| 8,152,344 | B2 * | 4/2012 | Gu | .......................... | F21V 21/26 362/427 |
| 8,348,483 | B2 * | 1/2013 | Lin | ......................... | F21L 4/045 362/427 |
| 2011/0051437 | A1 * | 3/2011 | Ng | .......................... | F21V 23/06 362/418 |
| 2013/0170195 | A1 * | 7/2013 | Tang | ....................... | F21V 21/26 362/220 |

\* cited by examiner

*Primary Examiner* — Evan P Dzierzynski
(74) *Attorney, Agent, or Firm* — Raymond Y. Chan; David and Raymond Patent Firm

(57) ABSTRACT

A work light includes at least one power supply unit, and at least one light unit, and at least one connection unit. The power supply unit, the light unit and the connection unit are electrically connected with each other. The light unit is detachably and pivotally coupled to the connection unit. When two or more of the light units are provided, the light units are coupled with each other in series via the connection unit. By changing the number of the light units, an overall length of the work light is selectively adjusted to adjust an illumination range of the work light according to different illumination applications.

25 Claims, 47 Drawing Sheets

WORK LIGHT

CROSS REFERENCE OF RELATED APPLICATION

This is a non-provisional application that claims priority under 35 U.S.C. § 119 to Chinese application number CN 202110799526.0, filed and Jul. 15, 2021, and second Chinese application, application number CN 202011180763.0, filed Oct. 29, 2020, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a light apparatus, and more particularly to a work light and its folding method and self locking method.

Description of Related Arts

Work lights are considered as one of essential illumination tools in daily use. For example, drop lights are commonly used as an indoor illumination tool, spotlights are commonly used in football courts and basketball courts for providing sufficient illumination, surgical lights are commonly used as a surgical lighting tool, and desk lamps are commonly used for work.

It is appreciated that there are different types of work lights and each type of work light is refined for particular function. No matter what type of work light is, work lights become the essential tools in our daily life. It is worth mentioning that in order to fulfill different needs and different applications, it is to the provision of such a work light that the present disclosure is primarily directed.

Existing work lights generally divided into two types, i.e. fixed work lights and portable work lights. The fixed work lights are used for specific illumination areas. For example, a wall lamp fixedly installed on the wall or a chandelier installed on the ceiling, wherein such work lights are generally larger in size and brighter to provide a larger illumination area. However, the major drawback of the fixed work lights is that the fixed work lights are difficult to move from places to places. The portable work lights can solve the problem of the fixed work lights. For example, a flashlight is considered as one of the portable work lights, wherein the flashlight has a smaller size and is easy to carry, wherein a particular area, such as a corner area, can be illuminated by pointing the flashlight thereto. However, due to the small size of the flashlight, the flashlight can only provide a limited illumination area. Therefore, the user must carry and move the flashlight frequently to illuminate different areas. If the size of the flashlight is enlarged to increase illumination area, the mobility of the flashlight will be decreased. In other words, the conventional portable work lights have at least one of the following drawbacks. Firstly, some conventional portable work lights are too bulky to carry and store. Secondly, some conventional portable work lights are too small with limited illumination area, such that the conventional portable work lights must be frequently moved around to illuminate different areas, which is inconvenient to use and operate. Thirdly, the conventional portable work lights are difficult to retain the position during the usage, wherein the conventional portable work lights can only be affixed at a specific position and cannot be adjusted with respect to different working environments. Fourthly, the illumination angle of the conventional portable work light is fixed according to the installation position thereof and is difficult to adjust. Fifthly, the conventional portable work lights must be stored in a proper manner, wherein the conventional portable work lights could be damage when the conventional portable work lights are stored improperly.

With the rapid development of the economy, numbers of vehicles, such as automobiles and electric vehicles, are rapidly increased, such that vehicle owners and vehicle technicians are more concerned to the maintenance and inspection of vehicles. Many components under the hood of the vehicle are needed to be inspected and repaired frequently, and the work light is usually used for illumination during the inspection. However, the conventional fixed work lights cannot meet the above mentioned need because the conventional fixed work lights are difficult to move for illuminate specific areas under the hood and the illumination range of the conventional fixed work lights is too small. It is a hassle for the user to frequently move the work light around to illuminate different areas. If the size of the work light is increased to enlarge the illumination area, the larger work light is difficult to carry and store.

SUMMARY OF THE PRESENT INVENTION

The invention is advantageous in that it provides a work light, which comprises at least one light unit, wherein according to different usages, two or more light units can be selectively assembled to enhance the practical use of the work light.

Another advantage of the invention is to provide a work light, which comprises at least one connection unit detachably coupled to the light unit, wherein the connection unit is configured to electrically connect the light units in series, such that when operating the work light, two or more of the light units can be selected according to the actual need so as to enhance the practical use of the work light.

Another advantage of the invention is to provide a work light, wherein the connection unit is rotatable to switch the light units in different unfolded positions, such that the light units can be operated to generate different illumination ranges at different operation modes according to different actual uses.

Another advantage of the invention is to provide a work light, wherein the connection unit is rotatable such that the light units can be folded to overlap with each other to minimize the size of the work light for easily storage and carriage.

Another advantage of the invention is to provide a work light, which comprises at least one power supply unit for providing electrical energy to the light unit for light generation, wherein when the light units are electrically connected with each other in series via the connection unit, the power supply unit is electrically connected to the light units in series, so as to simplify the structural and electrical configuration of the work light.

Another advantage of the invention is to provide a work light, which comprises a lock unit which is rotatable and stretchable, wherein by rotating and stretching the lock unit, the work light can be hung or fixed on an object, which is more convenient to operate the work light.

Another advantage of the invention is to provide a work light, which comprises a lock unit which is rotatable and stretchable, wherein when the light units are folded to overlap with each other at the folded position, the lock unit is rotated to lock up with the connection unit to retain the work light at the folded position so as to prevent the light units being unfolded, such that the work light at the folded position is safe to be stored and carried.

Additional advantages and features of the invention will become apparent from the description which follows, and may be realized by means of the instrumentalities and combinations particular point out in the appended claims.

According to the present invention, the foregoing and other objects and advantages are attained by a work light, which comprises at least one power supply unit and at least one light unit electrically connected to the power supply unit for light generation.

Furthermore, the work light further comprises at least one connection unit detachably coupled to the light unit, wherein when two or more of the light units, the connection unit is detachably coupled to the light units to connect the light units in series, such that by adding the light units, an overall length of the work light is selectively adjusted for adjusting an illumination range thereof for different actual uses.

Furthermore, the work light further comprises a self lock unit coupled at one end of the light unit to electrically connect the light unit to the connection unit, wherein the light unit is detachably coupled to the connection unit in an electrical connection via the self lock unit.

When the light units are coupled with each other in series via the connection unit, the power supply unit, the light unit and the connection unit are detachably coupled with each other, such that by controlling the power supply unit, the light unit is controlled for light generation to meet the illumination requirements.

In one embodiment, there is one light unit, wherein the light unit is coupled to the power supply unit, such that by controlling the power supply unit, the light unit is controlled for light generation to meet the illumination requirements.

In one embodiment, there are two light units, wherein the light units are coupled with each other in series via the connection unit, such that by controlling the power supply unit, the light units are controlled for light generation to meet the illumination requirements.

In one embodiment, there are three or more light units, wherein every two of the light units are coupled with each other in series via the connection unit at a position that the light units and the connection units are located alternating with each other, such that by controlling the power supply unit, the light units are controlled for light generation to meet the illumination requirements.

In one embodiment, the self lock unit comprises a plug head, a retention body, a holding unit, a resilient element, and two self locking elements, wherein the plug head is detachably inserted into the connection unit, such that when the light unit is locked at the connection units via the self locking elements, the end of the light unit is sleeved in the retention body to couple the plug head at the end of the light unit.

In one embodiment, the self locking element has a front end, a rear end and a protruding end, wherein when the plug head is inserted into the connection unit, the light unit is coupled to the connection unit via the front end of the self locking element, wherein the rear end of the self locking element is coupled to the resilient member, wherein when the front ends of the self locking elements are pressed toward each other at the same time, the plug head is unlocked to be detached from the connection unit, so as to detachably couple the light unit with the connection unit.

In one embodiment, the self locking element has a slanted sliding surface formed at the front end thereof for the self locking element being engaged or disengaged with the through hole so as to facilitate the disassembly operation.

In one embodiment, the connection unit comprises a first rotatable member, a second rotatable member, a stopper member, a resetting element, and a push button, wherein the first rotatable member has a first rotating cavity while the second rotatable member has a second rotating cavity, wherein the first rotatable member and the second rotatable member are coupled side-by-side to engage the first rotating cavity with the second rotating cavity with each other to form a rotating chamber, wherein the first rotatable member further comprises a first rotating shaft while the second rotatable member further comprises a second rotating shaft, wherein the first rotating shaft and the second rotating shaft are located at a center of the connection unit, wherein when the first rotatable member and the second rotatable member are coupled side-by-side, the first rotating shaft and the second rotating shaft are coaxially coupled with each other, wherein the stopper member is movably disposed in the rotating chamber formed by the first rotating cavity and the second rotating cavity, wherein the push button is coupled at an outer side of the first rotatable member at a position adjacent to the stopper member, wherein the resilient element is disposed in the second rotating cavity, wherein via a depression of the push button, the push button is configured to control a position of the stopper element in the rotating chamber to control a rotatable movement of the connection unit.

In one embodiment, the power supply unit comprises a battery, a control circuit, and a control switch, wherein the battery and the control circuit are received in the power supply unit while the control switch is coupled at an outer wall of the power supply unit, wherein the light unit is electrically connected to the battery, the control circuit, and the control switch so as to control the electrical connection of the light unit.

Another advantage of the invention is to provide a work light, wherein the work light is adapted to be unfolded to increase an illumination range of the work light and to be folded to reduce the size of the work light for storage and carriage.

Another advantage of the invention is to provide a work light, which can be pivotally moved, wherein after the work light is mounted at an object, the work light is rotatable to adjust the illumination angle and illumination range, such that the work light can be operated at different working environments.

Another advantage of the invention is to provide a work light, wherein a working length of the work light is selectively adjusted corresponding to a width of the hood to hang the work light at the hood, such that by selectively adjusting the working length of the work light, the work light can be hung at different sizes of hood.

Another advantage of the invention is to provide a work light, which can be moved between a folded position and an unfolded position, wherein at the folded position, the size of the work light is reduced for easily storage and carriage, and at the unfolded position, the work light is powered on for enlarging the illumination range of the work light.

Another advantage of the invention is to provide a work light, which can be directly moved between a locked position and an unlocked position, wherein when the work light is at the locked position, the configuration of the work light is locked to protect the work light and to reduce the size of the work light for easily storage and carriage, and when the work light is at the unlocked position, the length of the work light is extended from its two ends to enlarge the illumination range of the work light.

Another advantage of the invention is to provide a work light, wherein the work light can be folded in a triangular structure to enable the work light being placed on the ground or floor in a stabile manner, such that the work light can serve as a warning light apparatus for generating warning light.

Another advantage of the invention is to provide a work light, wherein the work light can be unfolded to have an elongated flat configuration to generate parallel lights from the light units so as to enlarge the illumination range of the work light and to enhance the stability of the work light.

According to the present invention, the foregoing and other objects and advantages are attained by a work light which comprises:

at least two light units; and at least one connection unit pivotally connecting the light units with each other end-to-end to pivotally move the work light between a folded position and an unfolded position, wherein when the work light is at the folded position, the two light units are pivotally folded to overlap with each other, and when the work light is at the unfolded position, the two light units are pivotally moved to extend from the connection unit at opposite directions.

In one embodiment, the light unit comprises a first light body, a second light body, and a third light unit, wherein the connection unit comprises a first connector and a second connector, wherein the first light body is pivotally coupled to the second light body end-to-end by the first connector, wherein the second light body is pivotally coupled to the third light body end-to-end by the second connector, wherein a pivotal folding direction of the first connector is opposite to a pivotal folding direction of the second connector.

In one embodiment, the light unit comprises a first light body, a second light body, and a third light unit, wherein the connection unit comprises a first connector and a second connector, wherein the first light body is pivotally coupled to the second light body end-to-end by the first connector, wherein the second light body is pivotally coupled to the third light body end-to-end by the second connector, wherein a pivotal folding direction of the first connector is the same as a pivotal folding direction of the second connector.

In one embodiment, the light unit has a light emitting surface and a backlight surface opposite to the light emitting surface, wherein when the work light is moved at the folded position, the light emitting surfaces of the first light body and the second light body face to each other, and the backlight surfaces of the second light body and the third light body face to each other.

In one embodiment, the connection unit has a pivot angle between 0° to 180°.

In one embodiment, the connection unit comprises a first rotatable member, a second rotatable member, and a stopper member, wherein the first rotatable member and the second rotatable member are rotatably coupled with each other to form a stopper member cavity, wherein the stopper member is movably disposed in the stopper member cavity.

In one embodiment, the first rotatable member further comprises a first stopper while the second rotatable member further comprises a second stopper communicating with and corresponding to the first stopper, wherein the first stopper of the first rotatable member and the second stopper of the second rotatable member are coupled with each other to form the stopper member cavity, wherein when the stopper member is located between the first stopper of the first rotatable member and the second stopper of the second rotatable member, the connection unit is in a non-rotatable position, and when the stopper member is moved to the first stopper of the first rotatable member, the stopper member is disengaged with the second stopper of the second rotatable member, so as to allow a rotatable movement between the first rotatable member and the second rotatable member.

In one embodiment, the stopper member comprises a stopper body and at least one tooth groove formed at an outer circumferential surface of the stopper body, wherein the first stopper of the first rotatable member has a plurality of fixed gear positions, wherein the tooth groove of the stopper member is engaged at one of the fixed gear positions of the first rotatable member.

In one embodiment, the connection unit further comprises a resetting element and a push button coupled at the first rotatable member, wherein the stopper member defines a stop position and a rotate position, wherein the push button is coupled at an outer side of the first rotatable member of the first connector, wherein the stopper member is pushed by the push button to move from the stop position to the rotate position, wherein the resetting element is coupled at the second stopper of the second rotatable member at a position between the second rotatable member and the stopper member to push the stopper member from the rotate position to the stop position so as to retain the stopper member at the stop position.

In one embodiment, the first rotatable member comprises a first connecting arm, a first rotating body, and a first rotating shaft, wherein the first rotating shaft and the first connecting arm are coupled at the first rotating body, wherein the first rotating body is coaxially aligned with the first rotating shaft, wherein the second rotatable member comprises a second connecting arm, a second rotating body, and a second rotating shaft, wherein the second rotating shaft and the second connecting arm are coupled at the second rotating body, wherein the second rotating body is coaxially aligned with the second rotating shaft, wherein when the first rotating body of the first rotatable member and the second rotating body of the second first rotatable member are coupled with each other, the first rotating shaft and the second rotating shaft are coaxially aligned with each other and are rotatably coupled with each other so as to allow the rotatable movement between the first rotatable member and the second rotatable member, wherein the first connecting arm and the second connecting arm face toward each other.

In one embodiment, the first rotatable member further has a first convex surface formed on the first rotating body and a first concave surface formed on the first connecting arm, wherein the second rotatable member further has a second convex surface formed on the second rotating body and a second concave surface formed on the second connecting arm, wherein the first connecting arm has a first upper surface and a first lower surface, wherein the second connecting arm has a second upper surface and a second lower surface, wherein the first upper surface of the first connecting arm is extended tangentially to the first convex surface of the first rotatable member, wherein the second upper surface of the second connecting arm is extended tangentially to the second convex surface of the second rotatable member.

In one embodiment, the light unit further comprises an elongated light housing and at least one light source received in the light housing, wherein the light unit further has a front end and an opposed rear end extended from the front end, wherein the connection unit is coupled to one of the front end and the rear end of the light unit.

In one embodiment, the connection unit comprises two connectors coupled at two ends of the light unit respectively, wherein each of the connectors has a locking cavity arranged for engaging with an object to hang the work light thereat.

In one embodiment, the light unit has a retractable chamber, wherein the lock unit comprises a locking body and a retractable arm extended from the locking body, wherein the retractable arm is retractably coupled at the retractable chamber of the light unit.

In one embodiment, the retractable arm comprises a retractable element and a slider coupled at one end of the retractable element, wherein the slider is moved synchronously with the retractable element, wherein the light housing further comprises a sliding rail, wherein the slider of the retractable arm is slidably engaged with the sliding rail.

In one embodiment, the locking body comprises a retainer, a rotating member, and a hooking member extended from the rotating member, wherein the rotating member has a rotating slot, wherein the retainer is disposed at the rotating slot of the rotating member, such that the retainer is adapted to be rotated relative to the rotating member at the rotating slot thereof.

In one embodiment, the work light further comprises at least one handle and a light control, wherein the power supply unit is disposed in the handle to electrically connect to the light unit, wherein the light control is electrically connected to the power supply unit and the light unit to control an operation of the light unit.

In accordance with another aspect of the invention, the present invention comprises a work light, which comprises:

at least two light units;

at least one connection unit pivotally connecting the light units with each other end-to-end, wherein when pivoting the connection unit, the light units are pivotally moved to overlap with each other; and at least one lock unit coupled at one end of the light unit, wherein the lock unit, having a locking cavity, is rotatable to selectively adjust an orientation and position of the locking cavity of the lock unit, wherein when the light units are overlapped with each other, the lock unit is pivoted to receive the connection unit at the locking cavity so as to lock up the light units.

In one embodiment, the light unit comprises a first light body, a second light body and a third light body, wherein the connection unit comprises a first connector and a second connector, wherein the first light body and the second light body are pivotally coupled with each other end-to-end via the first connector, wherein the second light body and the third light body are pivotally coupled with each other end-to-end via the second connector, wherein two of the lock units are provided that one of the lock units is coupled at one end of the first light body while another lock unit is coupled at the third light body, wherein the two lock units are pivoted to receive the first connector and the second connector in the locking cavities of the lock units respectively to lock up the light unit.

In one embodiment, the light unit comprises a first light body and a second light body, wherein the first light body and the second light body are pivotally coupled with each other end-to-end via the connection unit, wherein the lock unit comprises a first lock unit and a second lock unit, wherein the first lock unit is rotatably coupled at the first light body while the second lock unit is rotatably coupled at the second light body, wherein the first lock unit is rotated to receive the second lock unit at the locking cavity of the first lock unit to lock up the light units or the second lock unit is rotated to receive the first lock unit at the locking cavity of the second lock unit to lock up the light units.

In one embodiment, the lock unit comprises a locking body and a retractable arm coupled at the light unit, wherein the locking body is rotatably coupled at one end of the retractable arm to enable the lock unit being rotatably moved between a locked position and an unlocked position, wherein when the light units are folded to overlap with each other, the lock unit is rotate at the locked position that an opening of the locking cavity is moved to face to the connection unit.

In one embodiment, the locking body comprises a retainer, a rotating member, and a hooking member extended from the rotating member, wherein the retainer is coupled at the retractable arm, wherein the rotating member is rotatably coupled at the retainer, wherein the locking space of the lock unit is defined at the hooking member.

In one embodiment, the retainer further comprises a first retaining member and a second retaining member, wherein the first retaining member and the second retaining member are coupled at one end of the retractable arm, wherein the rotating member has a rotating slot, wherein the retainer is disposed at the rotating slot of the rotating member, such that the retainer is adapted to be rotated relative to the rotating member at the rotating slot thereof.

In one embodiment, the retainer further comprises an elastic element and at least one limiting element, wherein the retainer further comprises at least one spring groove, wherein the elastic element and the limiting element are engaged with the spring groove, wherein the rotating member further has a plurality of gear slots communicating with the spring groove, wherein the limiting element is pushed by the elastic element to engage with the gear slots, so as to limit a relative movement between the retainer and the rotating member by the limiting element to retain a relative rotation angle between the retainer and the rotating member.

In one embodiment, the retractable arm is retractably coupled at the light unit, wherein the retractable arm comprises a retractable element and a slider coupled at one end of the retractable element to restrict a displacement of the retractable element and to retain a retractable movement of the retractable element.

In one embodiment, the light unit comprises an elongated light housing and at least one light source received in the light housing, wherein the light unit further comprises a partition wall coupled in the light housing to form a retractable chamber between the partition wall and the light housing, wherein the retractable element of the retractable arm is slidably coupled at the retractable chamber of the light unit.

In one embodiment, the light housing further comprises a sliding rail inwardly protruded from an inner wall of the retractable chamber of the light unit, wherein the slider has a sliding slot communicating with the sliding rail of the light housing.

In one embodiment, the lock unit further comprises at least one traction unit retractably coupled at the retractable element of the lock unit and the light housing of the light unit, wherein the traction unit is adapted to be pulled to an extended position.

In one embodiment, the connection unit comprises a first rotatable member, a second rotatable member, and a stopper member, wherein the first rotatable member and the second rotatable member are rotatably coupled with each other, wherein the first rotatable member is coupled to the second rotatable member to form a stopper member cavity, wherein the stopper member is movably disposed at the stopper member cavity of the connection unit.

In one embodiment, the first rotatable member further comprises a first stopper while the second rotatable member further comprises a second stopper corresponding to and communicating with the first stopper, wherein the first stopper of the first rotatable member and the second stopper of the second rotatable member are coupled with each other to form the stopper member cavity, wherein when the stopper member is located between the first stopper of the first rotatable member and the second stopper of the second rotatable member, the connection unit is in a non-rotatable position, wherein when the stopper member is moved to the second stopper of the second rotatable member, the stopper member is disengaged with the first stopper of the first rotatable member, such that the first rotatable member and the second rotatable member are adapted to be rotated with each other.

In one embodiment, the stopper member comprises a stopper body and at least one tooth groove formed at an outer circumferential surface of the stopper body, wherein the first stopper of the first rotatable member has a plurality of fixed gear positions, wherein the tooth groove of the stopper member is engaged at one of the fixed gear positions of the first rotatable member.

In accordance with another aspect of the invention, the present invention comprises a folding method of a work light, which comprises the steps of:

unlocking the first connector and the second connector of the connection unit, such that the first connector and the second connector are moved from the locked position to the unlocked position; and with respect to the second light body of the light unit, rotating the first connector and the second connector at opposite directions to pivotally move the first light body and the third light body toward the second light body A10$b$, wherein the light-emitting surfaces of the first light body and the second light body face toward each other while the backlight surfaces of the first light body A10$a$ and the second light body A10$b$ face opposite with each other.

In one embodiment, the folding method further comprises a step of: locking the first connector and the second connector of the connection unit, wherein the first connector and the second connector are moved from the unlocked position to the locked position, such that the work light is locked at the folded position.

In accordance with another aspect of the invention, the present invention comprises a self locking method of a work light, which comprises the steps of:

folding the work light at the folded position; and rotating the lock unit to receive the connection unit at the locking cavity of the lock unit, such that the connection unit is locked up by the lock unit.

In one embodiment, the self locking method further comprises the steps of: pulling the locking body of the lock unit outwardly, and rotating the locking body when it is pulled, such that the hooking opening of the locking body is adjusted corresponding to the connection unit.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
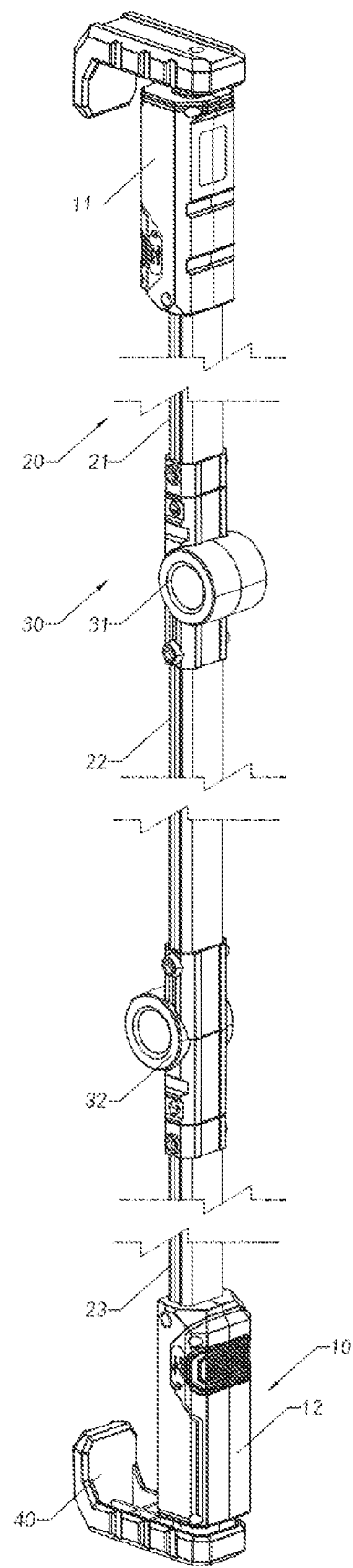
FIG. 1 is a perspective view of a work light in an unfolded position according to a preferred embodiment of the present invention.
Figure 2:
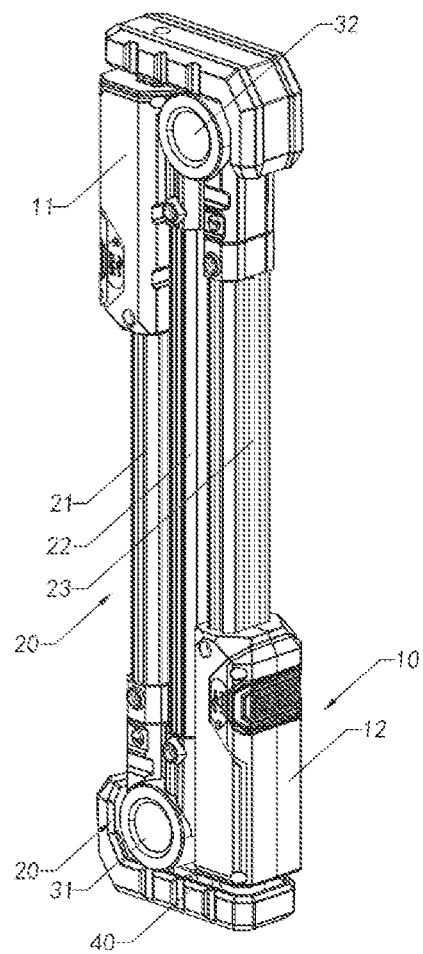
FIG. 2 is a perspective view of the work light in a folded position according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", vertical", "horizontal", "top", "bottom", "interior" and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Even though the terms, such as "first", "second", etc, are used to describe various components, these terms may refer to different components in another embodiment. For example, the first component may refer to as the second component, and similarly, the second component may also refer to as the first component without departing from the teaching of the concept of the present invention. The term "and/or" as used herein includes any or all combinations of one or more of the associated listed items.

The term used herein is only used for the purpose of describing various embodiments and is not intended to be limiting. The singular form is intended to also include the plural form unless the context clearly indicates an exception. In addition, it is appreciated that the terms "comprising" and/or "having" in the following description include the described features, numbers, steps, operations, components, elements or combinations thereof and should not exclude additional features, numbers, steps, operations, components, elements or combinations thereof.

Accordingly, a work light of the present invention will be described in detail with reference to accompanying drawings 1 to 11C of the specification of the present invention.

The present invention provides a work light as a foldable and detachable work light. The work light comprises a power supply unit 10 and at least one light unit 20 electrically connected to the power supply unit 10, wherein the power supply unit 10 is configured to supply electrical energy to the light unit 20, such that the light unit 20 is electrified for generating light. As an illumination device, the work light of the present invention is not only easy to carry, easy to store, and easy to use, but also is not limited to any environment.

Furthermore, the work light further comprises at least one connection unit 30 detachably coupled to the light unit 20, wherein the connection unit 30 is configured to connect two light units 20 in series when two light units 20 are provided. In other words, by adding the light units 20, the overall length of the work light of the present invention will be prolonged, such that the illumination area of the work light will be adjusted according to different requirements or different usages.

According to the present invention, the number of the light unit 20 can be one, two or more. Those skilled in the art should understand that the number of the light unit 20 and the connection unit 30 should not be limited.

For example, when one light unit 20 is provided, the light unit 20 can be directly coupled to the power supply unit 10. By operating the power supply unit 10, the light unit 20 is controlled to generate light for illumination. When two light units 20 are provided, the connection unit 30 is configured to electrically connect the two light units 20 with each other in series, such that the connection unit 30 is located between the two light units 20. One of the light units 20 is coupled to the power supply unit 10, such that by operating the power supply unit 10, the light units 20 are controlled to generate light for illumination. When three or more light units 20 are provided, a plurality of connection units 30 are configured to electrically connect the light units 20 with each other in series, i.e. the light units 20 are connected end-to-end, wherein each of the connection units 30 is located between every two light units 20, such that the light units 20 and the connection units 30 are positioned alternating with each other. By operating the power supply unit 10, the light units 20 are controlled to generate light for illumination.

Accordingly, depending on the area needed to be illuminated, different numbers of light units 20 can be selectively changed. For example, when a relative smaller area needed to be illuminated, the work light can be configured to have one light unit 20. When a relative larger area needed to be illuminated, the work light can be configured to have two or more light units 20.

It is worth mentioning that when the light units 20 are connected in series by the connection units 30, the power supply unit 10, the light units 20 and the connection units 30 are electrically connected with each other, such that by operating the power supply unit 10, the light units 20 are controlled to generate light for illumination.

Furthermore, the work light further comprises a lock unit 40 coupled at one end of the power supply unit, wherein the lock unit 40 is configured to have a hook shape adapted to be rotated, extended, and stretched for engaging with an object so as to hang or fix the work light on the object.

Figure 3:
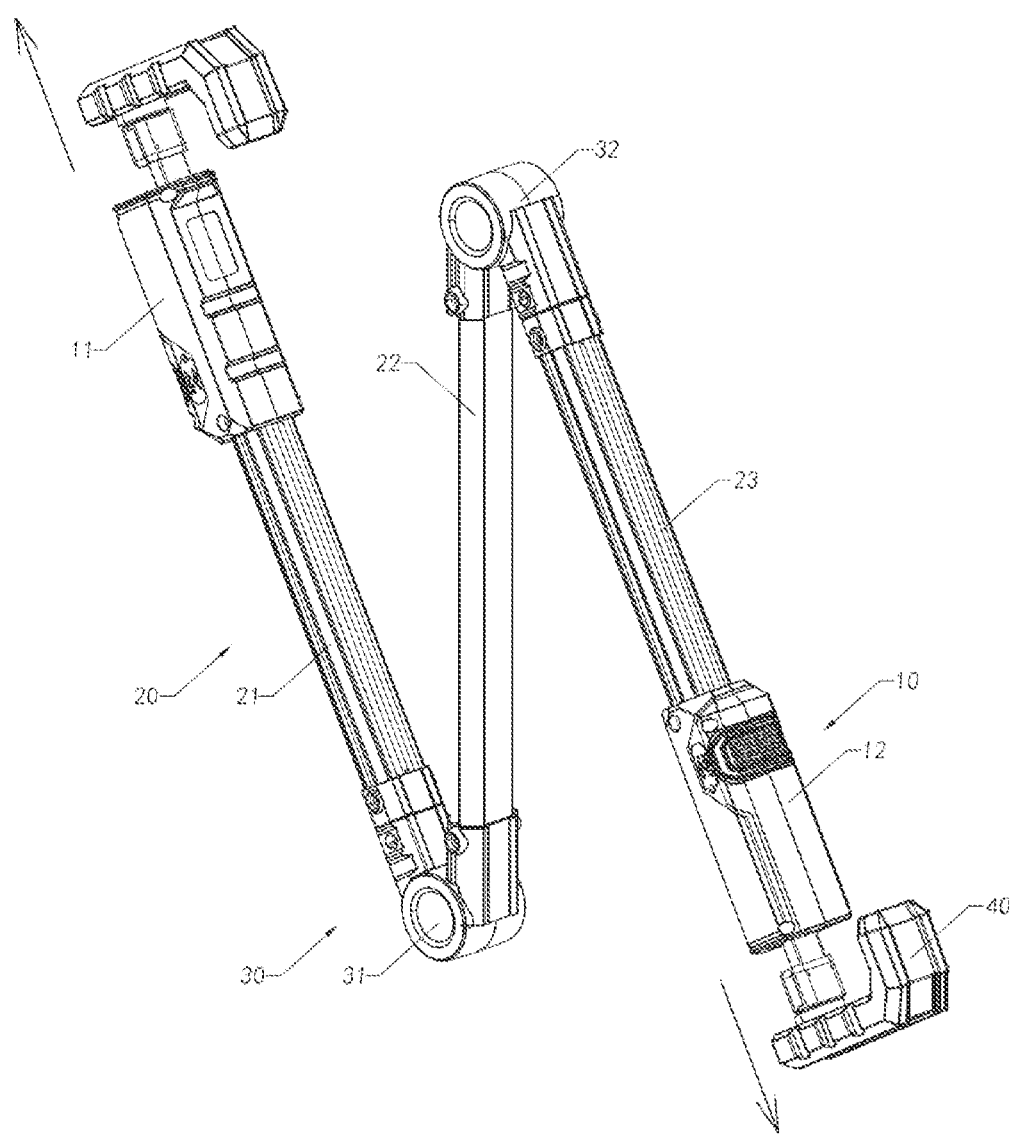
FIG. 3 illustrates an unfolding operation of the work light according to the above preferred embodiment of the present invention.

FIGS. 2 to 10C of the drawings illustrate the preferred embodiment of the present invention. As shown in FIG. 3, the work light is constructed to have two power supply units 10, three light units 20, and two connection units 30. The two power supply units 10 are located at two ends of the work light respectively, wherein the light units 20 and the connection units 30 are arranged alternating with each other to form an elongated light configuration having three light emitting modules.

Accordingly, the power supply units 10 are configured as a first power unit 11 and a second power unit 12. The light units 20 are configured as a first light body 21, a second light body 22, and a third light body 23. The connection units 30 are configured as a first connector 31 and a second connector 32.

Preferably, in one embodiment, the structural and functional configurations of the first light body 21, the second light body 22, and the third light body 23 are substantially identical. The structural and functional configurations of the first connector 31 and the second connector 33 are substantially identical. The structural and functional configurations of the first power unit 11 and the second power unit 12 are substantially identical. In the following description, only a portion of them will be described, and the others will not be repeated.

Accordingly, the first light body 21 has one end coupled to the first power unit 11 and an opposed end coupled to one end of the first connector 31, wherein an opposed end of the first connector 31 is coupled to one end of the second light unit 22. An opposed end of the second light body 22 is coupled at one end of the second connector 32, wherein an opposed end of the second connector 32 is coupled to one end of the third light body 23. An opposed end of the third light body 23 is coupled to the second power unit 12.

In other words, the power supply units 10 are provided at two ends of the work light, wherein the light units 20 and the connection units 30 are disposed alternating with each other. That is, the first power unit 11, the first light body 21, the first connector 31, the second light body 22, the second connector 32, the third light body 23, and the second power unit 12 are electrically connected in order to form one single light configuration. By controlling either the first power unit 11 or the second power unit 12 to control the entire circuit of the work light, the first light body 21, the second light body 22 and the third light body 23 can be controlled for light generation.

Accordingly, the first light body 21 is detachably coupled at the first connector 31, while the third light body 23 is detachably coupled at the second connector 32 to change the configuration of the work light, i.e. the number of light bodies, so as to adjust the illumination range or illumination area of the work light.

Figure 5:
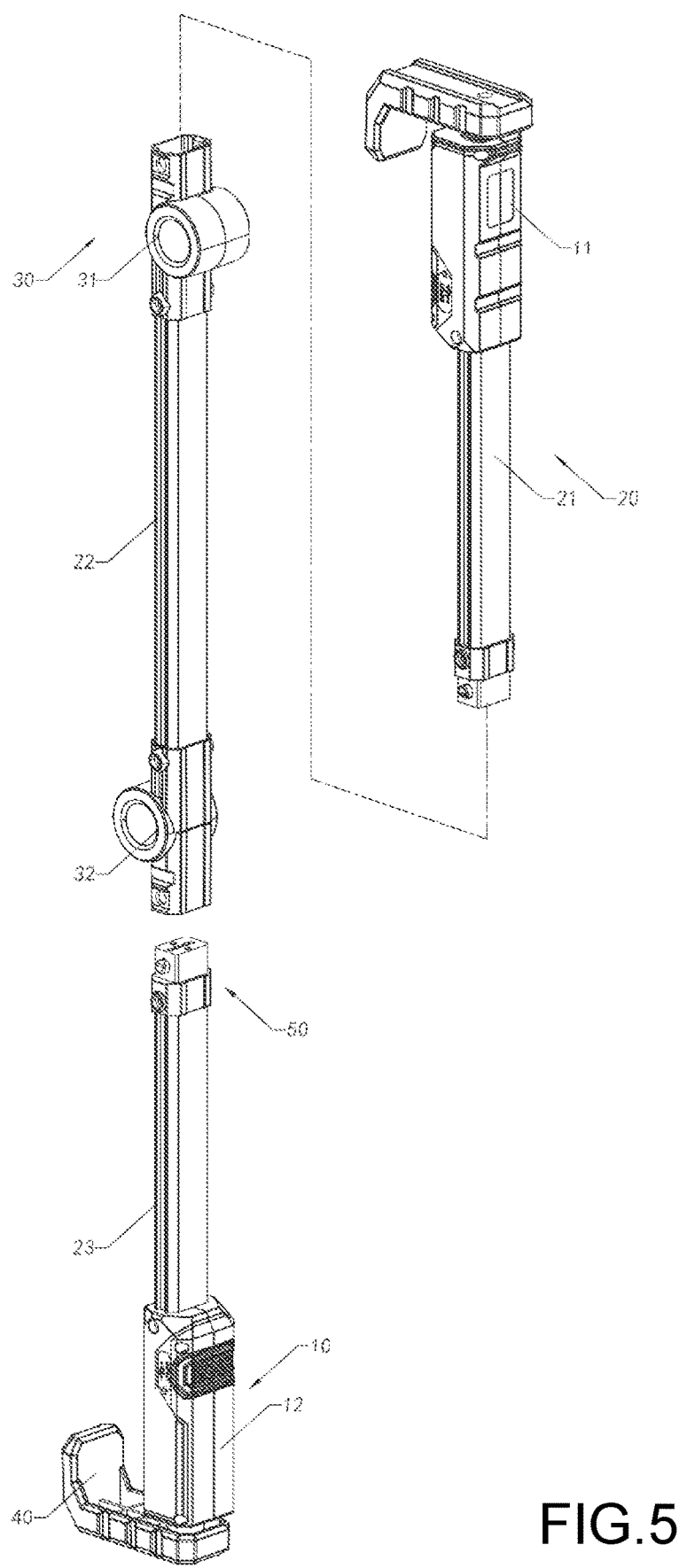
FIG. 5 is an exploded perspective view of the work light according to the above preferred embodiment of the present invention.
Figure 6:
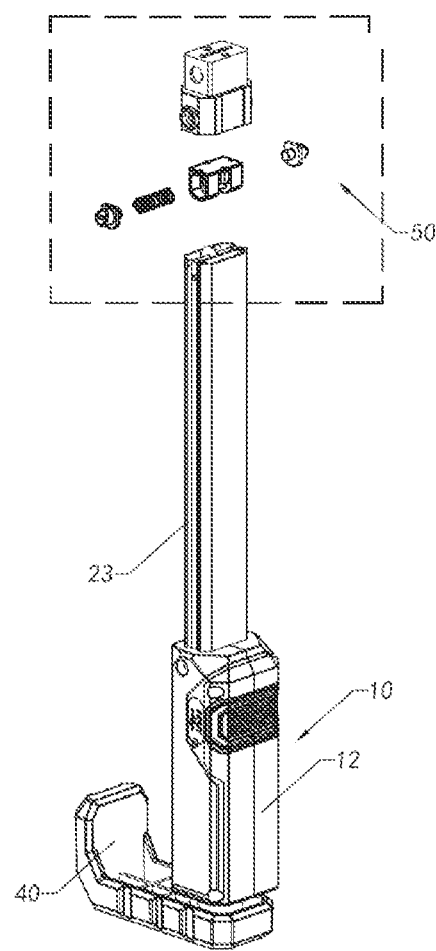
FIG. 6 is a partially exploded perspective view of the work light according to the above preferred embodiment of the present invention.
Figure 7:
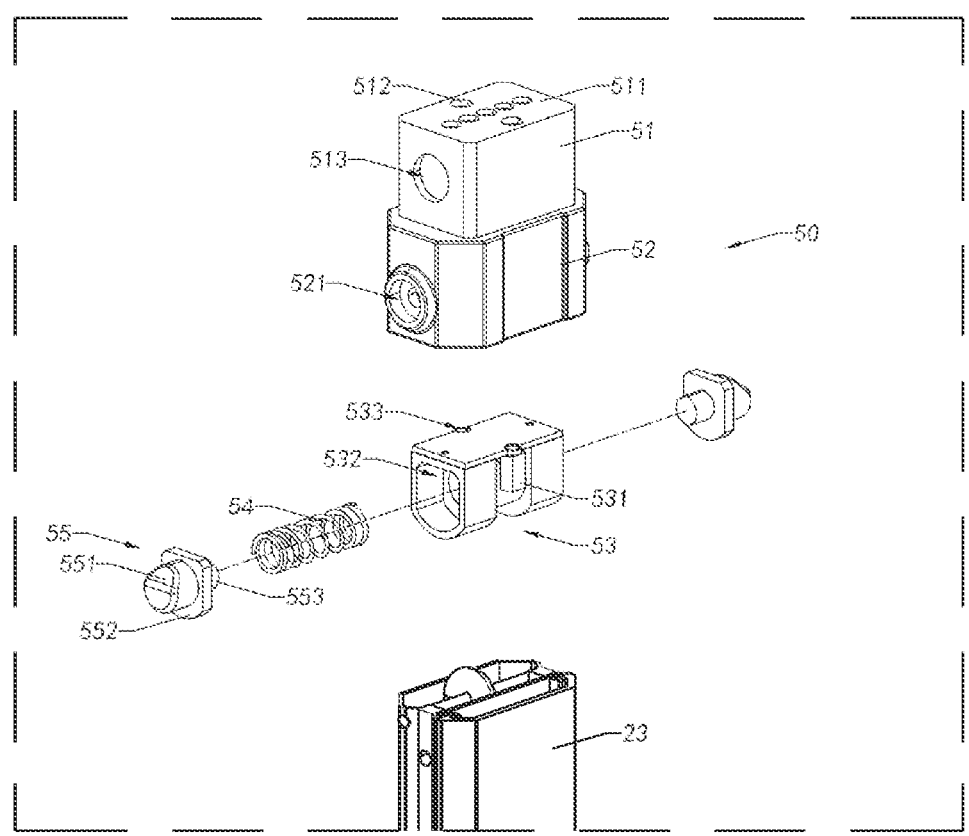
FIG. 7 is a partially exploded and enlarged view of the work light according to the above preferred embodiment of the present invention.
Figure 8A:
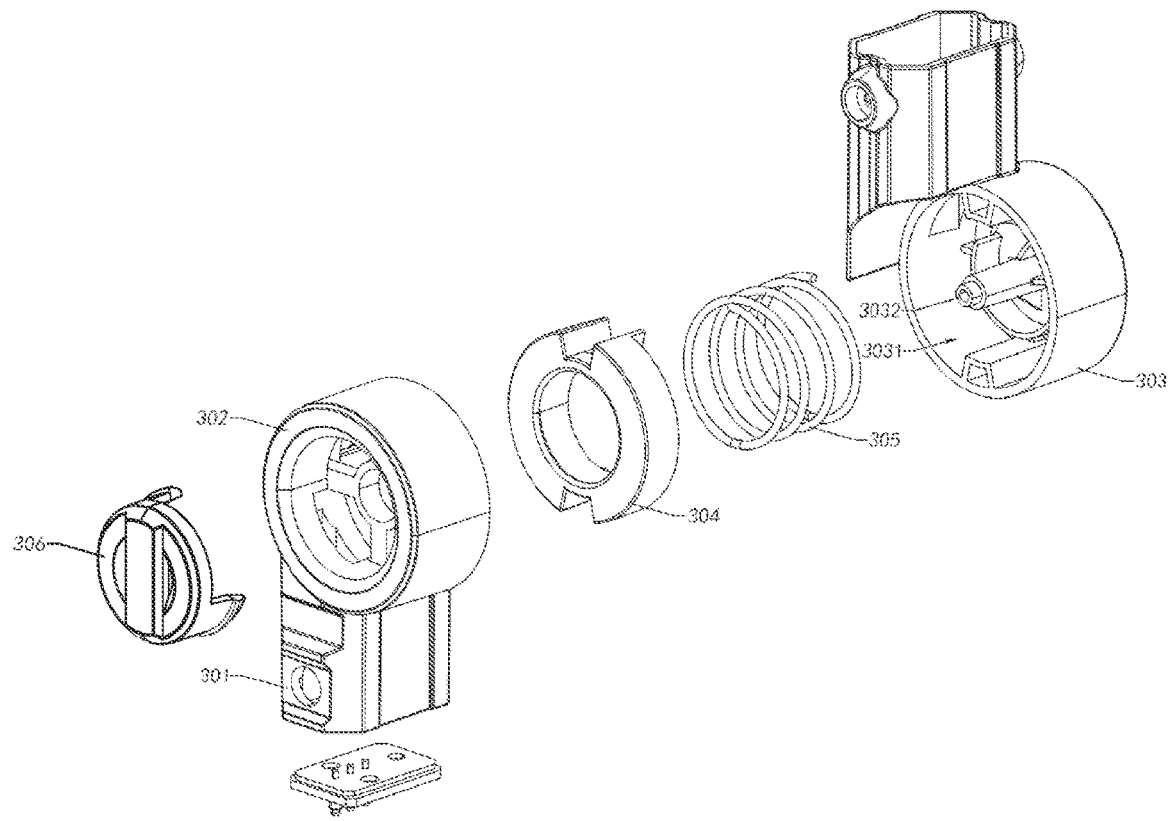
FIG. 8A is an exploded perspective view of a connection unit of the work light according to the above preferred embodiment of the present invention.
Figure 8B:
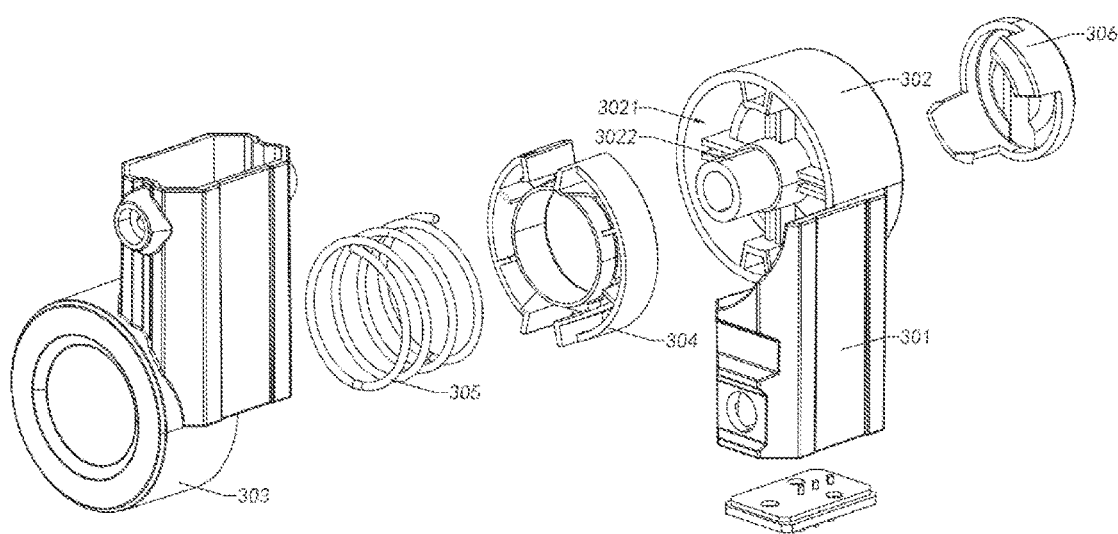
FIG. 8B is another exploded perspective view of the connection unit of the work light according to the above preferred embodiment of the present invention.
Figure 9:
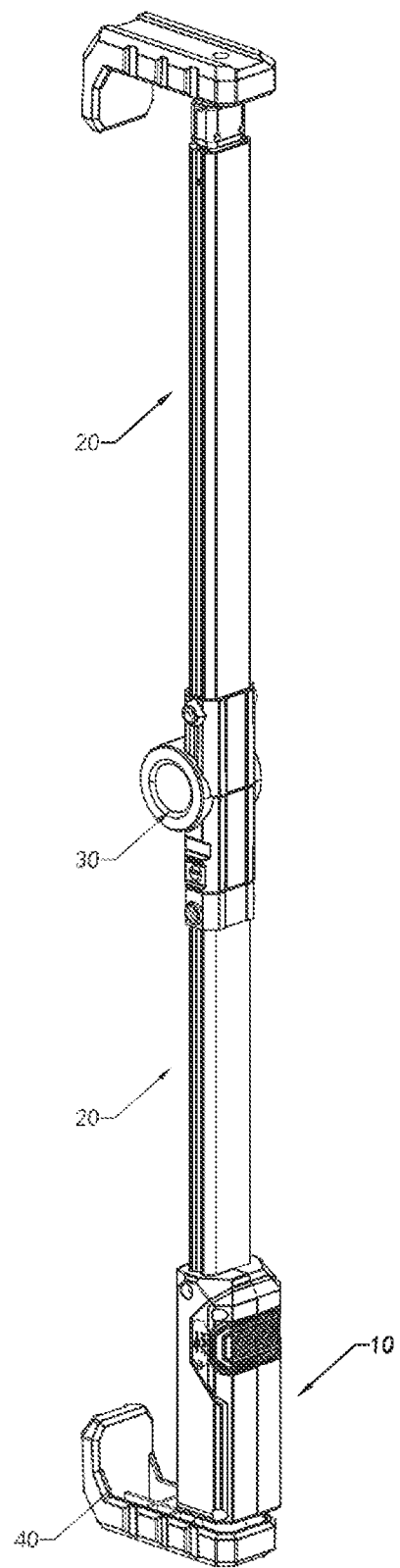
FIG. 9 illustrates an alternative mode of the work light in the unfolded position according to the above preferred embodiment of the present invention.
Figure 10:
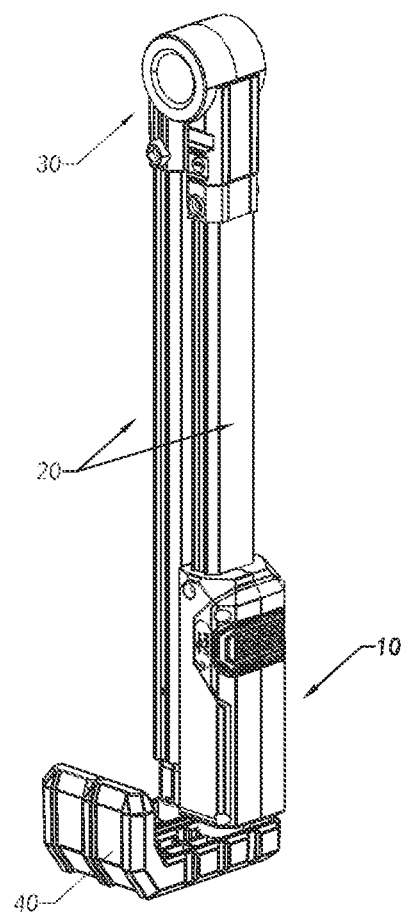
FIG. 10 illustrates the alternative mode of the work light in the folded position according to the above preferred embodiment of the present invention.

Furthermore, as shown in FIGS. 5 to 7, the work light further comprises one or more self lock units 50 disposed at a connection end between the first light body 21 and the first connector 31 and/or at a connection end between the third light body 23 and the second connector 32. The self lock units 50 are configured to electrically connect between the first light body 21 and the first connector 31, and to electrically connect between the third light body 23 and the second connector 32. Through the self lock units 50, the first light body 21 and the third light body 23 are detachably coupled to the first connector 31 and the second connector 32 respectively.

Particularly, the self lock unit 50 comprises a plug head 51, a retention body 52, a holding unit 53, a resilient element 54, and two self locking elements 55. As shown in FIGS. 5 to 7, the plug head 51 and the retention body 52 are integrated with each other that the plug head 51 is integrally and upwardly extended from the retention body 52. The plug head 51, having a size smaller than a size of the retention body 52 is configured to detachably insert into the connection unit 30 so as to affix the light unit 20 at the connection unit via the self locking elements 55. The retention body 52 is sleeved on the end of the light unit 20 to affix the self lock unit 50 at the end of the light unit 20. Preferably, the self lock unit 50 is securely coupled at the end of the light body 20 via the retention body 52 by means of screws or rivets.

Furthermore, the plug head 51 has a rectangular cross structure and is formed in hollow configuration, wherein the plug head 51 has a row of electric connecting slots 511 spacedly formed on a top wall of the plug head 51, two affixing slots 512 spacedly formed on the top wall at a position the row of electric connecting slots 511 is located between the two affixing slots 512, and two engaging slots 513 provided at two sidewalls of the plug head 51 at centers thereof respectively. The holding unit 53 is received in an interior space of the plug head 51.

Particularly, the holding unit 53 has a receiving cavity 531 and two through holes 532 provided at two opposite sidewalls of the holding unit 53, wherein the resilient element 54 is disposed at the receiving cavity 531 at a position that two ends of the resilient element 54 are extended through the through holes 532 respectively so as to enable the resilient element 54 to be extended or compressed at the receiving cavity 531. Each of the self locking elements 55 has a front portion 551 extended through one of the through holes 532, a rear portion 552 integrally extended from the front portion 551, and a protruding portion 553 integrally extended from the rear portion 552, wherein the protruding portion 553 is inserted into the end of the resilient element 54 to couple the rear portion 552 at the resilient element 54, such that when the front portions 511 of the self locking elements 55 are pressed toward each other at the same time, the resilient element 54 is compressed in the receiving cavity 531 of the holding unit 53.

When the holding unit 53 is disposed in the plug head 51, the through holes 532 of the holding unit 53 are coaxially aligned with the engaging slots 513 of the plug head 51 respectively. Meanwhile, the front portions 551 of the self locking elements 55 are slidably protruded out of the holding unit 53 through the through holes 532 respectively. Since the cross sectional size of the rear portion 552 is larger than that of the front portion 551, the rear portion 552 of the self locking element 55 is blocked by the sidewall of the holding unit 53, such that only the front portion 551 of the self locking element 55 is extended out of the holding unit 53 through the respective through hole 532. Therefore, when the holding unit 53 is disposed in the plug head 51, the front portions 511 of the self locking elements 55 can be pressed toward each other at the same time to compress the resilient element 54 in the holding unit 53. In other words, the self locking elements 55 and the resilient element 54 can be telescopically moved with respect to the holding unit 53.

According to the preferred embodiment, the holding unit 53 is affixed to the plug head 51 by means of screws. Accordingly, the holding unit 53 further has two screw holes 533 spacedly provided at a top wall thereof, wherein when the holding unit 53 is disposed in the plug head 51, the screw holes 533 are aligned with the affixing slots 512 respectively, such that by engaging the screws through the screw holes 533 and the affixing slots 512, the holding unit 53 is affixed in the plug head 51.

The resilient element 54 is embodied as a compression spring in this embodiment.

Furthermore, the connection unit 30 has two connection arms and two connection slots 301 provided at two sides of each connection arm, wherein when the plug head 51 is slidably inserted into the connection unit 30, the front portions 551 of the self locking elements 55 are slidably protruded from the connection slots 301 respectively, such that the light unit 20 is securely coupled at the connection unit 30. When the self locking elements 55 are pressed at the same time, the plug head 51 is adapted to be detached from the connection unit 30, so as to detachably couple the light unit 20 at the connection unit 30.

It is worth mentioning that each of the self locking elements 55 has a slanted sliding surface provided at the front portion 551 to allow the front portion 551 being slidably engaged and disengaged with the connection slot 301 so as to enhance the detaching and attaching operation of the light unit 20 at the connection unit 30.

For example, when the first light body 21 is detached from the first connector 31, the first power unit 11 and the first light body 21 form a single first light apparatus, wherein by controlling the first power unit 11, the first light body 21 is controlled for light generation. Meanwhile, the second power unit 12, the second light body 22, and the third light body 23 form a single second light apparatus, wherein by controlling the second power unit 12, the second light body 22 and the third light body 23 are controlled for light generation. Alternatively, when the third light body 23 is detached from the second connector 32, the second power unit 12 and the third light body 23 form a single first light apparatus, wherein by controlling the second power unit 12, the third light body 23 is controlled for light generation. Meanwhile, the first power unit 11, the first light body 21, and the second light body 22 form a single second light apparatus, wherein by controlling the first power unit 11, the first light body 21 and the second light body 22 are controlled for light generation.

When the first light body 21 and the third light body 23 are detached from the first connector 31 and the second connector 32 respectively, the first power unit 11 and the first light body 21 form a single first light apparatus while the second light body 22, and the third light body 23 form a single second light apparatus. By controlling the first power unit 11, the first light body 21 is controlled for light generation. Likewise, by controlling the second power unit 12, the third light body 23 is controlled for light generation. In other words, the work light can be disassembled into two independent light apparatuses. Via the lock unit 40, each light apparatus can be hung at the vehicle window as an example for illuminating different areas of the vehicle.

Accordingly, when the light unit 20 is assembled by the connection unit 30, an elongated light apparatus is formed. When the light unit 20 is disassembled via the connection unit 30, different light apparatuses are formed and operated independently. For different usages, the light unit 20 can be disassembled into different light configurations to provide different illumination ranges or illumination areas.

As shown in FIGS. 9A and 9B, the connection unit 30 further comprises a first rotatable member 302, a second rotatable member 303, a stopper member 304, a resetting element 305, and a push button 306.

Accordingly, the first rotatable member 302 has a first rotating cavity 3021 while the second rotatable member 303 has a second rotating cavity 3031, wherein each of the first rotating cavity 3021 and the second rotating cavity 3031 has a circular configuration. The first rotatable member 302 and the second rotatable member 303 are coupled side-by-side to engage the first rotating cavity 3021 with the second rotating cavity 3031 with each other to form a rotating chamber. In other words, one side of the rotating chamber is formed by the first rotating cavity 3021 and an opposed side of the rotating chamber is formed by the second rotating cavity 3031. The first rotatable member 302 further comprises a first rotating shaft 3022 while the second rotatable member 303 further comprises a second rotating shaft 3032, wherein the first rotating shaft 3022 and the second rotating shaft 3032 are located at a center of the connection unit 30. Furthermore, the first rotating shaft 3022 and the second rotating shaft 3032 are integrally formed at the first rotatable member 302 and the second rotatable member 303 respectively. When the first rotatable member 302 and the second rotatable member 303 are coupled side-by-side, the first rotating shaft 3022 and the second rotating shaft 3032 are coaxially coupled with each other. In one example, the second rotating shaft 3032 is coaxially sleeved in the first rotating shaft 3022 to couple the first rotatable member 302 with the second rotatable member 303.

Furthermore, the stopper member 304 is disposed in the rotating chamber formed by the first rotating cavity 3021 and the second rotating cavity 3031, wherein the stopper member 304 is movable in the rotating chamber. Therefore, by adjusting a position of the stopper member 304, the rotatable movement of the connection unit 30 is adapted to be controlled. It is worth mentioning that the stopper member 304 can be moved during the rotating operation or non-rotating operation of the connection unit 30.

Furthermore, the push button 306 is coupled at an outer side of the first rotatable member 302 at a position adjacent to the stopper member 304, wherein the resetting element 305, such as a coil spring, is disposed in the second rotating cavity 3031. Accordingly, the push button 306 is configured to control the position of the stopper element 304 in the rotating chamber.

Particularly, when the stopper member 304 is located at the first rotating cavity 3021 or the second rotating cavity 3031, the stopper member 304 is adapted to be rotated at the first rotating cavity 3021 or the second rotating cavity 3031, such that the connection unit 30 is in a rotatable condition that the connection unit 30 is free to be rotated. When the stopper member 304 is located between the first rotating cavity 3021 and the second rotating cavity 3031, the stopper member 304 is locked to prevent any rotatable movement between the first rotatable member 302 and the second rotatable member 303, such that the connection unit 30 is in a non-rotatable condition that the connection unit 30 is unable to be rotated.

Figure 4:
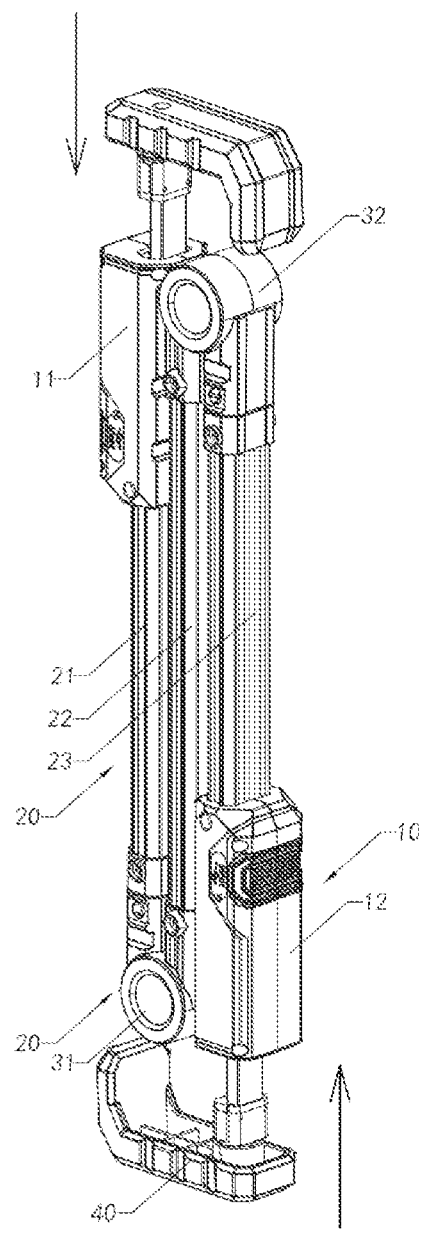
FIG. 4 illustrates a folding operation of the work light according to the above preferred embodiment of the present invention.

As shown in FIG. 3, since the connection unit 30 can be rotated, when the light unit 20 is coupled at the connection unit 30, the light unit 20 can be rotated via the connection unit 30 to selectively adjust or configure the light unit 20 at different unfolded positions. Particularly, when two light units 20 are coupled with each other via the connection unit 30, the connection unit 30 serves as a rotating axle, such that the two light units 20 can be independently rotated at certain rotation angles with respect to the connection unit 30. Preferably, the rotation angle is between 0° and 180°, wherein the position of the light unit 20 is controlled by controlling the rotation angle. As shown in FIG. 1, the rotation angle is 180° that the work light forms a straight line and is in a fully expanded position. In this configuration, the work light has the longest illumination range. As shown in FIG. 4, the rotation angle is 0° that the two adjacent light units 20 are folded to overlap with each other, such that the work light is in a fully folded position to provide the smallest size and shape for easily carrying and storage.

It is worth mentioning that when the rotation angle is 0° that the two adjacent light units 20 are folded to overlap with each other, the work light is in a fully folded position. When the lock unit 40 is rotated to couple with the connection unit 30, the light units 20 are locked by the lock unit 40 to prevent any unfolding operation of the light units 20.

It is worth mentioning that via the rotational ability of the connection unit 30, the light unit 20 can be rotated via the connection unit 30 to selectively adjust or configure the light unit 20 at different unfolded positions, so as to enable the work light to be used in different situations.

Figure 11A:
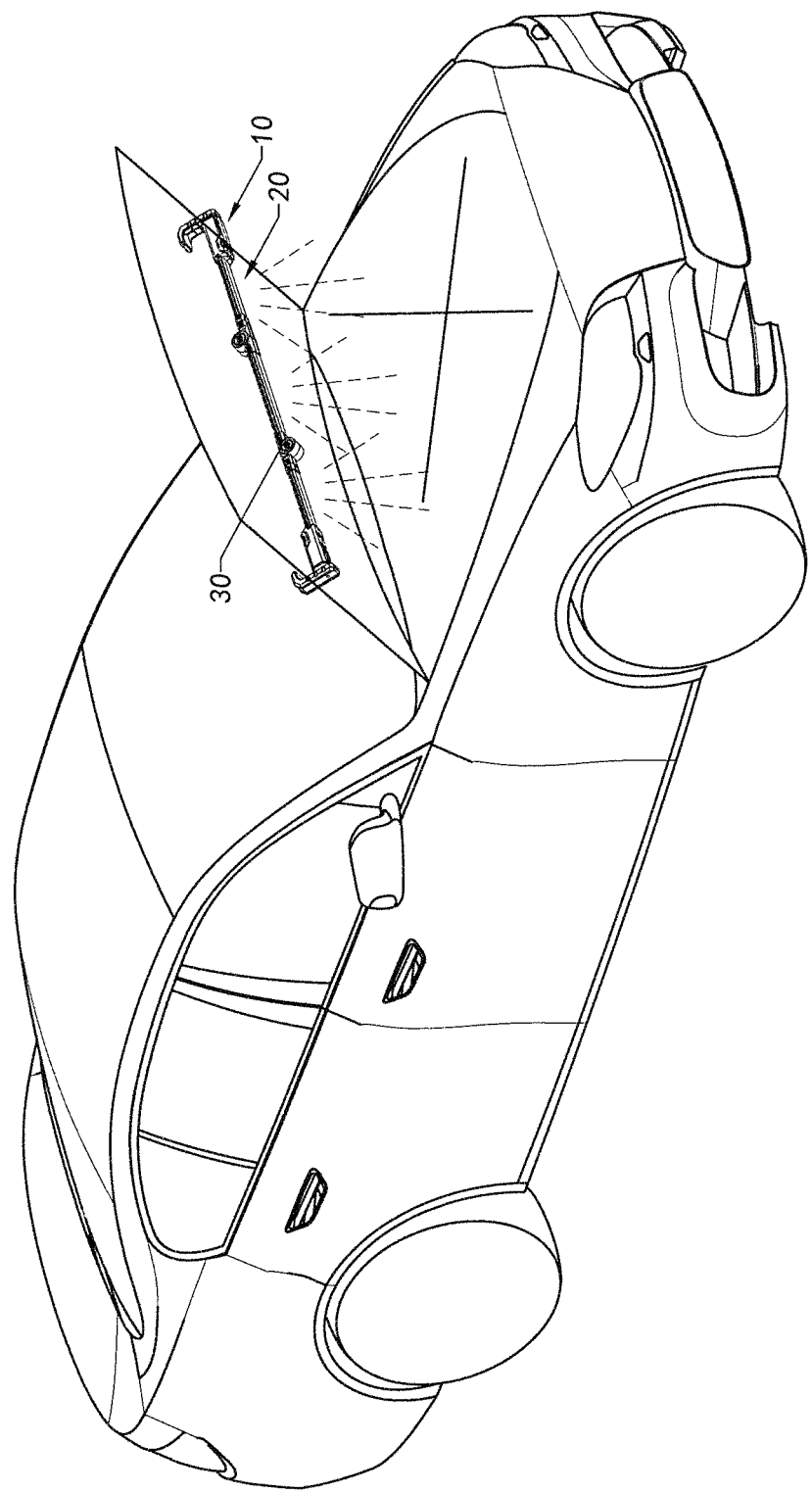
FIG. 11A illustrates a first application of the work light according to the above preferred embodiment of the present invention.
Figure 11B:
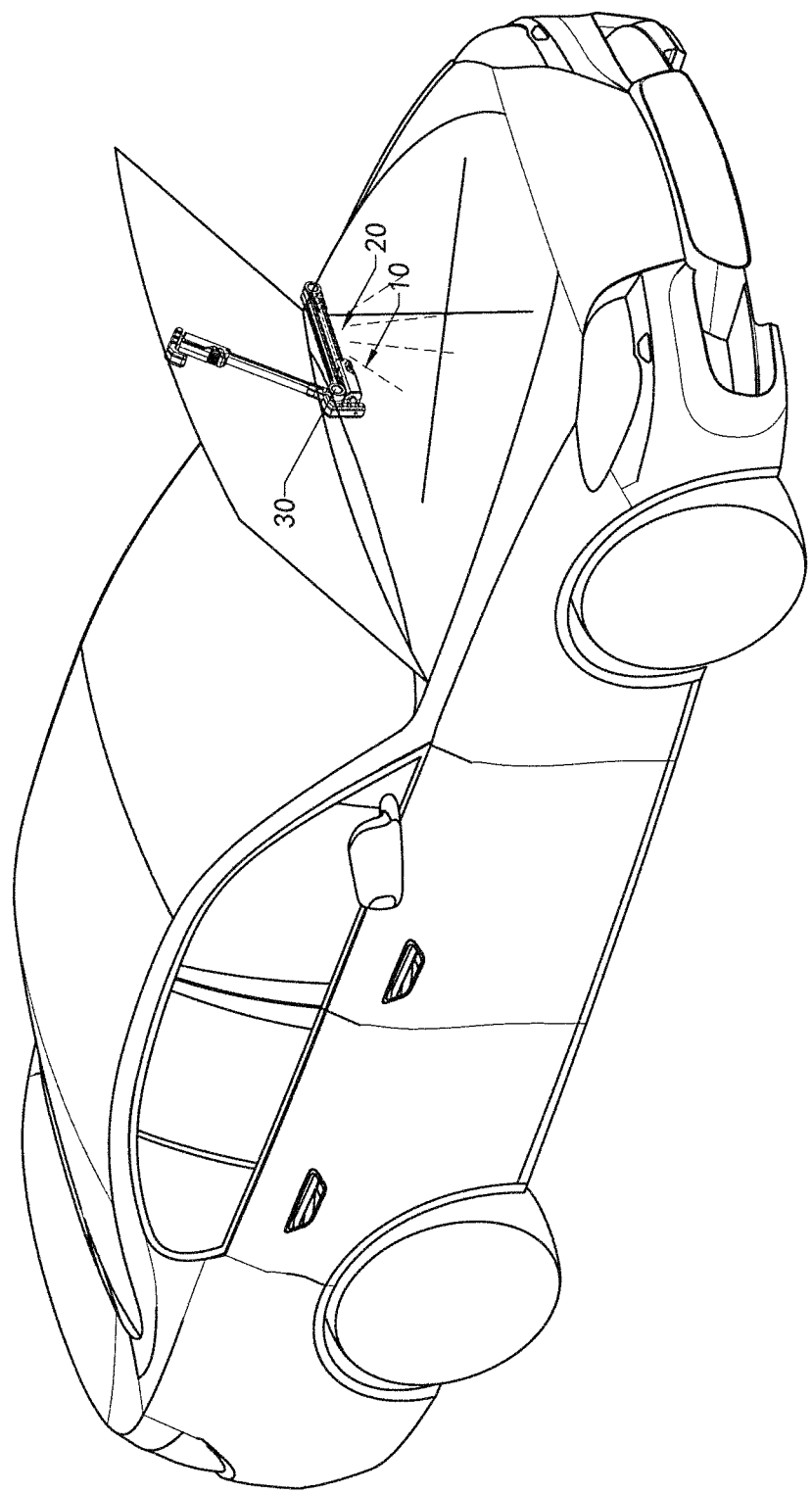
FIG. 11B illustrates a second application of the work light according to the above preferred embodiment of the present invention.
Figure 11C:
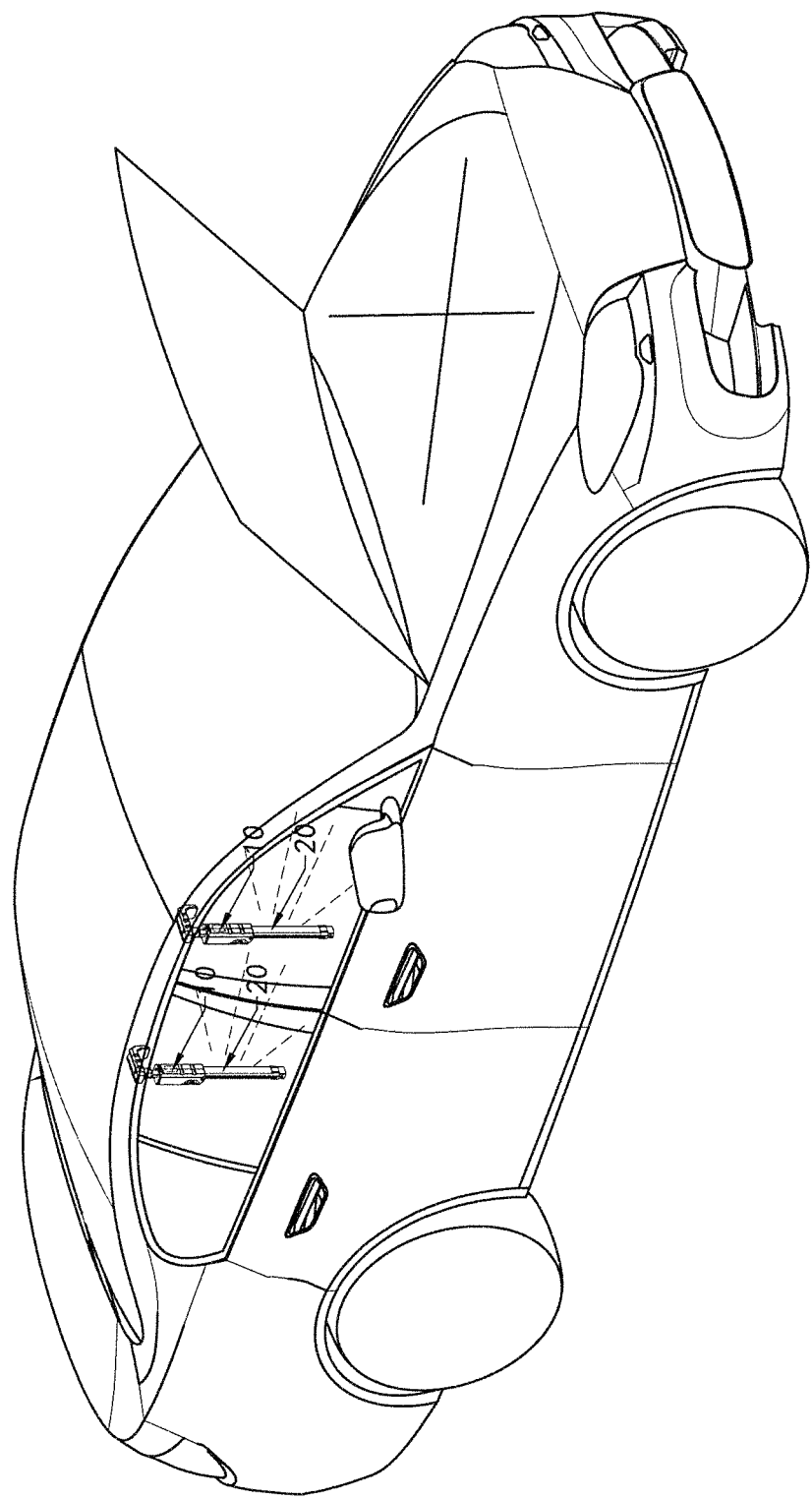
FIG. 11C illustrates a third application of the work light according to the above preferred embodiment of the present invention.
Figure 12:
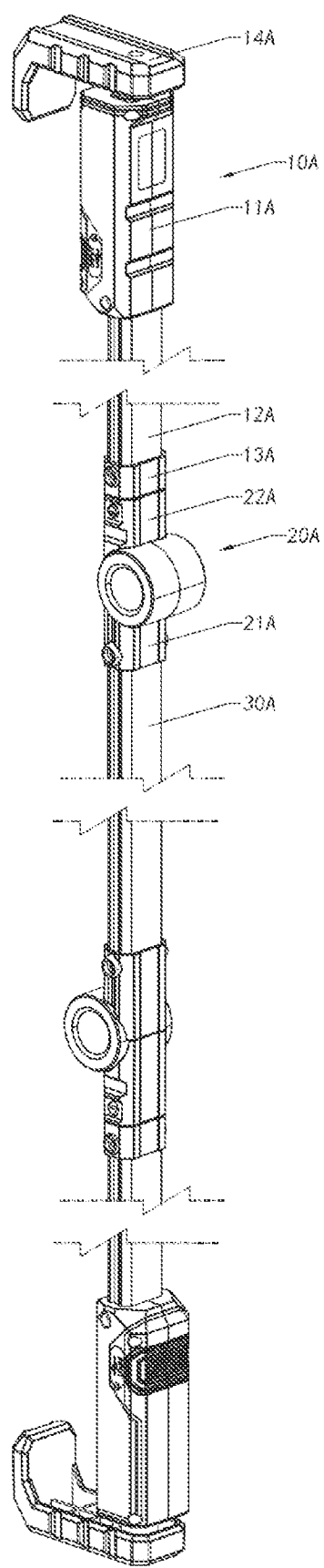
FIG. 12 is a perspective view of a work light in an unfolded position according to a second embodiment of the present invention.

As shown in FIG. 11A, the work light is unfolded and extended to form a straight line configuration, wherein the work light is hung on two sides of the hood of the vehicle through the lock units 40. Accordingly, the lock units 40 are rotated and pulled to adjust the hooking positions thereof, and to adjust the length of the work light at the same time for matching the width of the hood of the vehicle. During the pulling operation, the lock unit 40 will provide a retraction force, such that the lock units 40 can be secured at the two sides of the hood of the vehicle to affix the work light thereat. As shown in FIG. 11B, the work light is unfolded and rotated to form a right angle configuration, wherein the work light is hung at the hood of the vehicle through the lock units 40. It is appreciated that the work light can be unfolded to have different unfolded positions to provide different illumination ranges. Therefore, the work light can be selectively configured at different unfolding positions according to the actual needs for different illumination ranges.

Furthermore, the power supply unit 10 comprises a battery, a control circuit, and a control switch, wherein the battery and the control circuit are received in the power supply unit 10 while the control switch is coupled at an outer wall of the power supply unit 10. The light unit 20 is electrically connected to the battery, the control circuit, and the control switch so as to control the electrical connection of the light unit 20. Preferably, the battery is a rechargeable battery. The power supply unit 10 further comprises a charging terminal electrically connected to the battery for charging the battery.

Referring to FIGS. 12 to 21 of the drawings, a work light according to a second embodiment illustrates an alternative mode of the first embodiment, wherein the work light comprises two light units 10A, two connection units 20A and an extension member 30A. The connection units 20A are coupled at two ends of the extension member 30A respectively. The light units 10A are detachably coupled at the connection units 20A respectively. At the assembling position, the light units 10A are detachably coupled at the connection units 20A respectively to retain the light units 10A at two opposite ends of the extension body 30A via the connection units 20A. In this configuration, the overall length of the work light can be extended for hanging at the hood of the vehicle. At the disassembling position, at least one of the light units 10A is detached from the connection unit 20A, wherein the detached light unit 10A can be operated individually and independently. In other words, the work light at different configurations provides different usage conditions to fit different actual needs.

Preferably, at the disassembling position, the two light units 10A are detached from the connection units 20A, such that the two light units 10A from two independent light apparatuses for being operated independently.

Furthermore, each connection unit 20A is individually folded, such that at the assembling position, the length of the work light can be selectively reduced via the folding operation of the connection unit 20A so as to allow the work light by easily carried and stored.

Particularly, each of the connection units 20A comprises a fixed arm 21A affixedly coupled at one end of the extension member 30A and a movable arm 22A rotatably coupled to the fixed arm 21A, wherein the light unit 10A is detachably coupled at the movable arm 22A. Accordingly, when the movable arm 22A is rotated with respect to the fixed arm 21A, the light unit 10A is rotated relative to the extension member 30A correspondingly, such that the light unit 10A can be folded to overlap with the extension member 30A. Through this configuration, the work light can be folded to reduce its length to ensure the work light at the smallest width at the folded position.

Particularly, the light unit 10A comprises a power supply unit 11A, a light emitting unit 12A and a self lock unit 13A. The power supply unit 11A and the self lock unit 13A are located at two opposite ends of the light emitting unit 12A, wherein the light emitting unit 12A is electrically connected to the power supply unit 11A. When the light emitting unit 12A is electrified by the power supply unit 11A, the light emitting unit 12A is configured to generate the light at a predetermined direction. Correspondingly, the movable arm 22A of the connection unit 20A has a connection cavity 221A and at least one connection slot 222A communicating with the connection cavity 221A. The self lock unit 13A can be disposed in the connection cavity 221A of the movable arm 22A to engage with the connection slot 222A in order to detachably couple the light unit 10A at the movable arm 22A, such that the work light is in the assembling position.

As shown in FIGS. 16 to 19, the self lock unit 13A of the light unit 10A comprises a plug head 131A, a holding unit 132A, a resilient element 133A and a self locking element 134A. The plug head 131A is coupled at one end of the light emitting unit 12A. The holding unit 132A is received in the plug head 131A, wherein holding unit 132A has two through holes 1321A coaxially aligned and communicating with each other. The holding unit 132A further has a sidewall 1322A extended between two openings of the through holes 1321A. The resilient element 133A is disposed in the through holes 1321A of the holding unit 132A. The self locking element 134A has a sliding end 1341A and a locking end 1342A, wherein the self locking element 134A is coupled at the holding unit 132A at a position that the sliding end 1341A is slidably coupled at the through hole 1321A of the holding unit 132A. The resilient element 133A is retained between the sliding ends 1341A of the self locking elements 134A. When the self locking elements 134 are moved toward the holding unit 132A, the resilient element 133A is compressed by the two self locking elements 134A, such that the resilient element 133A will store an elastic resetting force due to the deformation of the resilient element 133A. The movable arm 22A of the connection unit 20A has two mounting holes 222A, wherein an opening of the connection cavity 221A is formed at an end surface of the movable arm 22A. The mounting holes 222A are formed at two opposite sidewalls 223A of the movable arm 22A and are coaxially aligned with each other. The self lock unit 13A of the light unit 10A is slidably inserted into the connection cavity 221A of the movable arm 22A of the connection unit 20A. The locking ends 1342A of the two self locking elements 134A of the self lock unit 13A are held by the resilient element 133A through the mounting holes 222A of the movable arm 22A, such that the light unit 10A can be securely coupled at the connection unit 20A.

During the assembling process of the light unit 10A to the connection unit 20A, in the first step, after the self lock unit 13A of the light unit 10A is aligned with the connection cavity 221A of the movable arm 22A of the connection unit 20A, the light unit 10A is pushed toward the movable arm 22A to slidably insert the self lock unit 13A into the connection cavity 221A of the movable arm 22A. In the second step, when the self lock unit 13A is slid into the connection cavity 221A of the movable arm 22A, the locking ends 1342A of the two self locking element 134A of the self lock unit 13A are pressed at the same time by the sidewalls 223A of the movable arm 22A to allow the sliding ends 1341A of the self locking elements 134A to slide in the holding unit 132A so as to extend through the through holes 1321A of the holding unit 132A. Meanwhile, the resilient element 133A is pressed by the sliding ends 1341A of the two self locking elements 134A to store the elastic resetting force at the deformed resilient element 133A. When the self lock unit 13A is slid into the connection cavity 221A of the movable arm 22A at a position that the locking ends 1342A of the self locking elements 134A are aligned with the mounting holes 222A of the movable arm 22A, the resilient element 133A is configured to push the two self locking elements 134A outwardly via the elastic resetting force so as to push the locking ends 1342A of the self locking elements 134A to automatically engage with the mounting holes 222A of the movable arm 22A. Then, the light unit 10A is securely coupled at the movable arm 22A of the connection unit 20A. The resilient element 133A will ensure the locking ends 1342A of the self locking elements 134A being securely engaged with the mounting holes 222A of the movable arm 22A respectively so as to form a secure connection between the light unit 10A and the movable arm 22A of the connection unit 20A.

Preferably, the locking ends 1342A of the self locking elements 134A of the self lock unit 13A has a slanted sliding surface to allow the self lock unit 13A being slidably in the connection cavity 221A of the movable arm 22A when the light unit 10A is coupled at the connection cavity 221A of the movable arm 22A of the connection unit 20A.

Correspondingly, during the disassembling operation of the light unit 10A from the connection unit 20A, the locking ends 1342A of the self locking elements 134A of the self lock unit 13A are firstly pressed toward each other at the same time to allow the sliding ends 1341A of the self locking elements 134A sliding at the through holes 1321A of the holding unit 132A. Meanwhile, the resilient element 133A is compressed by the sliding ends 1341A of the self locking elements 134A to allow the resilient element 133A to store the elastic resetting force when the resilient element 133A is deformed. Then, the light unit 10A can be pulled away from the movable arm 22A of the connection unit 20A, such that the light unit 10A can be detached from the movable arm 22A of the connection unit 20A. It is appreciated that after the light unit 10A is detached from the movable arm 22A of the connection unit 20A, the resilient element 133A will return back to its original form to outwardly push the self locking elements 134A via the elastic resetting force so as to ensure the locking ends 1342A of the self locking elements 134A being pushed out of the sidewall 1322A of the holding unit 132A.

It is worth mentioning that any type of the resilient element 133A can be used in the second embodiment, and it should not be limited in the present invention. For example, the resilient element 133A is embodied as a compression spring in this embodiment.

As shown in FIGS. 16 to 19, the plug head 131A has an interior cavity 1311A, a plug head opening 1312A and two engaging slots 1313A, wherein the plug head opening 1312A is formed at one side of the interior cavity 1311A. The two engaging slots 1313A are formed at two opposite sidewalls of the interior cavity 1311A to communicate with the interior cavity 1311A, wherein the two engaging slots 1313A are coaxially aligned with each other. The holding unit 132A is disposed in the interior cavity 1311A of the plug head 131A at a position that the two through holes 1321A are coaxially aligned with the two engaging slots 1313A of the plug head 131A respectively, wherein a diameter size of the through hole 1321A is larger than a diameter size of the engaging slot 1313A of the plug head 131A. The self locking element 134A has a sliding portion 1343A and a locking portion 1344A integrally and outwardly extended from the sliding portion 1343A, wherein the sliding end 1341A is defined at the sliding portion 1343A while the locking end 1342 is defined at the locking portion 1344A. The size and shape of the sliding portion 1343A matches with the size and shape of the through hole 1321A of the holding unit 132A, such that the sliding portion 1343A is adapted to be slidably passing through the through hole 1321A of the holding unit 132A. Correspondingly, the size and shape of the locking portion 1344A matches with the size and shape of the engaging slot 1313A of the plug head 131A, such that the locking portion 1344A is adapted to be slidably passing through the engaging slot 1313A of the plug head 131A, so as to allow the locking portion 1344A being movably retained at the engaging slot 1313A of the plug head 131A.

In other words, the holding unit 132A and the plug head 131A are coupled with each other to allow the self locking element 134A to be slidably coupled at the through hole 1321A of the holding unit 132A, so as to prevent the self locking element 134A being detached from the holding unit 132A.

The plug head 131A of the self lock unit 13A is mounted on the light emitting unit 12A at a position that the end of the light emitting unit 12A is extended into the interior cavity 1311A through the plug head opening 1312A of the plug head 131A.

As shown in FIGS. 16 to 19, the self locking element 134A further comprises a stabilizing post 1345A integrally and outwardly extended from the sliding portion 1343A to insert into one end of the resilient element 133A, such that when the sliding portion 1343A of the self locking element 134A is slid at the through hole 1321A of the holding unit 132A, the resilient element 133A and the self locking element 134A are held with each other to prevent any separation therebetween, so as to ensure the secure connection for the self lock unit 13A.

Furthermore, the through hole 1321A of the holding unit 132A has a center portion 13211A and two outer end portions 13212A, wherein each of the outer end portions 13212A has a size larger than a size of the center portion 13211A. Accordingly, the size and shape of the center portion 13211A of the holding unit 132A matches the size and shape of the stabilizing post 1345A of the self locking element 134A. The size and shape of the end portion 13212A of the holding unit 132A matches the size and shape of the sliding portion 1343A of the self locking element 134A. Therefore, when the locking end 1342A of the self locking element 134A of the self lock unit 13A is pressed, the sliding portion 1343A of the self locking element 134A is blocked to prevent being slid at the center portion 13211A of the through hole 1321A of the holding unit 132A.

Preferably, the shape of the outer end portion 13212A of the holding unit 132A is substantially formed in square configuration. Correspondingly, the shape of the sliding portion 1343A of the self locking element 134A is substantially formed in square configuration. Therefore, when the sliding portion 1343A of the self locking element 134A is slid at the outer end portion 13212A of the holding unit 132A, the self locking element 134A is prevent from being rotated with respect to the holding unit 132A.

Preferably, the extension member 30A can be an additional light unit for light generation, such that the extension member 30A not only serves as an extension to extend the length of the work light but also allows the work light to be hung at the hood of the vehicle. Furthermore, the extension member 30A is able to extend the length of the light emitting unit of the work light, such that when the work light is hung at the hood of the vehicle, the entire length of the work light can generate light to provide sufficient illumination light for the engine compartment of the vehicle.

Particularly, after the self lock unit 13A of the light unit 10A is mounted in the connection cavity 221A of the movable arm 22A of the connection unit 20A, the light unit 10A is able to supply electrical energy to the extension member 30A via the connection unit 20A to enable the extension member 30A for light generation, such that it is convenient to select different operation modes of the work light between the assembling stage and the disassembling stage.

Particularly, the work light further comprises an electrical connection unit 40A which comprises a plurality of conductive terminals 41A and a plurality of conductive slots 42A. The conductive terminals 41A are provided at the movable arm 22A and are protruded from the connection cavity 221A of the movable arm 22A. The conductive slots 42A are formed at the end of the plug head 131A of the self lock unit 13A. When the self lock unit 13A of the light unit 10A is mounted in the connection cavity 221A of the movable arm 22A, the conductive terminals 41A of the electrical connection unit 40A are automatically inserted into and electrically conducted to the conductive slots 42A respectively, such that the light unit 10A is able to supply electrical energy to the extension member 30A via the connection unit 20A.

Figure 13:
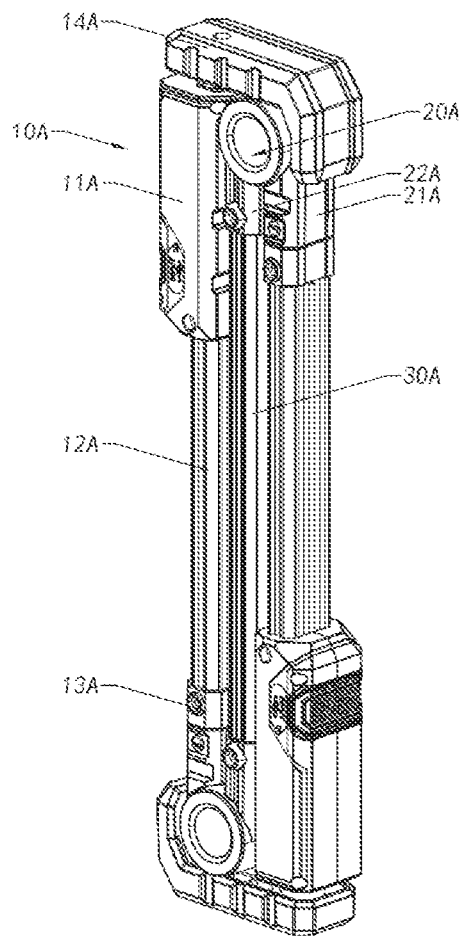
FIG. 13 is a perspective view of the work light in a folded position according to the above second preferred embodiment of the present invention.
Figure 14:
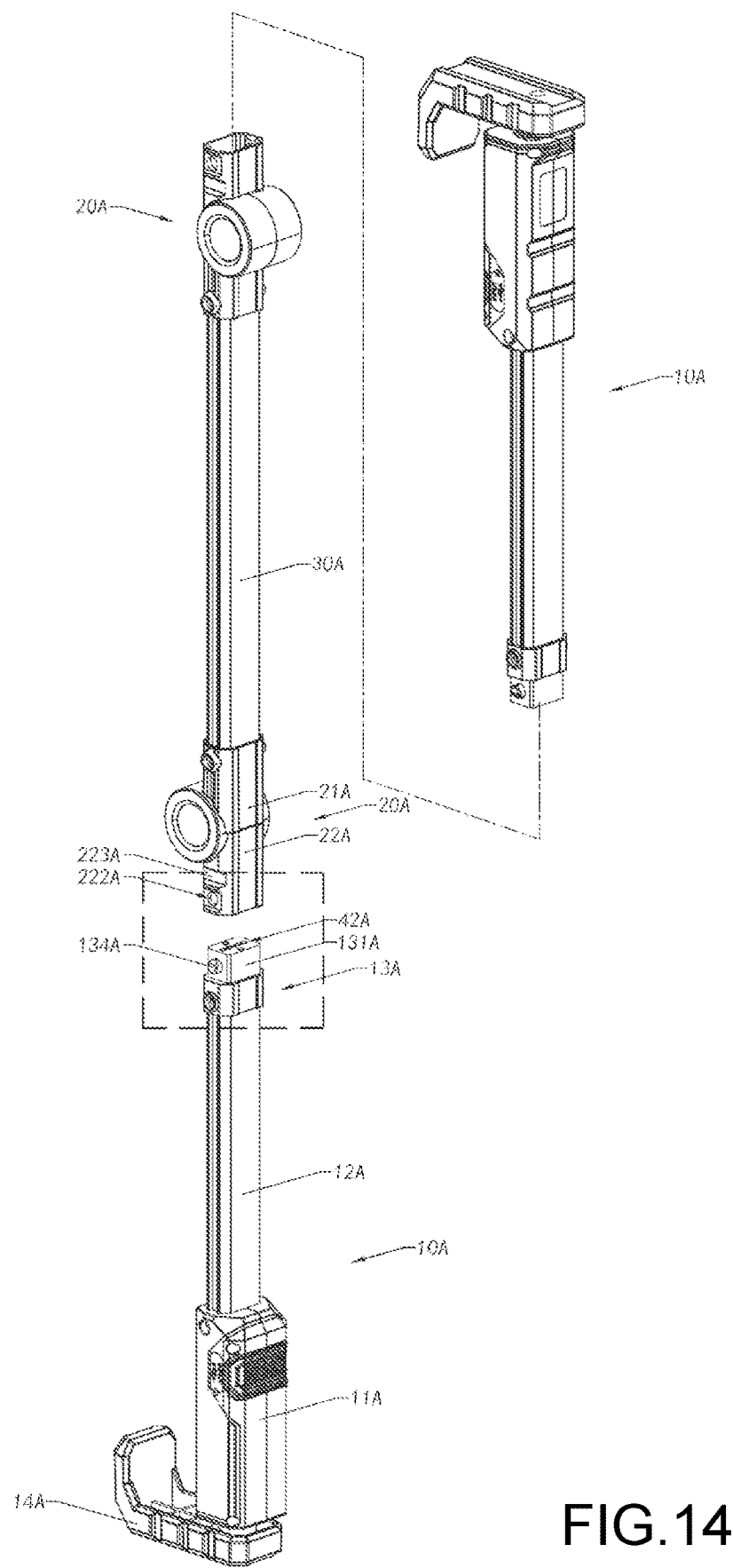
FIG. 14 is an exploded perspective view of the work light according to the above second preferred embodiment of the present invention.
Figure 15:
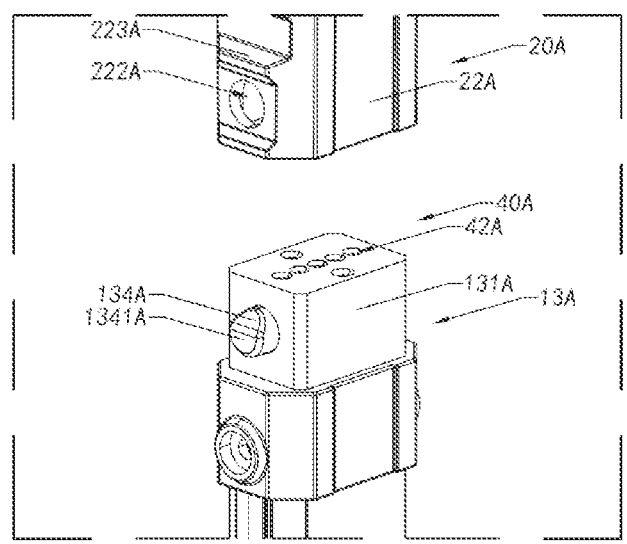
FIG. 15 is an enlarged view of the work light in FIG. 14 according to the above second preferred embodiment of the present invention.
Figure 16:
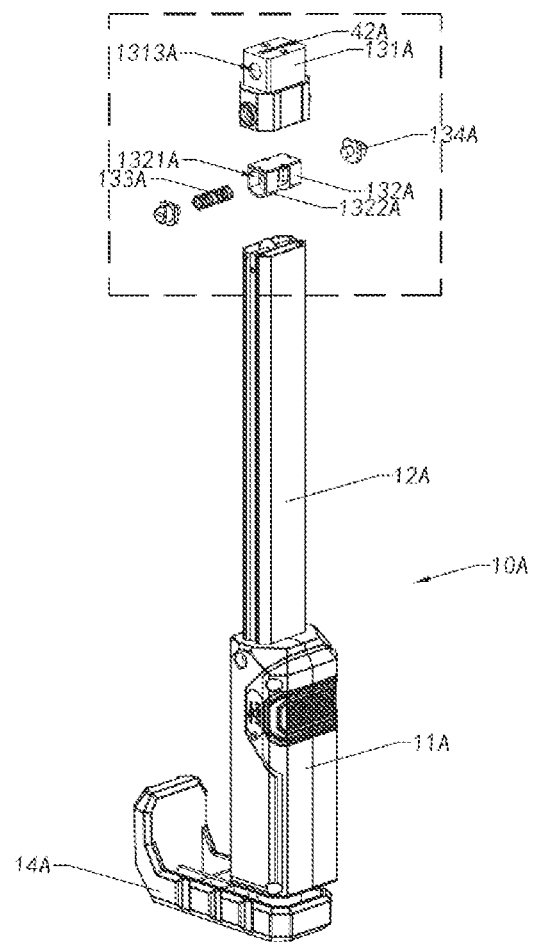
FIG. 16 is an exploded perspective view of connection unit of the work light according to the above second preferred embodiment of the present invention.
Figure 17:
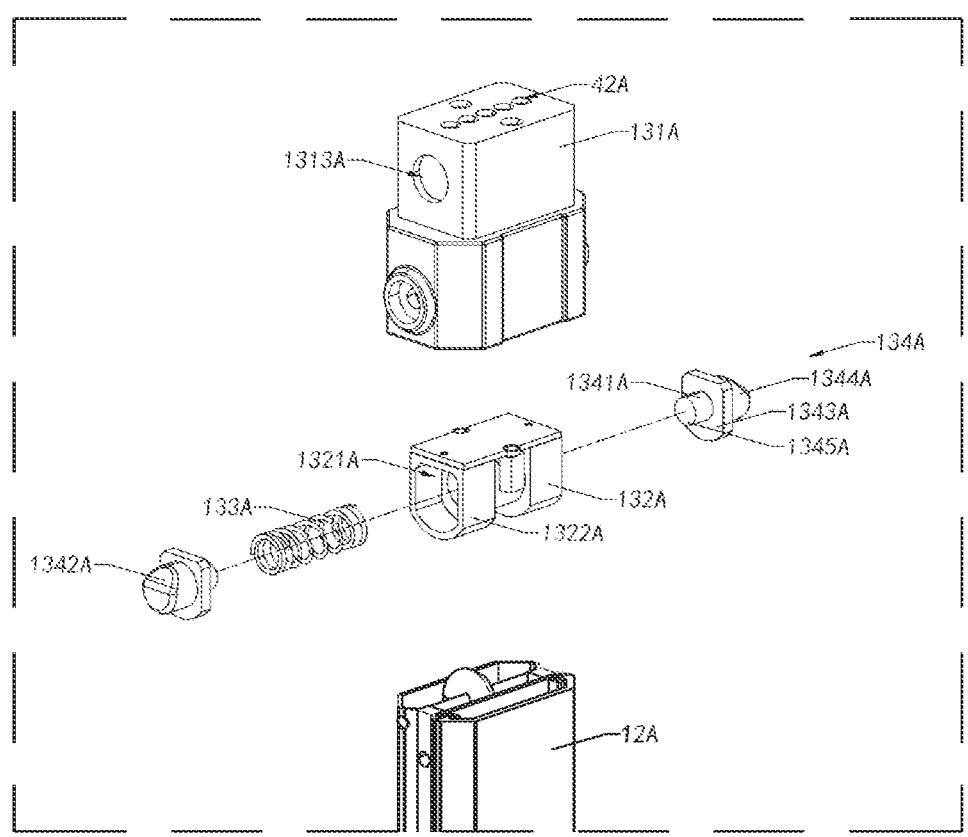
FIG. 17 is an enlarged view of the work light in FIG. 16 according to the above second preferred embodiment of the present invention.
Figure 18:
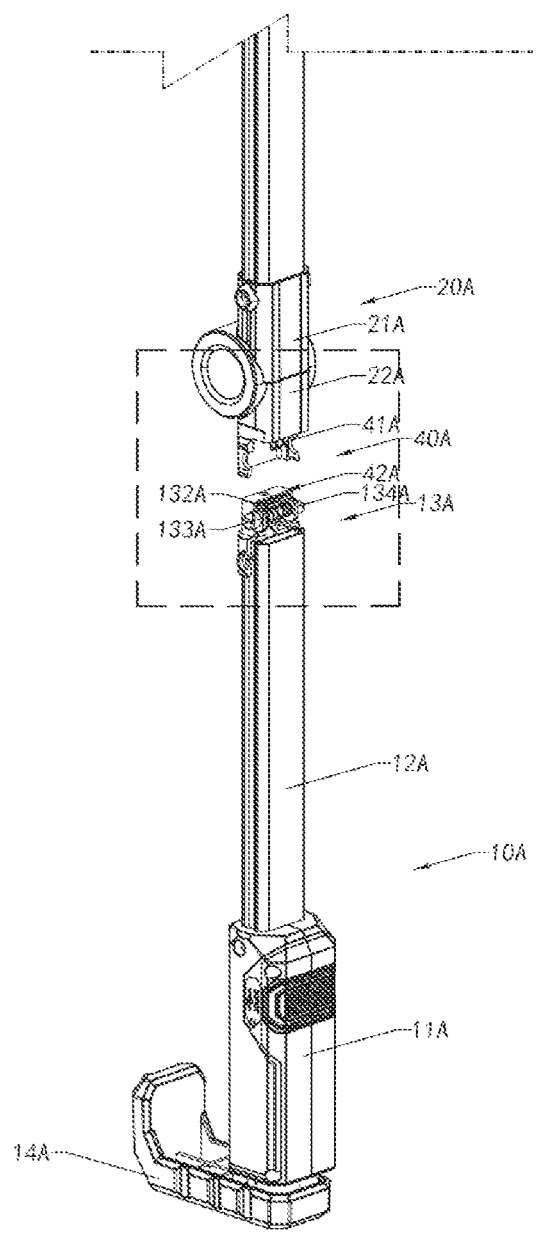
FIG. 18 is a sectional perspective view of the work light according to the above second preferred embodiment of the present invention.
Figure 19:
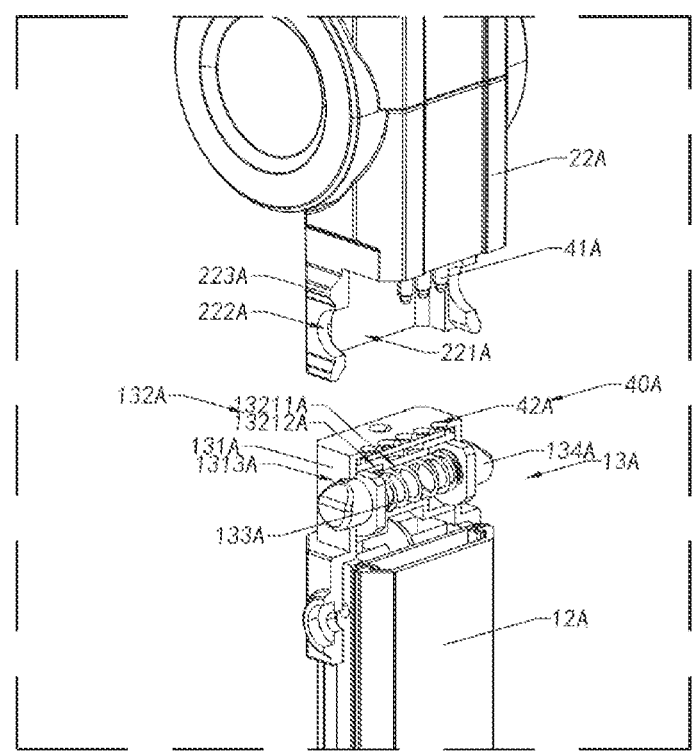
FIG. 19 is an enlarged view of the work light in FIG. 18 according to the above second preferred embodiment of the present invention.

As shown in FIGS. 12 to 21, the light unit 10A further comprises a lock unit 14A coupled at one end of the power supply unit 11A for suspendedly hanging the work light at an object such as the hood of the vehicle as an example. In addition, the lock unit 14A is rotatably coupled at the power supply unit 11A, such that when the work light is folded at the folded position, the lock unit 14A is self-rotated to lock up with the connection unit 20A so as to stably retain the work light in the folded position as shown in FIG. 13.

Figure 20:
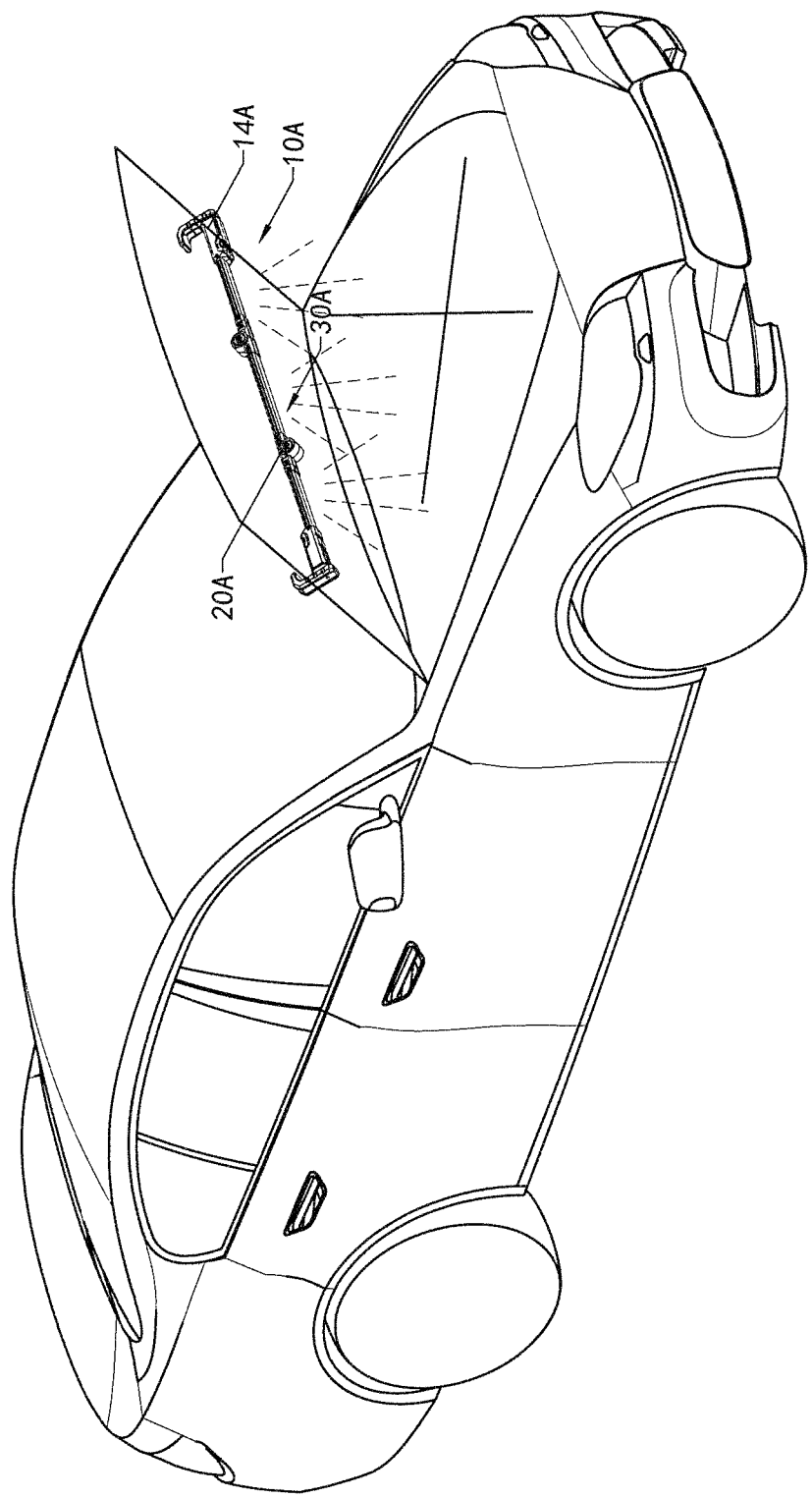
FIG. 20 illustrates a first application of the work light according to the above second preferred embodiment of the present invention.

FIG. 20 illustrates a first example of the work light according to the second embodiment, wherein two light units 10A are coupled with the connection units 20A respectively, such that the two light units 10A, the two connection units 20A and the extension member 30A form an elongated extending configuration. Then, the work light can be hung on the hood of the vehicle through the lock units 14A of the two light units 10A, such that the two light units 10A and the extension member 30A can provide sufficient illumination light for the engine compartment of the vehicle.

Figure 21:
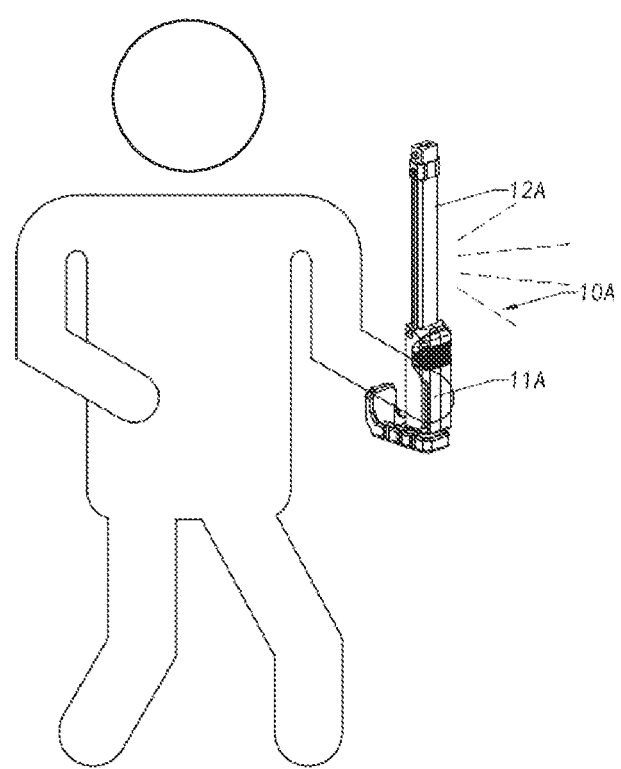
FIG. 21 illustrates a second application of the work light according to the above second preferred embodiment of the present invention.

FIG. 21 illustrates a second example of the work light according to the second embodiment, wherein two light units 10A are disassembled from the connection units 20A. Therefore, one of the light units 10A can be held by the user's hand as a portable light apparatus. Preferably, the power supply unit 11A of the light unit 10A forms a handle of the light unit 10A, such that the user is able to hold the power supply unit 11A to use the work light.

Referring to FIGS. 22 to 41 of the drawings, a work light according to a third embodiment of the present invention is illustrated, wherein the work light comprises at least two light units A10 and at least one connection unit A20 serving as a pivot unit, wherein the connection unit A20 is coupled between the light units A10, such that the light units A10 are coupled end-to-end are adapted to be pivotally rotated via the connection unit A20 to move between a folded position and an unfolded position. In other words, the work light can be switched between the folded position and the unfolded position.

In one example, there are three light units A10 and two connection units A20, wherein the light units A10 and the connection units A20 are coupled with each other and are located alternating with each other. In other words, every two of the light units A10 are connected by one connection unit A20. It is appreciated that in another example, there are two light units A10 and one connection unit A20. Likewise, there are four light units A10 and three connection units A20. Accordingly, the number of the light unit A10 and the connection unit A20 of the work light should not be limited.

Figure 22:
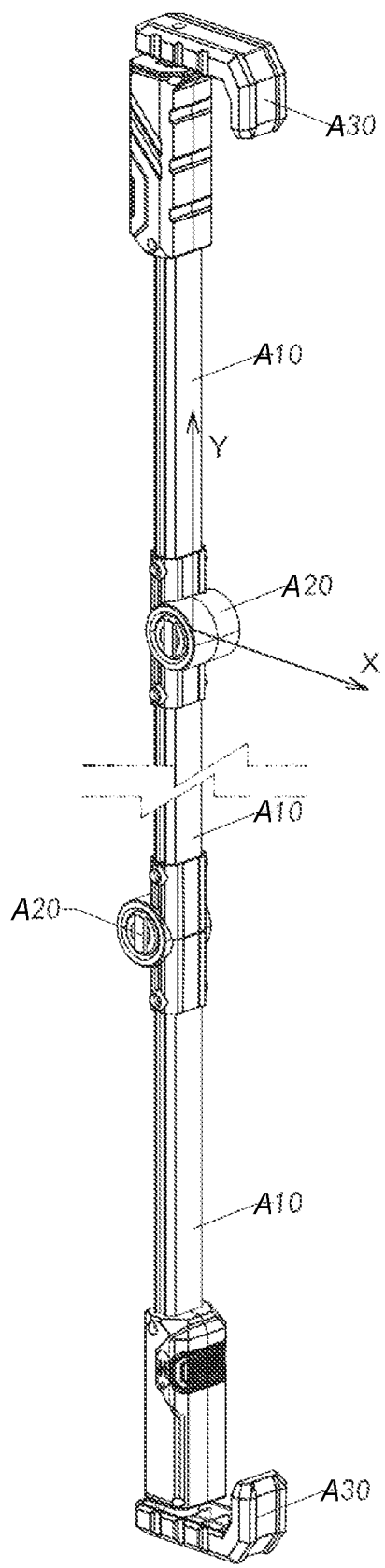
FIG. 22 is a perspective view of a work light according to a third preferred embodiment of the present invention, illustrating the work light at an unfolded position.

As shown in FIG. 22, when the work light is moved at the unfolded position, the two light units A10 are connected to the connection unit A20 as a common unit, wherein the light units A10 are extended from two ends of the connection unit A20. In other words, light units A10 are extended from the connection unit A20 at opposite directions to increase an illumination range of the work light. It is worth mentioning that, assumed that a folding angle between the two light units A10 connected to the connection unit A20 is α. Preferably, when the work light is in a fully unfolded position, α is 180°. In other words, when the work light is in a fully unfolded position, the light units A10 of the work light are aligned end-to-end at the same plane to form an elongated straight light configuration to maximize the illumination range of the work light. Preferably, according to the third embodiment, the illumination directions of the light units A10 are the same. In other word, when the work light is in a fully unfolded position, the light units A10 will generate the lights at the same direction (shown as the X direction in the figure). It is appreciated that the light units A10 of the work light are switched on for light generation when the work light is moved between the folded position and the unfolded position.

Figure 23:
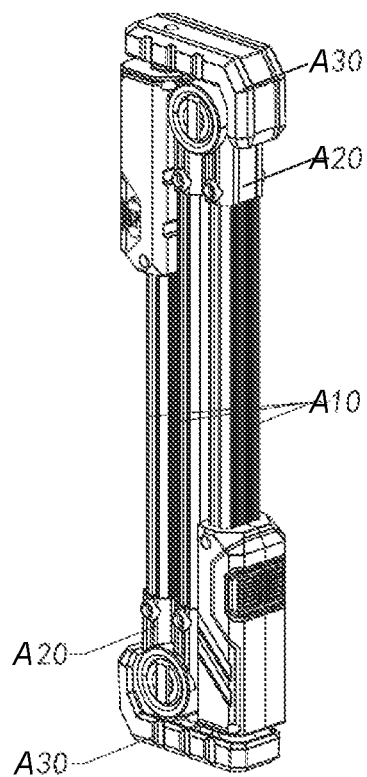
FIG. 23 is a perspective view of the work light according to the third preferred embodiment of the present invention, illustrating the work light at a folded position.

As shown in FIG. 23, when the work light is moved at the folded position, the two light units A10 are pivotally folded to overlap with each other via the connection unit A20, such that the overall length of the work light is reduced to allow the work light being easily carried and stored. It is worth mentioning that when the work light is in a fully folded position, the folding angle α between the two light units A10 connected to the connection unit A20 is 0°. In order to fold the work light is in the fully folded position, the light units A10 can be pivotally moved at a forward direction (the Y direction in the figure) at the same time or can be pivotally moved at a reverse direction (the opposite direction to the Y direction in the figure), so as to minimize the length of the work light for storage and carriage.

It is appreciated that according to the third embodiment, when the work light is moved from the folded position to the unfolded position, the folding angle α between the two light units A10 connected by the connection unit A20 is switched from 0° to 180°. In other words, the pivot movable angle of the connection unit A20 is between 0° to 180°.

The work light further comprises two lock units A30 coupled at the ends of the light units A10, wherein each of the lock units A30 is rotatable to move between a locked position A301 and an unlocked position A302.

Figure 24:
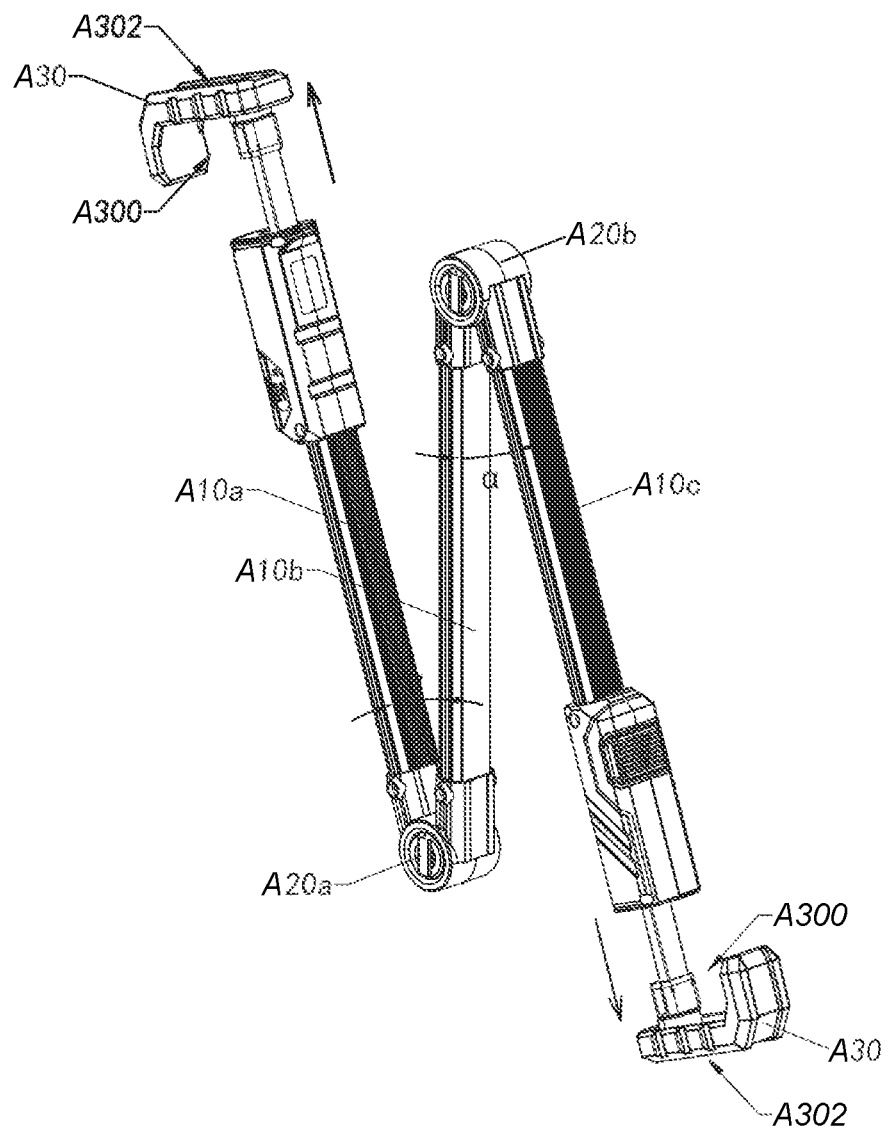
FIG. 24 is a perspective view of the work light according to the third preferred embodiment of the present invention, illustrating the work light at an unlocked position.
Figure 25:
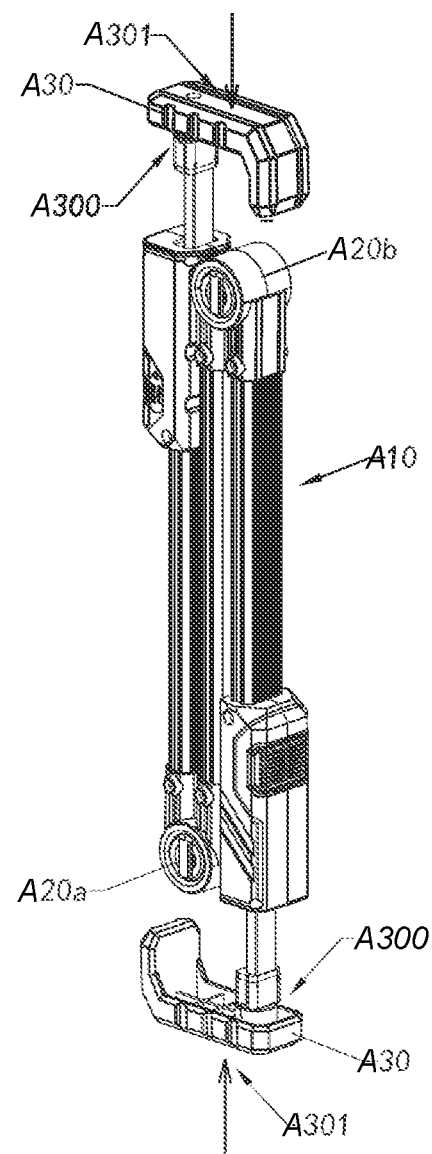
FIG. 25 is a perspective view of the work light according to the third preferred embodiment of the present invention, illustrating the work light at a locked position.

As shown in FIG. 24, the work light is moved to the folded position, wherein when the self lock unit A30 is rotated at the unlocked position A302, the work light is unlocked to allow the work light to move from the folded position to the unfolded position. As shown in FIG. 25, the work light is in the folded position, wherein when the self lock unit A30 is rotated at the locked position A301, the work light is locked at a position that the self lock unit A30 is coupled to the connection unit A20 to lock up the light unit A10 for locking the pivot movement of the connection unit A20 so as to prevent the work light from being unfolded. The self lock unit A30 of the work light is retractably coupled at the light unit A10, wherein the self lock unit A30 is arranged to outwardly extend from one end of the light unit A10 to extend the overall length of the work light. It is worth mentioning that when the work light is in the unfolded position or the unfolded position, the self lock unit A30 can be hung or hooked to an object, such as the hood of a vehicle.

The self lock unit A30 has at least one locking cavity A300, wherein in the locked position, the connection unit A20 is disposed at the locking cavity A300. In order to hang the work light at the object, the object is received at the locking cavity A300 of the self lock unit A30.

Figure 26:
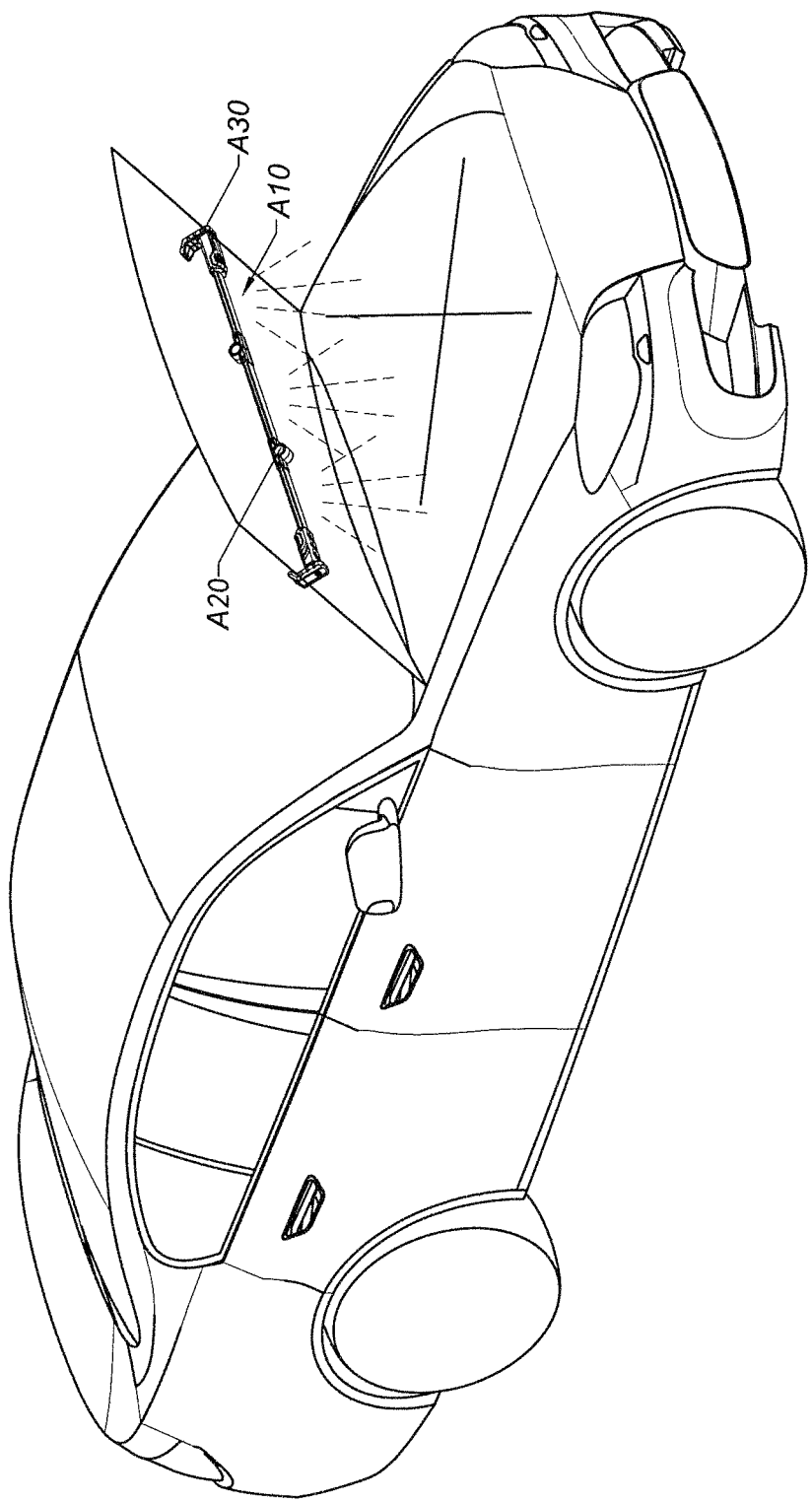
FIG. 26 illustrates a first application of the work light according to the third preferred embodiment of the present invention, illustrating the work light being horizontally suspended under a hood of a vehicle.
Figure 27:
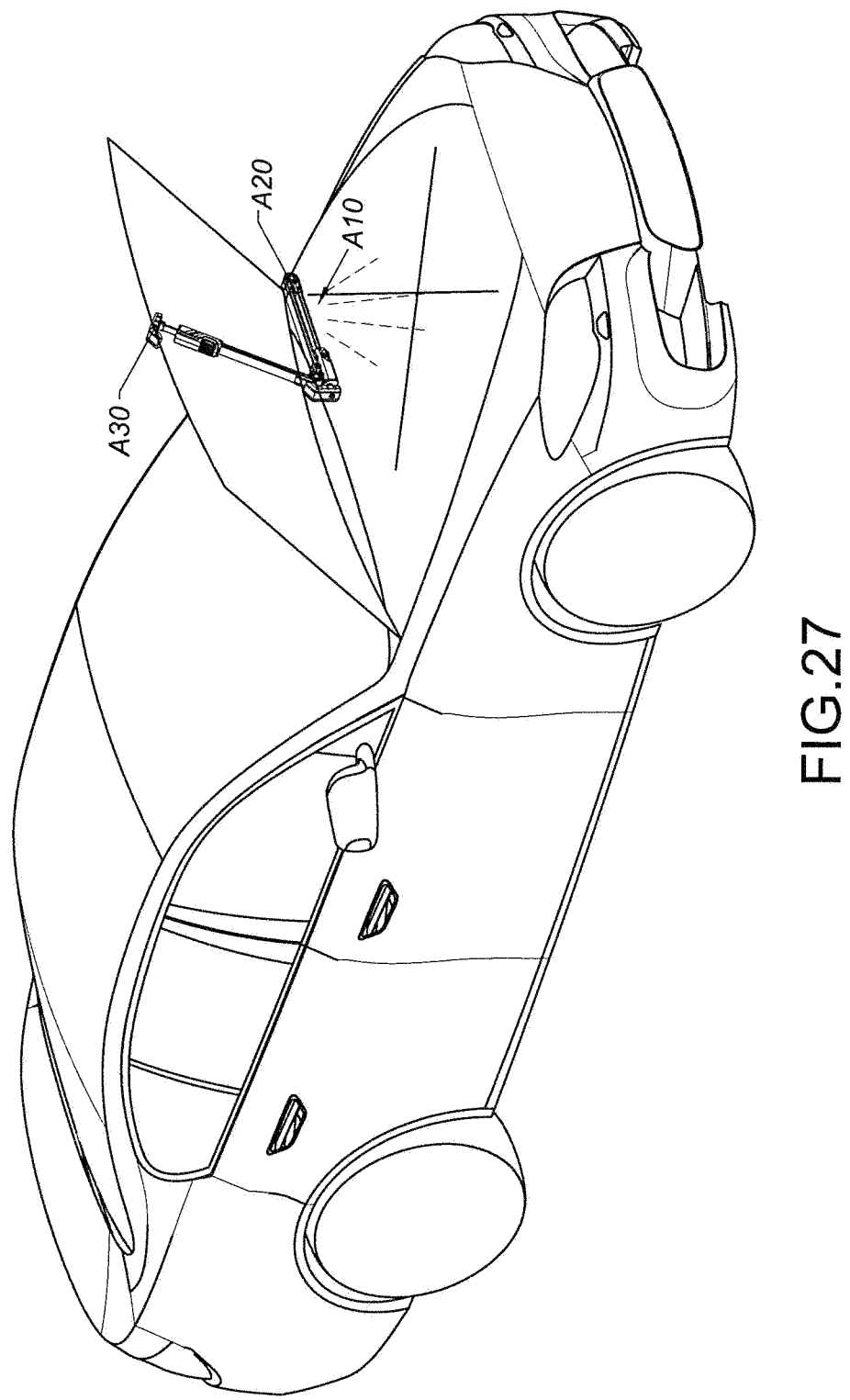
FIG. 27 is a perspective view of the work light according to the third preferred embodiment of the present invention, illustrating the work light being folded at a semi-expanded configuration and being suspended under the hood of the vehicle.

As shown in FIGS. 26 and 27, when the work light is in the unfolded position, the work light can be hung on two sides of the object, wherein the lock units A30 of the work light are outwardly extended from two ends of the light units respectively to selectively adjust the length of the work light for matching the width of the object, such as the hood of the vehicle, so as to couple the lock units A30 at two sides of the object. When the work light is in the semi-unfolded state, one of the lock units A30 of the work light is rotated to the unlocked position A302 to allow the work light to be hung on the hood of the vehicle.

Figure 28:
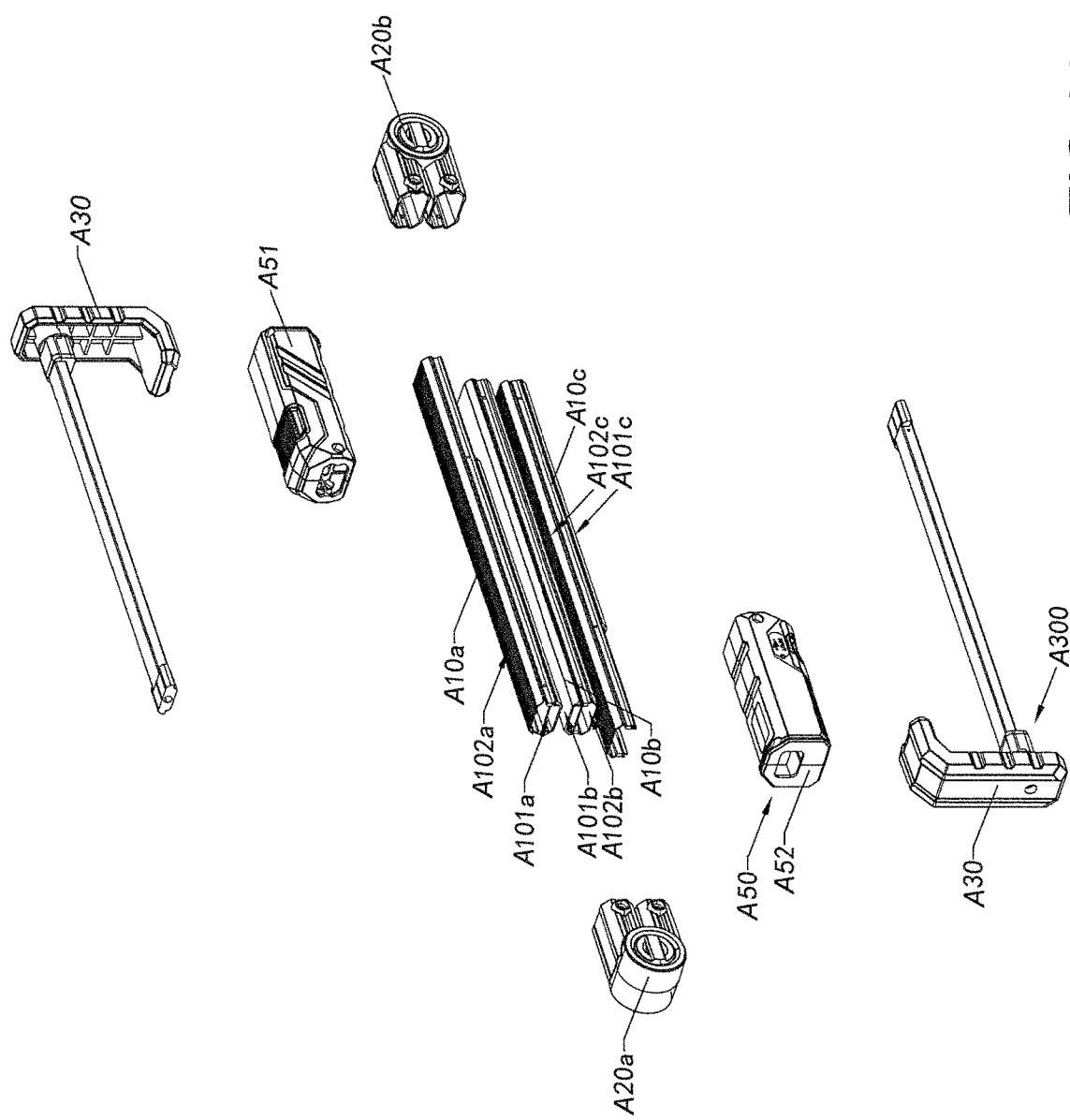
FIG. 28 is an exploded perspective view of the work light according to the third preferred embodiment of the present invention, illustrating the work light being exploded at the folded position.

It is worth mentioning that when the work lamp is in the folded state, the self lock unit A30 is rotated to the locked position A301, such that the self lock unit A30 is hooked at the connection unit A20 to receive the connection unit A20 at the locking cavity A300 of the lock unit 20. In other words, the self lock unit A30 of the work light is configured to lock up the connection unit A20 and the light unit A10 so as to self lock up of the work light. As shown in FIG. 28, the light unit A10 of the work light comprises a first light body A10a, a second light body A10b, and a third light body A10c. The connection unit A20 further comprises a first connector A20a as a first pivot member and a second connector A20b as a second pivot member. The first light body A10a and the second light body A10b are coupled with each other via the first connector A20a. The second light body A10b and the third light body A10c are coupled with each other via the second connector A20b. The light unit A10 further has a light emitting surface A101 and a backlight surface A102 positioned opposed to the light emitting surface A101, wherein the light unit A10 is arranged to generate the light outwardly penetrating through the light emitting surface A101. In other words, the light emitting surface A101 and the backlight surface A102 of the light unit A10 are located back to back. Preferably, the light emitting surfaces A101 of the first light body A10a, the second light body A10b and the third light body A10c are parallel to each other (as shown the X-axis direction in the figure). In other words, when the work lamp is in the unfolded position, the illumination directions of the light units A10 are parallel to each other It is worth mentioning that according to the preferred embodiment, the structural configurations of the first light body A10a, the second light body A10b and the third light body A10c are identical, wherein the structural and functional configurations of the light unit A10 are disclosed below. The structural configurations of the first connector A20a and the second connector A20b are identical, wherein the structural and functional configurations of the connection unit A20 are disclosed below.

Preferably, according to the preferred embodiment, the first connector A20a and the second connector A20b are coupled at two ends of the light unit A10, wherein the pivotal folding direction of the first connector A20a is opposite to the pivotal folding direction of the second connector A20b. Assumed that the pivotal folding direction of the first connector A20a is set as a forward direction, the pivotal folding direction of the second connector A20b is set as a reverse direction. In other words, when the work lamp is folded, the first light body A10a and the second light body A10b are folded to the illumination direction (the X-axis direction in the figure), such that when the work light is in the folded position, the light emitting surface A101a of the first light body A10a is directly opposite to the light emitting surface A101b of the second light body A10b. Accordingly, the second light body A10b and the third light body A10c are folded at the opposite direction of the illumination direction (opposite direction of the X-axis in the figure), such that when the work light is in the folded position, the backlight surface A102b of the second light body A10b is arranged to face the backlight surface A102c of the third light body A10c. In other words, when the work lamp is switched from the unfolded position to the folded position, the light unit A10 of the work lamp is folded into a tri-fold configuration. Accordingly, the first light body A10a is folded to overlap on the second light body A10b via the first connector A20a (along the X-axis direction in the figure), while the third light body A10c is folded to overlap on the second light body A10b via the second connector A20b (along the opposite direction of the X axis in the figure).

As shown in FIGS. 24 and 25, the lock units A30 are provided at one end of the first light body A10a and one end of the third light body A10c respectively. When the work light is moved in the folded position, the two lock units A30 are rotated in the locked position A301, such that the first connector A20a and the second connector A20b are received at the locking cavities A300 of the lock units A30 respectively, so as to lock up the pivotal movement of each of the first light body A10a and the third light body A10c. When the work light is moved in the folded position and when the two lock units A30 are rotated from the locked position A301 to the unlocked position A302, the lock units A30 are moved at a position that the first connector A20a and the second connector A20b are out of the locking cavities A300 of the lock units A30 respectively, such that the work light is unlocked for moving from the folded position to the unfolded position.

Figure 29:
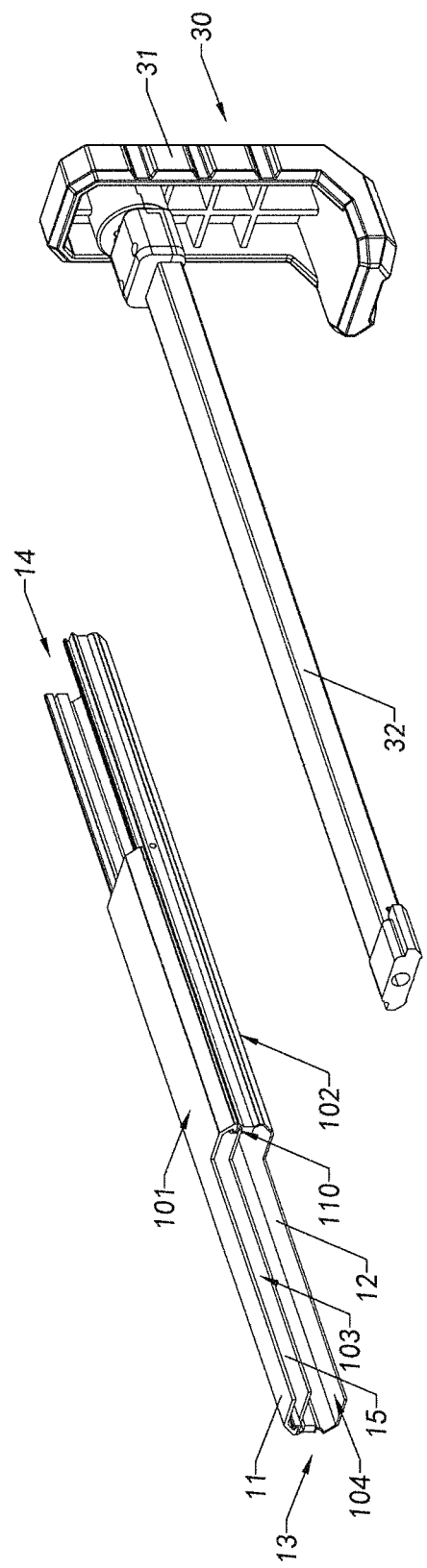
FIG. 29 is a perspective view of a light unit of the work light according to the third preferred embodiment of the present invention.
Figure 30:
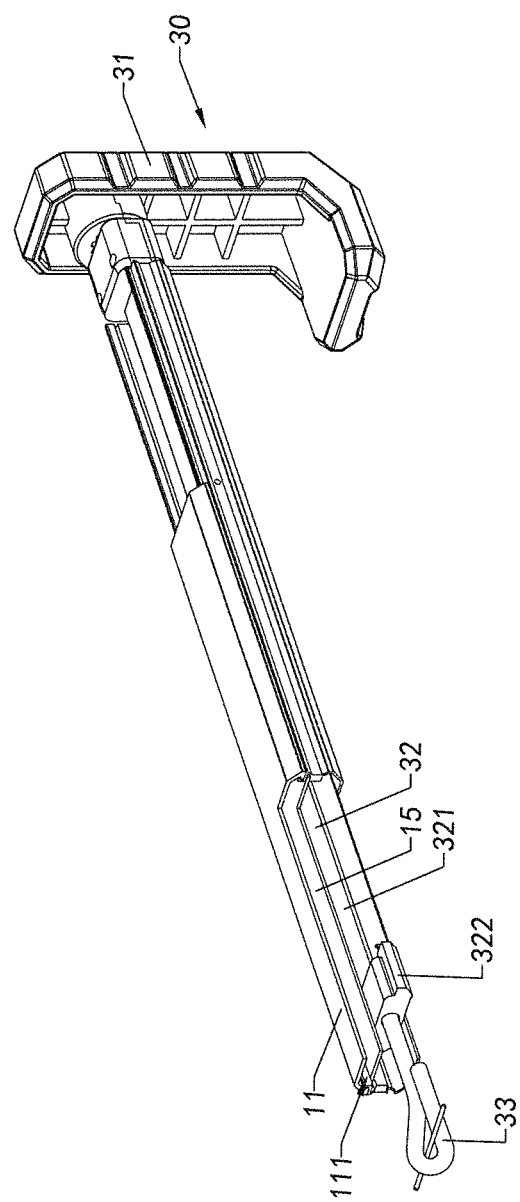
FIG. 30 is a perspective view of a light unit of the work light according to the third preferred embodiment of the present invention, illustrating the lock unit retractably coupled to the light unit.

As shown in FIGS. 29 and 30, the light unit A10 comprises an elongated light housing A11 and at least one light source A12 received in the light housing A11, wherein the light emitting surface A101 of the light unit A10 is formed at a surface of the light source A12 to enable the light emitting from the light source A12 to be projected out of the light emitting surface A101. The backlight surface A102 of the light unit A10 is formed at a surface of the light housing A11 at a position opposite to the light emitting surface A101, such that the light emitting surface A101 and the backlight surface A102 are positioned back to back. Preferably, according to the preferred embodiment of the present invention, the light source A12 of the light unit A10 is embodied as a LED light source, wherein the light source A12 is formed as a strip light or a light panel structure. It is appreciated that the shape of the light unit A10 and the type of the light source A12 are one of the examples in the present invention and should not be limited in the present invention. In other examples, the light unit A10 can be formed to have a cylindrical structure and the light source A12 can be embodied as an OLED light source.

The light unit A10 further has a front end A13 and an opposed rear end A14 extended from the front end A13, wherein the first connector A20a is pivotally coupled at the rear end A14 of the first light body A10a and at the front end A13 of the second light body 11b. In other words, the rear end A14 of the first light body A10a and at the front end A13 of the second light body 11b are pivotally coupled with each other via the first connector A20a. The second connector A20b is pivotally coupled at the rear end A14 of the second light body A10b and at the front end A13 of the third light body 11c. In other words, the rear end A14 of the second light body A10b and at the front end A13 of the third light body 11c are pivotally coupled with each other via the second connector A20b. One of the lock units A30 is coupled at the front end A13 of the first light body A10a while another self lock unit A30 is coupled at the rear end A14 of the third light body A10c.

Preferably, the light source A12 of the light unit A10 is detachably coupled at the light housing A11. Preferably, the light source A12 is fastened to the upper end of the light housing A11 of the light unit A10.

The light unit A10 further has at least a light cavity A103 formed between the light source A12 and the light housing A11 when the light source A12 and the light housing A11 are coupled with each other. It is worth mentioning that electronic components such as electrical wires or conductive wires for electrically connecting configuration of the light unit A10 are arranged in the light cavity A103 of the light unit A10. The light unit A10 further comprises a partition wall A15 coupled at the light housing A11 to form a retractable chamber A104 between the partition wall A15 and the light housing A11, wherein the partition wall A15 is formed between the light cavity A103 and the retractable chamber A104. Accordingly, the self lock unit A30 is retractably coupled at the retractable chamber A104 of the light unit A10.

Correspondingly, the light housing A11 further has two symmetrical partition mounting grooves A110, wherein two sides of the partition wall A15 are engaged with the partition mounting grooves A110 respectively to retain the partition wall A15 in position, so as to ensure the self lock unit A30 being slidably moved along the retractable chamber A104.

Figure 32B:
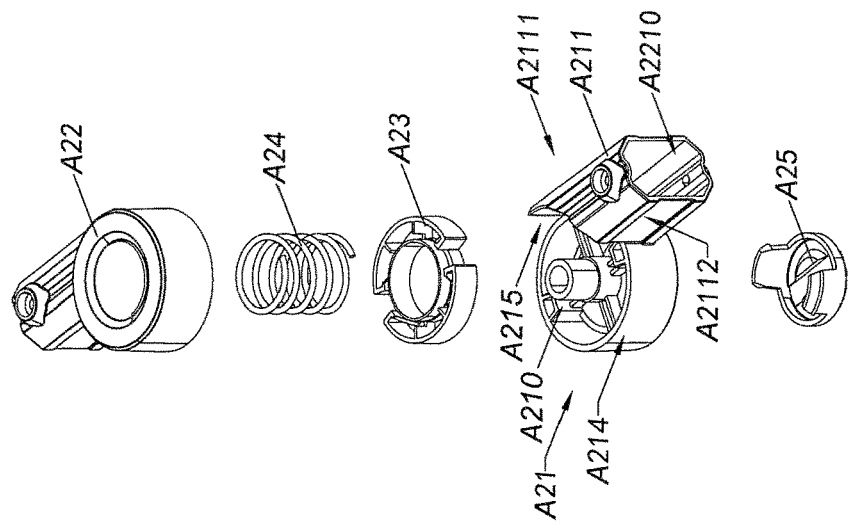
FIGS. 32A and 32B are perspective views of the connection unit of the work light according to the third preferred embodiment of the present invention.
Figure 32A:
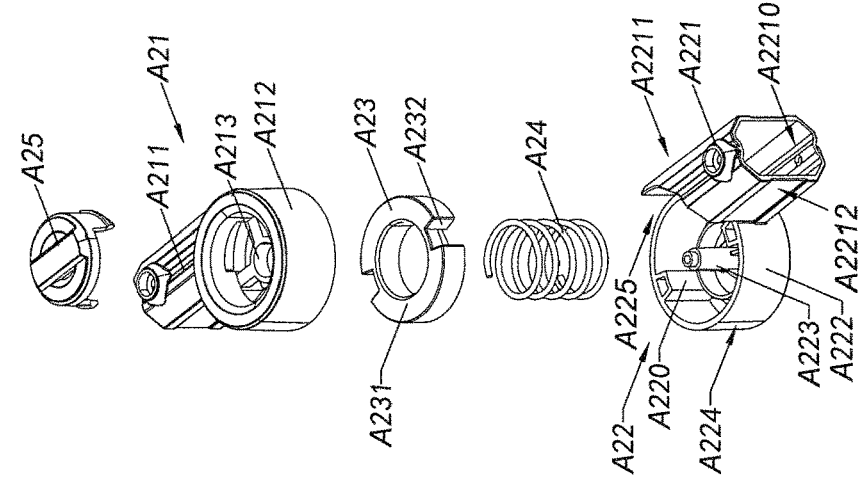
Figure 31:
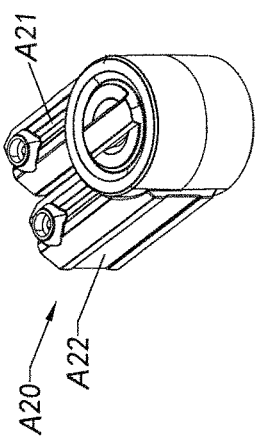
FIG. 31 is a perspective view of a connection unit of the work light according to the third preferred embodiment of the present invention, illustrating the connection unit serving as a pivot joint to allow the work light moving between the folded position and the unfolded position.
Figure 33:
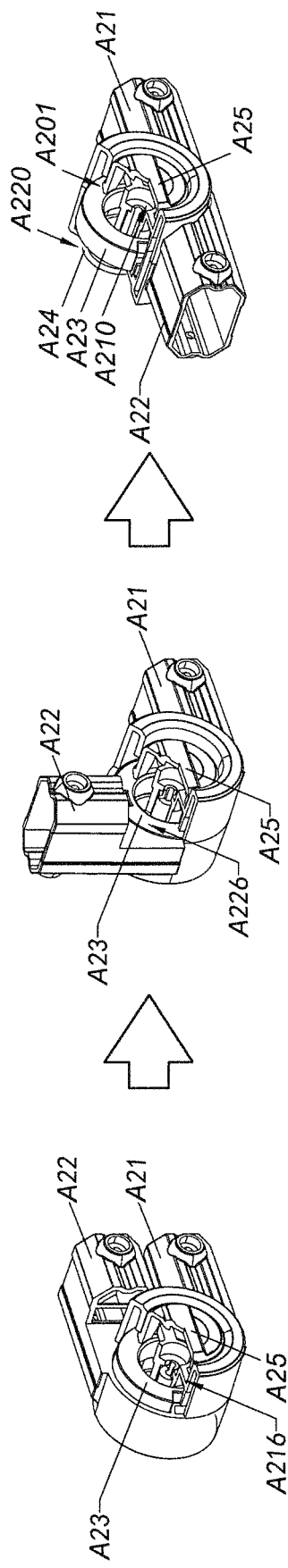
FIG. 33 is a sectional perspective view of the connection unit of the work light according to the third preferred embodiment of the present invention, illustrating the connection unit serving as a pivot joint to allow the work light moving between the folded position and the unfolded position.
Figure 34:
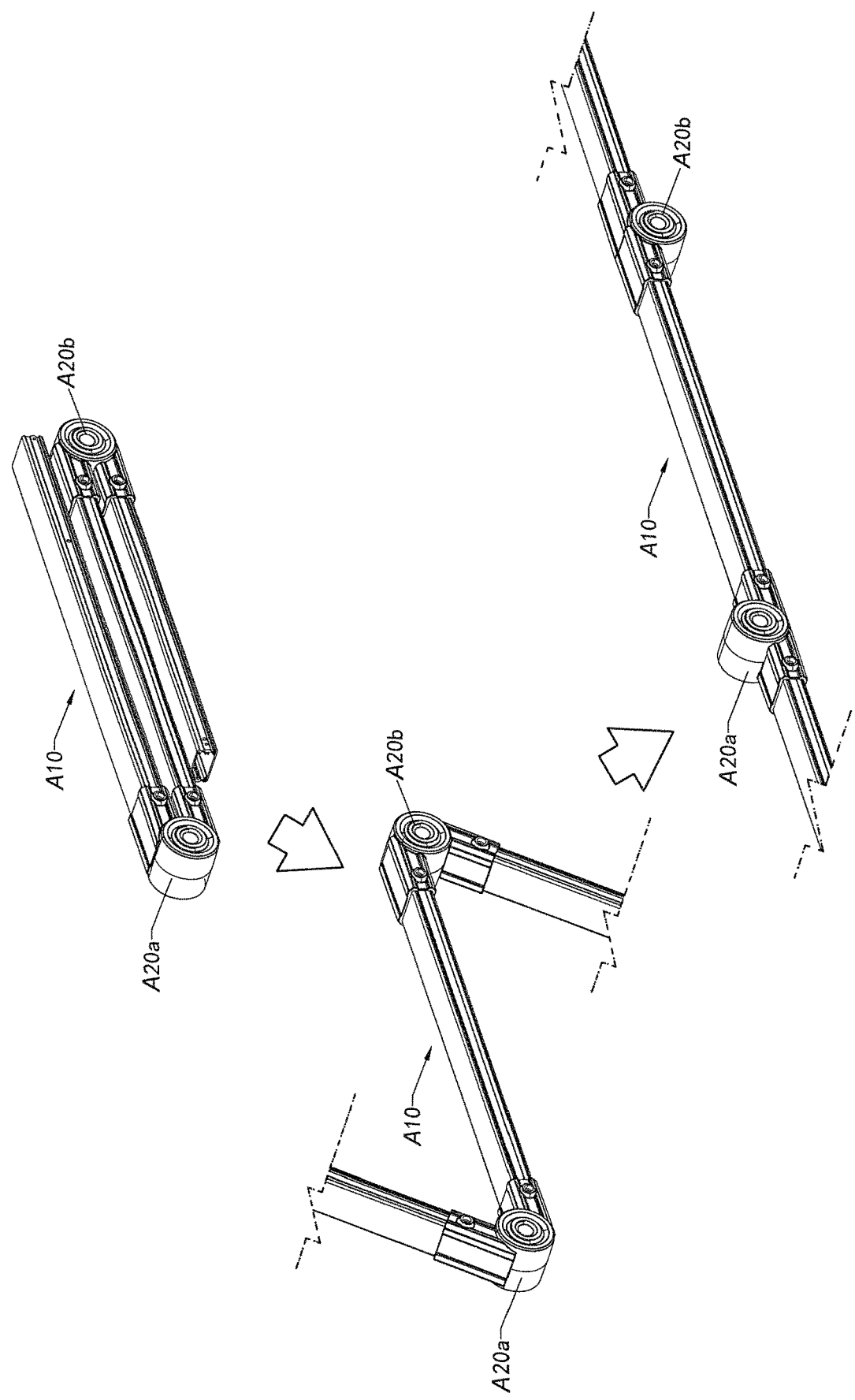
FIG. 34 is a perspective view illustrating the work light moving between the folded position and the unfolded position according to the third preferred embodiment of the present invention.

As shown in FIGS. 31 to 33, the connection unit A20 comprises a first rotatable member A21, a second rotatable member A22, and a stopper member A23, wherein the first rotatable member A21 is coupled to the second rotatable member A22 to form a stopper member cavity A201. The stopper member A23 is movably disposed at the stopper member cavity A201 of the connection unit A20. The two light units A10 are coupled at the first rotatable member A21 and the second rotatable member A22 respectively, wherein when the first rotatable member A21 and the second rotatable member A22 are rotated with each other, the two light units A10 are pivotally moved via the connection unit A20 so as to enable the light units A10 being pivotally folded and unfolded.

The first rotatable member A21 further comprises a first stopper A210 while the second rotatable member A22 further comprises a second stopper A220 corresponding to the first stopper A210. The first stopper A210 of the first rotatable member A21 and the second stopper A220 of the second rotatable member A22 are coupled with each other to form the stopper member cavity 201. The stopper member A23 of the connection unit A20 is movably disposed at the stopper member cavity 201 of the connection unit A20. When the stopper member A23 is located between the first stopper A210 of the first rotatable member A21 and the second stopper A220 of the second rotatable member A22, the first rotatable member A21 and the second rotatable member A22 are locked by the stopper member A23 to block a rotation movement between the rotatable member A21 and the second rotatable member A22, such that the connection unit A20 is in a non-rotatable position. When the stopper member A23 is moved to the first stopper A210 of the first rotatable member A21, the stopper member A23 is driven to rotate by the first rotatable member A21 when the first rotatable member A21 and the second rotatable member A22 are rotated with each other, such that the connection unit A20 is in a rotatable position. Likewise, when the stopper member A23 is moved to the second stopper A220 of the second rotatable member A22, the stopper member A23 is driven to rotate by the second rotatable member A22 when the first rotatable member A21 and the second rotatable member A22 are rotated with each other, such that the connection unit A20 is in a rotatable position.

Preferably, according to the preferred embodiment of the present invention, when the stopper member A23 is pushed to engage with the second stopper A220 of the second rotatable member A22, the stopper member A23 is disengaged with the first stopper A210 of the first rotatable member A21, such that the stopper member A23 is synchronously rotated with the second rotatable member A22.

Preferably, the stopper member A23 comprises a stopper body A231 and at least one tooth groove A232 formed at an outer circumferential surface of the stopper body A231. Accordingly, each of the first stopper A210 of the first rotatable member A21 and the second stopper A220 of the second rotatable member A22 is formed as a gear-shaped groove to engage with the stopper member A23. Correspondingly, the first stopper A210 of the first rotatable member A21 has a plurality of fixed gear positions, wherein when the stopper member A23 is engaged with the first stopper A210 of the first rotatable member A21, the tooth groove A232 of the stopper member A23 is engaged at one of the fixed gear positions of the first rotatable member A21 to retain the connection unit A20 in a non-rotatable position, so as to prevent any pivotal movement between the two light units A10 via the connection unit A20 and to retain the light units in position. It is appreciated that the work light can be switched at different working positions between the folded position and the unfolded position, i.e. the work light can be moved and locked at different working positions between the folded position and the unfolded position, wherein the connection unit A20 can be locked at different working positions with respect to the fixed gear positions, so as to securely retain the work light in any working position and to prevent the work light being folded or unfolded accidentally.

In one example of the preferred embodiment of the present invention, the connection unit A20 can be pivotally moved and locked at every 10° from the folded position to the unfolded position to provide different working positions. In other words, the first rotatable member A21 and the second rotatable member A22 of the connection unit A20 can be rotated and locked at every 10° from the folded position to the unfolded position, so as to retain the two light units A10 at a predetermined angle therebetween via the connection unit A20. Therefore, the work light can be selectively locked and retained at different desired working positions to provide different illumination configurations at different working environments. It is appreciated that the working positions of the work light via the connection unit A20 is merely an example and should not be limited in the present invention. In another example, the connection unit A20 can be used for locking the light units A10 of the work light in an adjusting manner.

The connection unit A20 further comprises a resetting element A24 coupled at the second stopper A220 of the second rotatable member A22 and a push button A25 coupled at the first rotatable member A21. Accordingly, the stopper member A23 defines a stop position and a rotate position, wherein when the stopper member A23 at the stop position, i.e. the stopper member A23 is located between the first stopper A210 of the first rotatable member A21 and the second stopper A220 of the second rotatable member A22, the first rotatable member A21 and the second rotatable member A22 are locked to prevent any rotatable movement therebetween. It is worth mentioning that the resetting element 305 is arranged to apply a resilient force to push the stopper member A23 at the stop position, wherein the push button A25 is movably coupled at the first rotatable member A21 to move the stopper member A23 from the stop position to the rotate position, so as to unlock the connection unit A20.

The first rotatable member A21 comprises a first connecting arm A211, a first rotating body A212, and a first rotating shaft A213, wherein the first rotating shaft A213 and the first connecting arm A211 are coupled at the first rotating body A212. The light unit A10 is coupled at the first connecting arm A211 of the first rotatable member A21. The second rotatable member A22 comprises a second connecting arm A221, a second rotating body A222, and a second rotating shaft A223, wherein the second rotating shaft A223 and the second connecting arm A221 are coupled at the second rotating body A222. Another light unit A10 is coupled at the second connecting arm A221 of the second rotatable member A22. The first stopper A210 is formed on the first rotating body A212 of the first rotatable member A21 while the second stopper A220 is formed on the second rotating body A222 of the second rotatable member A22, wherein when the first rotating body A212 of the first rotatable member A21 and the second rotating body A222 of the second first rotatable member A22 are coupled with each other, the first rotating shaft A213 and the second rotating shaft A223 are coaxially aligned with each other and are rotatably coupled with each other so as to allow the rotatable movement between the first rotatable member A21 and the second rotatable member A22.

Preferably, the first connecting arm A211 of the first rotatable member A21 is extended with respect to the second connecting arm A221 of the second rotatable member A22, such that when the work light is moved at the folded position, the light units A10 coupled at the first connecting arm A211 of the first rotatable member A21 and the second connecting arm A221 of the second rotatable member A22 are moved side by side without blocking with each other. It is appreciated that when the work light is moved at the folded position, the light units A10 are pivotally folded to overlap with each other so as to reduce the overall size of the work light for carrying and storing.

Preferably, according to the preferred embodiment, the first rotating shaft A213 has a diameter size larger than a diameter size of the second rotating shaft A223, wherein the second rotating shaft A223 is sleeved in the first rotating shaft A213 to form a rotatable shaft of the connection unit A20 so as to ensure the first rotatable member A21 and the second first rotatable member A22 being rotatably coupled with each other. It is appreciated that the first rotatable member A21 and the second first rotatable member A22 can be rotatably coupled with each other via a screw. The stopper member A23 is movably coupled at the first rotating shaft A213 of the first rotatable member A21 and is pulled to retain at the stop position by the resilient force of the resetting element A24. Accordingly, when the push button A25 is actuated to push the stopper member A23, the stopper member A23 is moved from the stop position to the rotate position along the first rotating shaft A213.

The first connecting arm A211 has a first connecting cavity A2110 while the second connecting arm A221 has a second connecting cavity A2210, wherein the front end A13 or the rear end A14 of the light unit A10 is securely received in the first connecting cavity A2110 of the first connecting arm A211 or the second connecting cavity A2210 of the second connecting arm A221. The first rotatable member A21 further has a first convex surface A214 formed on the first rotating body A212 and a first concave surface A215 formed on the first connecting arm A211. The second rotatable member A22 further has a second convex surface A224 formed on the second rotating body A222 and a second concave surface A225 formed on the second connecting arm A221. The first convex surface A214 of the first rotatable member A21 is facing toward the second concave surface A225 of the second rotatable member A22. The second convex surface A224 of the second rotatable member A22 is facing toward the first concave surface A215 of the first rotatable member A21. Therefore, the first rotatable member A21 and the second rotatable member A22 are coaxially and rotatably coupled with each other. Preferably, according to the preferred embodiment of the present invention, the first rotating body A212 of the first rotatable member A21 and the second rotating body A222 of the second rotatable member A22 are formed in cylindrical structures, such that the first convex surface A214 of the first rotatable member A21 and the second convex surface A224 of the second rotatable member A22 are defined at outer circumferential surfaces thereof. Preferably, the first rotating body A212 and the first connecting arm A211 are integrated with each other to form an integrated structure, while the second rotating body A222 and the second connecting arm A221 are integrated with each other to form another integrated structure.

The first connecting arm A211 has a first upper surface A2111 and a first lower surface A2112, wherein the first upper surface A2111 and the first lower surface A2112 are positioned back to back. The second connecting arm A221 has a second upper surface A2211 and a second lower surface 2212, wherein the second upper surface A2211 and the second lower surface A2212 are positioned back to back. The first upper surface A2111 of the first connecting arm A211 is extended tangentially to the first convex surface A214 of the first rotatable member A21. The second upper surface A2211 of the second connecting arm A221 is extended tangentially to the second convex surface A224 of the second rotatable member A22. Therefore, when the first rotatable member A21 and the second rotatable member A22 of the connection unit A20 are rotated at the unfolded position, the first connecting arm A211 and the second connecting arm A221 are biased against each other to block the further rotational movement of the connection unit A20. It is appreciated that when the first connecting arm A211 and the second connecting arm A221 are biased against each other, i.e. when the work light is moved in a fully unfolded or fully expanded position, the first connecting arm A211 of the first rotatable member A21 and the second connecting arm A221 of the second rotatable member A22 are rotated to align with each other and an angle therebetween is 180°. In other words, the two light units A10 are extended from the connection unit A20 at the opposite directions, so as to maximize the overall length of the work light and the illumination range thereof when the work light is moved at the fully unfolded or fully expanded position. In other words, when the work light is moved in the unfolded position, the first connecting arm A211 and the second connecting arm A221 are extended in opposite directions, wherein the upper surface A2111 of the first connecting arm A211 is extended in parallel and opposite to the upper surface 2121 of the second connecting arm A221. When the work light is moved in the folded position, the first connecting arm A211 and the second connecting arm A221 are extended at the same direction, wherein the lower surface A2112 of the first connecting arm A211 and the lower surface 2122 of the second connecting arm 212 are facing each other.

Preferably, according to preferred embodiment of the present invention, an arc angle corresponding to the first concave surface A215 of the first rotatable member A21 and the second concave surface A225 of the second rotatable member A22 is approximately 90° or slightly less than 90°. In other words, the diameter of the first rotating body A212 of the first rotatable member A21 is doubled the thickness of the first connecting arm A211. Therefore, when the work lamp is moved in the folded position, the backlight surfaces A102 (or light emitting surfaces A101) of the two light units A10 connected by the connection unit A20 can be overlapped with each other.

As shown in FIG. 33, the first rotatable member A21 of the connection unit A20 further has a first wire slot A216 communicatively extended from the first connecting cavity A2110 of the first connecting arm A211 to the first stopper A210. The second rotatable member A22 of the connection unit A20 further has a second wire slot 226 communicatively extended from the second connecting cavity A2210 of the second connecting arm A221 to the second stopper A220. It is appreciated that the connection wires connecting the two light units A10 at the connection unit A20 can be extended from the first connecting cavity A2110 of the first connecting arm A211 to the first stopper A210 through the first wire slot A216. Then, the connection wires can further pass through the second wire slot A226 from the second stopper A220 to the second connecting cavity A2210 of the second connecting arm A221, so as to electrically connect the two light units A10 with each other.

As shown in FIGS. 34 to 37, the self lock unit A30 comprises a locking body A31 and a retractable arm A32 extended from the locking body A31, wherein the retractable arm A32 is retractably coupled at the light housing A11 of the light unit A10. Accordingly, the retractable arm A32 is pulled by the locking body A31 is move in and out from the retractable chamber A104 of the light unit A10 to selectively adjust a hook length of the retractable arm A32 defined as a distance between the locking body A31 and the light unit A10 for hooking at the object. As shown in FIG. 26, when the engine of the vehicle is required for being inspected or repaired, the locking bodies A31 of the lock units A30 at two ends of the work lamp are pulled outwardly, such that the retractable arms A32 of the lock units A30 are pulled out from the retractable chambers A104 of the light units A10 to adjust the look length between the locking bodies A31 matching with the width of the hood, so as to hook the locking bodies A31 at two sides of the hood for hanging the work light thereat.

Accordingly, the locking body A31 is pivotally coupled at the retractable arm A32, wherein the locking body A31 comprises a rotating shaft rotatably coupled at the retractable arm A32 to enable the locking body A31 being rotated with respect to the retractable arm A32. Preferably, the locking body A31 can be freely rotated with respect to the rotation axis, i.e. the locking body A31 can be rotated 360° at the end of the retractable arm A32 to adjust the angle and position of the locking cavity A300.

The retractable arm A32 is retractably coupled at the retractable chamber A104 of the light unit A10, wherein the retractable arm A32 is adapted to be reciprocately moved along the retractable chamber A104 of the light unit A10. Furthermore, the retractable arm A32 comprises a retractable element A321 and a slider A322 coupled at one end of the retractable element A321 to restrict a displacement of the retractable element A321. The retractable element A321 further has a traction end A3211 and a sliding end A3212 extending from the traction end A3211, wherein the slider A322 is coupled at the sliding end A3212 of the retractable element A321. The sliding end A3212 of the retractable element A321 is coupled to the locking body A31 of the self lock unit A30.

The slider A322 is pulled by the locking body A31 to move synchronously with the retractable element A321 via the traction end A3211 of the retractable element A321. The light housing A11 further comprises a sliding rail A111 inwardly protruded from an inner wall of the retractable chamber A104 of the light unit A10.

The self lock unit A30 further comprises at least one traction unit A33 retractably coupled at the retractable element A321 of the self lock unit A30 and the light housing A11 of the light unit A10. When the traction unit A33 is retracted, the retractable element A321 of the self lock unit A30 is pulled by the traction unit A33, such that the locking body A31 of the self lock unit A30 is pulled for hooking on the object.

Preferably, the traction unit A33 has one end coupled at the sliding end A3212 of the retractable element A321 and an opposed end is coupled at the front end A13 or the rear end A14 of the light unit A10. Preferably, according to preferred embodiment of the present invention, the traction unit A33 of the self lock unit A30 can be, but not limited to, embodied as an elastic element such as elastic rubber band, springs, or tension belt.

Figure 35:
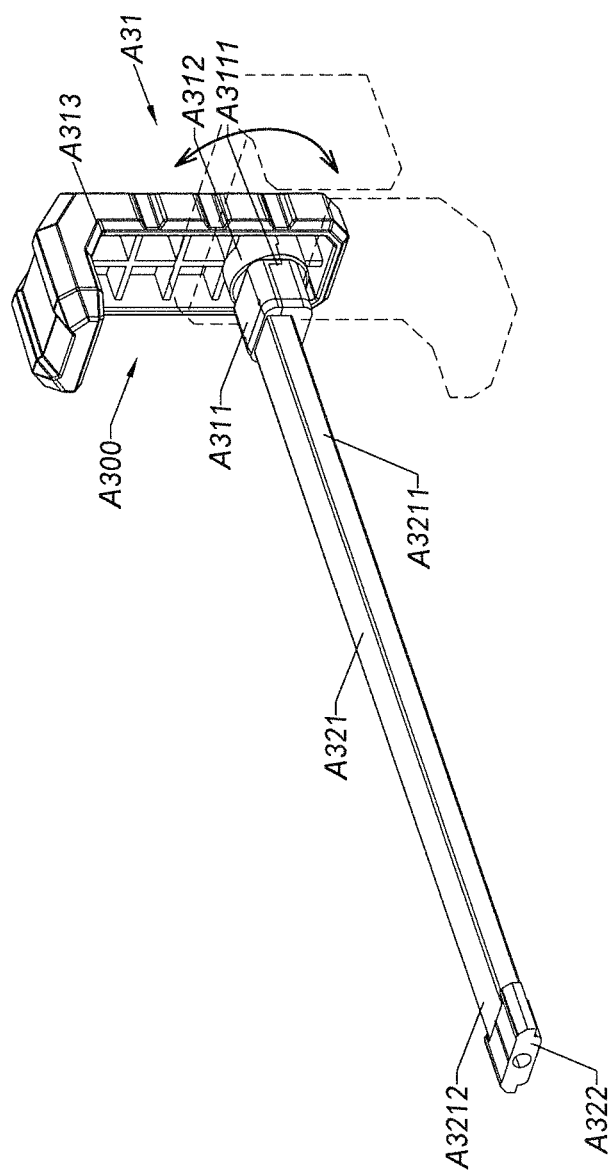
FIG. 35 is a perspective view illustrating a rotatable movement of the lock unit of the work light according to the third preferred embodiment of the present invention.
Figure 36:
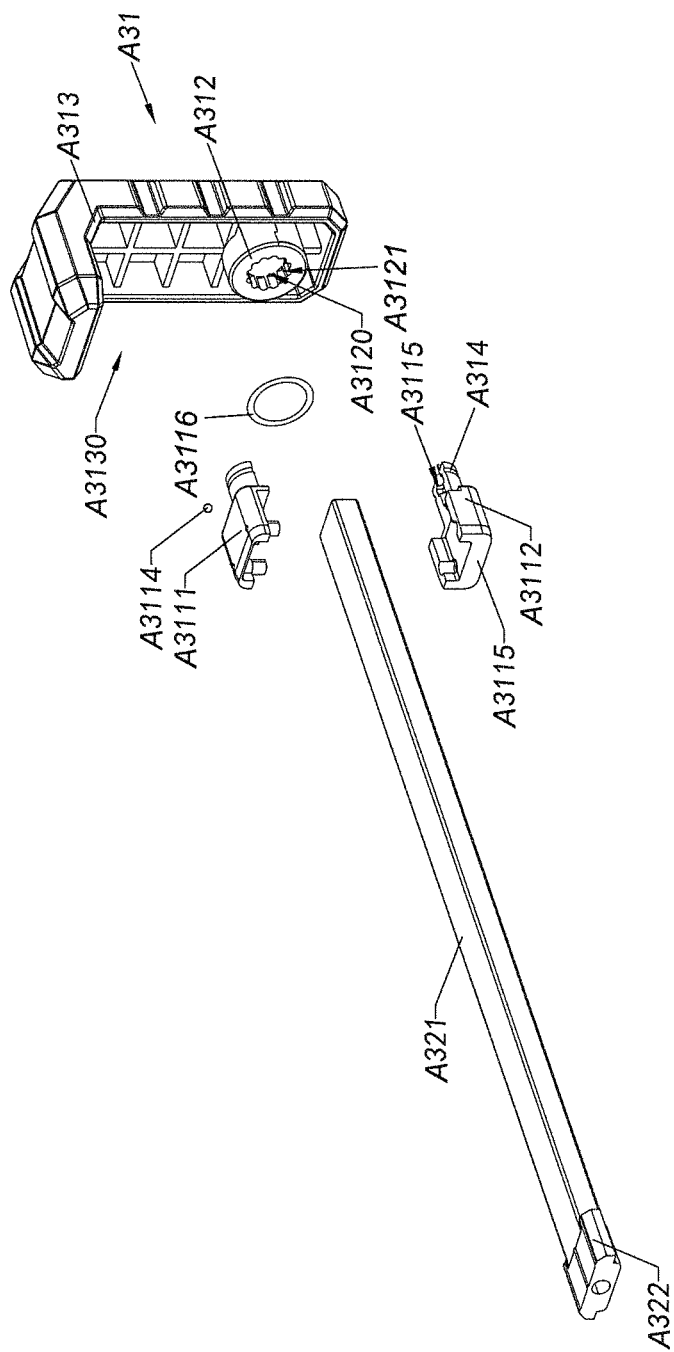
FIG. 36 is an exploded perspective view of the lock unit of the work light according to the third preferred embodiment of the present invention.
Figure 37:
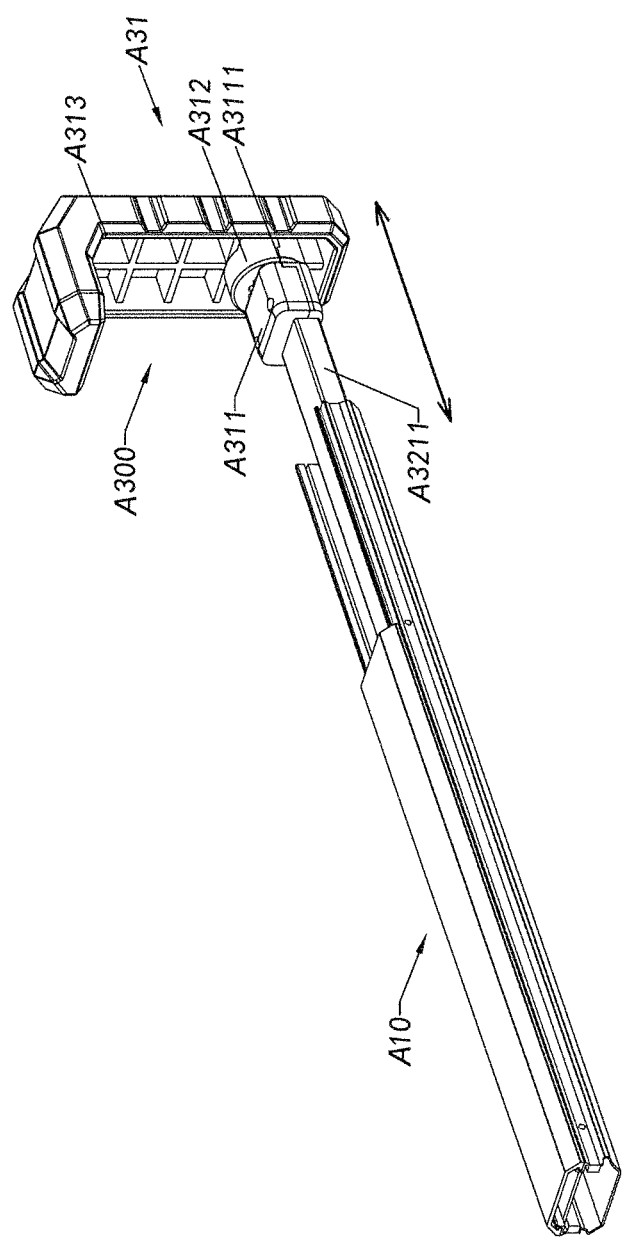
FIG. 37 is a perspective view illustrating a retractable movement of the lock unit of the work light according to the third preferred embodiment of the present invention.

As shown in FIG. 35, the locking body A31 of the self lock unit A30 is pivotally coupled to the retractable arm A32. The locking body A31 comprises a retainer A311, a rotating member A312, and a hooking member A313 extended from the rotating member A312. The rotating member A312 is pivotally coupled to the retainer A311 to allow the rotating member A312 and the retainer A311 being rotated with each other. The retainer A311 of the self lock unit A30 is coupled to the retractable element A321, such that the locking body A31 of the self lock unit A30 is pivotally coupled at the retractable arm A32.

The retainer A311 further comprises a first retaining member A3111, a second retaining member A3112, an elastic element A3113 coupled to the first retaining member A3111 and the second retaining member A3112, and at least one limiting element A3114. The first retaining member A3111 and the second retaining member A3112 are coupled at, preferably by clamping, the traction end A3211 of the retractable element A321. Preferably, the first retaining member A3111 and the second retaining member A3112 are coupled by screws.

The retainer A311 further has a fixing end A3115 coupled to the traction end A3211 of the retractable element A321, and a pivoting end A3116 extended from the fixing end A3115, wherein the pivoting end A3116 is configured to have a cylindrical structure and is rotatably coupled at the rotating member A312.

The rotating member A312 has a rotating slot A3120, wherein the retainer A311 is disposed at the rotating slot 3120 of the rotating member A312, such that the retainer A311 is adapted to be rotated relative to the rotating member A312 at the rotating slot A3120 thereof. Furthermore, the rotating member A312 further has a plurality of gear slots A3121 indented around a surrounding wall of the rotating slot A3120, wherein the retainer A311 is adapted to engage with the gear slots A3121 of the rotating member A312 to allow the self lock unit A30 locking up the light unit A10 of the work light at a current illumination angle or direction.

It is appreciated that once the work light is hung at the object, the user is able to fold the light unit A10 or the connection unit A20 to rotate the retainer A311 of the self lock unit A30, so as to drive the retainer A311 to rotate at the rotating member A312 relatively. It is appreciated that the user is able to adjust the relative rotation angle between the retainer A311 and the rotating member A312 of the self lock unit A30 so as to adjust the illumination angle of the light unit A10 of the work light. Accordingly, the light unit A10 of the work light can be rotated 360° to adjust the illumination angle and the illumination direction of the work light according to the actual use or the application.

It is appreciated that the connection unit A20 is configured not only to connect the light units A10 with each other but also to enable the light units A10 to move between the folded position and the unfolded position so as to adjust the illumination range of the light units A10. The self lock unit A30 is configured to enable the light unit A10 to freely rotate in an axial direction, so as to adjust the illumination angle of the light unit A10. In other words, the work light can selectively adjust its illumination range and illumination angle according to the actual use so as to enhance the practical use of the work light.

The retainer A311 further comprises at least one spring groove A3115 formed on at least one of first retaining member A3111 and the second retaining member A3112, wherein the elastic element A3113 is engaged with the spring groove A3115. The limiting element A3114 is retractably coupled at the spring groove A3115, wherein the limiting element A3114 is pushed by the elastic element A3113 to engage with the gear slots 3121, so as to limit the relative movement between the retainer A311 and the rotating member A312 by the limiting element A3114. It is appreciated that when the self lock unit A30 is driven to rotate, the limiting element A3114 is squeezed at the gear slots A3121 to retract back to the spring groove A3115, so as to allow the limiting element A3114 to be switched to another position of the gear slots A3121. In other words, when the self lock unit A30 is rotated at another angle, the position of the light unit A10 is remained unchanged even the light unit A10 is rotated at different angles.

Preferably, according to the preferred embodiment of the present invention, the elastic element A3113 is embodied as a spring, and the limiting element A3114 is embodied as a spherical steel ball. It is appreciated that the elastic element A3113 and the limiting element A3114 can be embodied as different elements having the same functions, such that they should not be limited in the present invention.

The locking body A31 further comprises at least one friction element A314 disposed at the outer circumferential surface of the retainer A311 at a position between the retainer A311 and the inner wall of the rotating member A312, wherein when the rotating member A312 is rotated with respect to the retainer A311 of the locking body A31, the friction element A314 is configured to provide a friction between the retainer A311 and the rotating member A312 to slow down a rotational speed of the rotating member A312 at the retainer A311.

The rotating member A312 has a mounting through slot A3120, wherein the retainer A311 is coupled to the rotating member A312 through the mounting through slot A3120 via a fastener, such as a screw. Therefore, the retainer A311 and the rotating member A312 are rotatably coupled with each other to prevent the rotating member A312 being detached from the retainer A311 accidentally.

The hooking member A313 has a hooking opening A3130 communicating with the locking cavity A300 of the self lock unit A30, wherein the object, such as a side edge of the hood, is received at the locking cavity A300 through the hooking opening A3130, so as to hang the work light at the object.

Preferably, the rotating member A312 and the hooking member A313 are integrated to form an integral structure, wherein by rotating the locking body A31, the opening direction of the hooking opening A3130 of the hooking member A313 is adjusted to adjust the orientation of the locking cavity A300 of the self lock unit A30.

As shown in FIG. 28, the work light further comprises at least one power supply unit A40 and at least one handle A50, wherein the power supply unit A40 is disposed in the handle A50 to electrically connect to the light unit A10, such that the light unit A10 is electrically powered by the power supply unit A40. The handle A50 is coupled at one end of the light unit A10 for the user to grip and operate the work light, such as rotating, adjusting the illumination angle, folding the work light.

The handle A50 is coupled at the end of the light unit A10 to affix the power supply unit A40 and to restrict the lock unit so as to prevent the self lock unit A30 being detached from the light unit A10. Accordingly, an outer surface of the front end A13 (or the rear end A14) of the light unit A10 is enclosed by the handle A50 to affix the light unit A10 at the handle A50. Therefore, the handle A50 is configured to protect the light unit A10 and the power supply unit A40. The handle A50 is coupled at the front end A13 (or the rear end A14) of the light unit A10 for docking the locking body A31 of the self lock unit A30 and for providing an impact buffer to the light unit A10 when the self lock unit A30 is moved back to the initial position.

Figure 38:
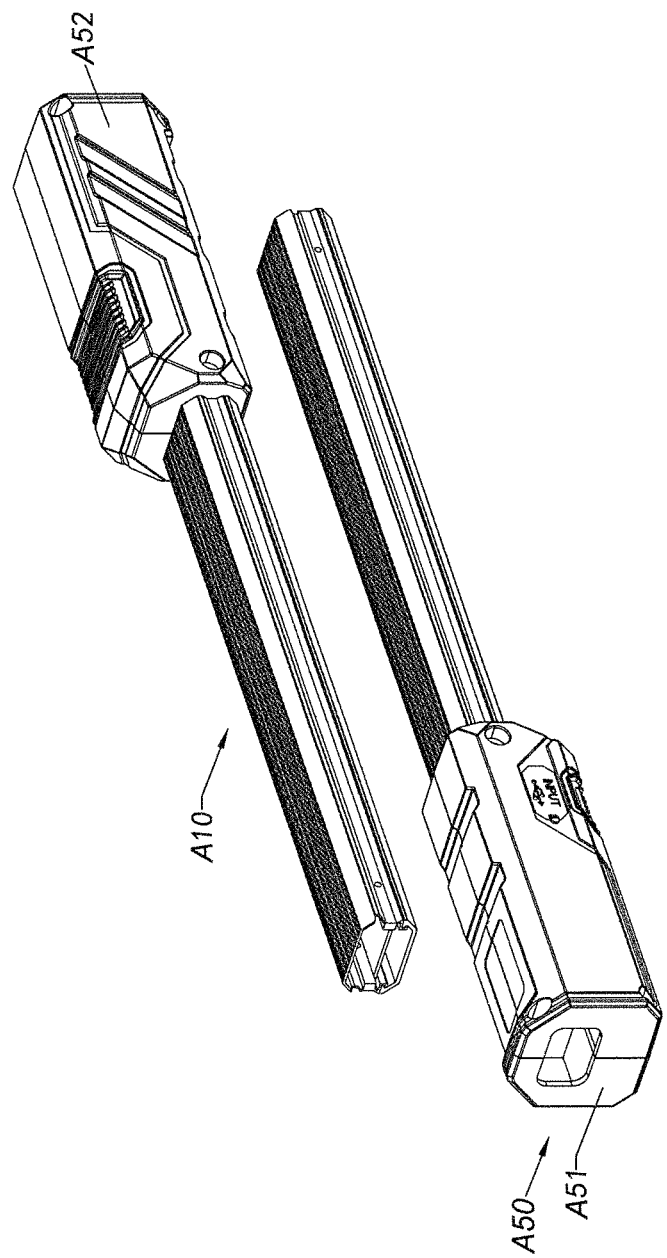
FIG. 38 is a perspective view of the work light according to the third preferred embodiment of the present invention, illustrating a handle coupled at the end of the light unit.
Figure 39:
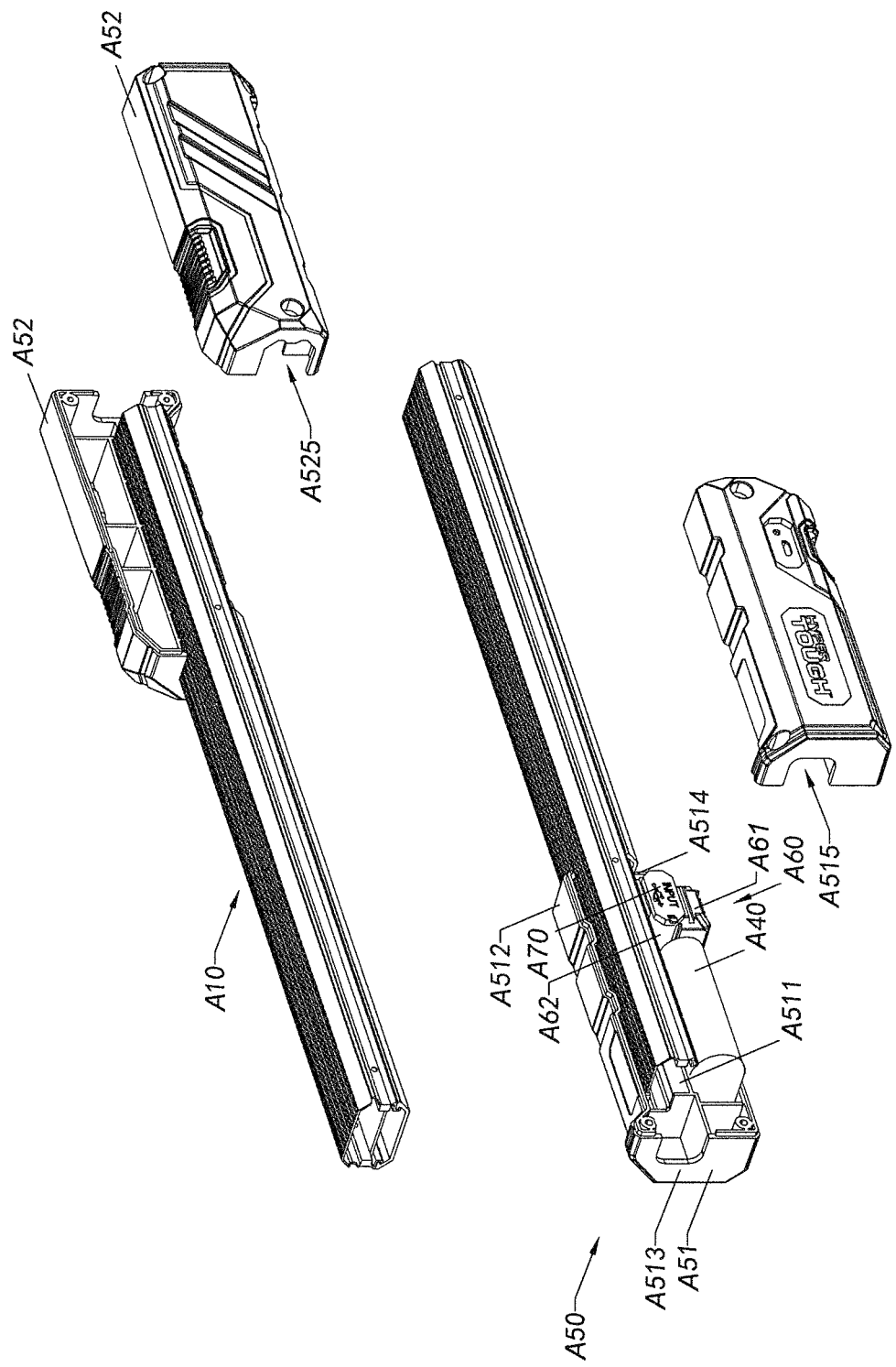
FIG. 39 is an exploded perspective view of the handle of the work light according to the third preferred embodiment of the present invention.

As shown in FIGS. 38 to 39, the handle A50 comprises two first handle members A51 coupled with each other and two second handle members A52 coupled with each other, wherein the power supply unit A40 is received in the first handle members A51. It is worth mentioning that, according to the preferred embodiment of the present invention, the first handle members A51 and the second handle members A52 of the handle A50 are coupled at two opposite ends of the work light. In other words, the first handle members A51 are coupled at the rear end A14 of the third light body A10c of the light unit while the second handle members A52 are coupled at the front end A13 of the first light body A10a of the light unit, wherein the orientation of the first handle members A51 is opposite to the orientation of the second handle members A52, such that when the work light is folded at the folded position, the first handle members A51 and the second handle members A52 are positioned opposite with each other.

As shown in FIG. 39, the first handle members A51 are coupled with each other to define a battery compartment A511, a light unit affixing portion A512, and a lock unit docking portion A513, wherein the power supply unit A40 is received in the battery compartment A511. The light unit affixing portion A512 is coupled to the front end A13 of the first light body A10a. The locking body A31 of the self lock unit A30 is retractably disposed in the lock unit docking portion A513. The handle A50 further comprises at least one cavity stopper A514 and at least one retractable cavity A515, wherein the cavity stopper A514 is disposed in the retractable cavity A515 to limit an aperture size of the retractable cavity A515, such that the aperture size of the retractable cavity A515 is smaller than the slider A322 so as to prevent the slider A322 of the retractable arm A32 being slid out of the retractable cavity A515 of the first handle members A51.

The work light further comprises at least one light control A60 electrically connected to the power supply unit A40 and the light unit A10, wherein the light control A60 is configured to control the operation of the light unit A10. The light control A60 comprises a control switch A61, a controller unit A62, and at least one indicating light A63, wherein the control switch A61, the controller unit A62, and the indicating light A63 are provided at the first handle members A51 of the handle A50.

Preferably, according to the preferred embodiment of the present invention, the power supply unit A40 of the work light is a rechargeable power source. Correspondingly, the work light further comprises at least one charging unit A70 electrically connected to the power supply unit A40, wherein the charging unit A70 is provided at the first handle members A51 of the handle A50 to charge the power supply unit A40.

As shown in FIG. 39, the second handle members A52 of the handle A50 are coupled at the front end A13 of the first light body A10a. The structure of the second handle members A52 is basically the same as the structure of the first handle members A51. The difference is that the orientation of the second handle members A52, i.e. the installation direction, is opposite to the orientation of the first handle members A51.

Figure 40:
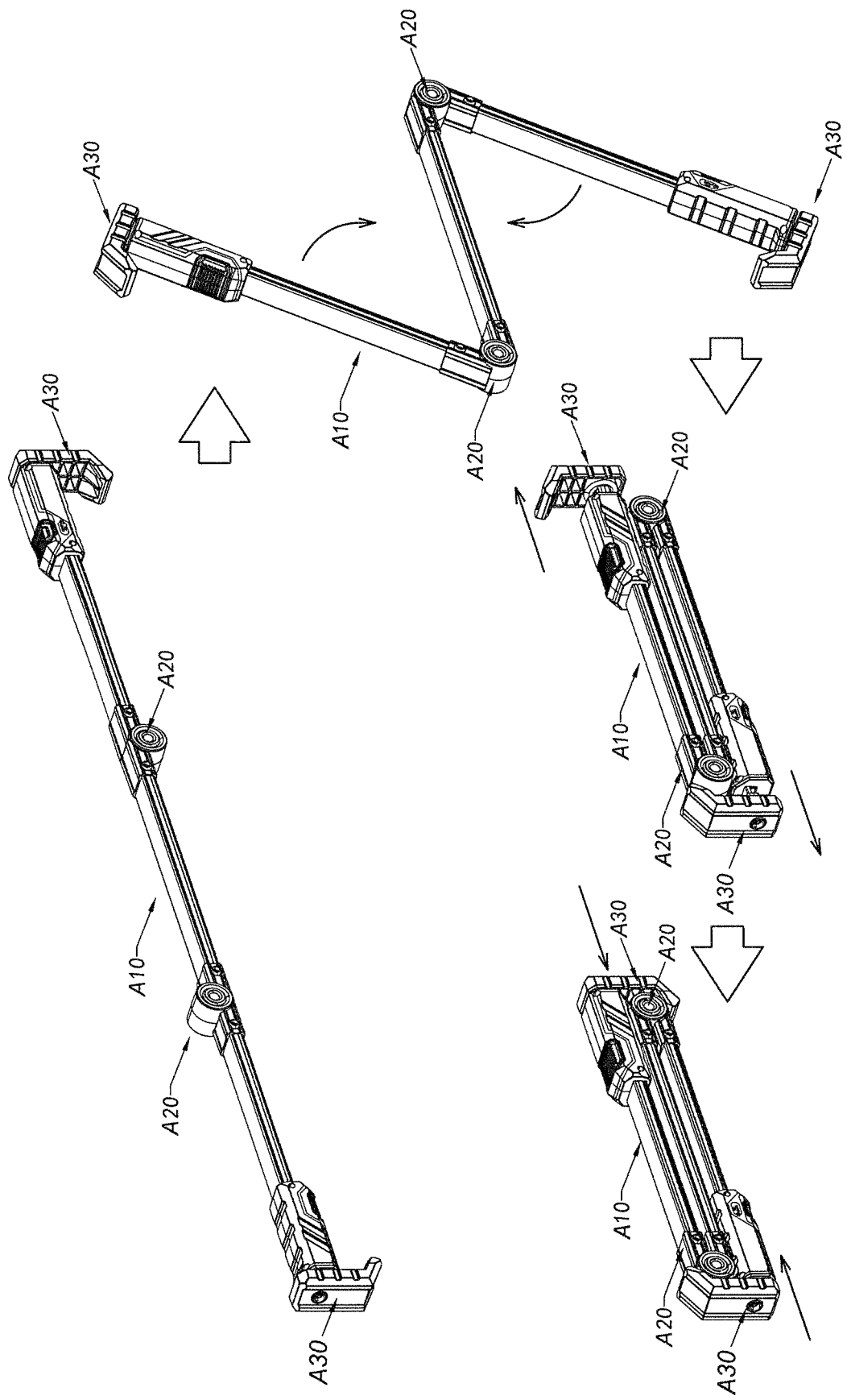
FIG. 40 illustrates a folding operation of the work light according to the third preferred embodiment of the present invention, illustrating the work light being moved from the unfolded position to the folded position.

FIG. 40 illustrates an operation of the work light moving from the unfolded position to the folded position. The folding operation of the work light comprises the following steps. Step 1: Unlock the first connector A20a and the second connector A20b of the connection unit A20, such that the first connector A20a and the second connector A20b are moved from the locked position to the unlocked position. Step 2: with respect to the second light body A10b of the light unit A10, rotate the first connector A20a and the second connector A20b at opposite directions to pivotally move the first light body A10a and the third light body A10c toward the second light body A10b, wherein the light-emitting surfaces 101 of the first light body A10a and the second light body A10b face toward each other while the backlight surfaces 102 of the first light body A10a and the second light body A10b face opposite with each other.

In the step 1 of the folding operation, the first connector A20a and the second connector A20b of the connection unit A20 are unlocked by the following steps. Drive the stopper member A23 to move to the second stopper A220 of the second rotatable member A22, such that the connection unit A20 is switched from the non-rotatable position to the rotatable position. Retain the stopper member A23 at the second stopper A220 of the second rotatable member A22 to retain the connection unit A20 at the rotatable position. The folding operation of the work light further comprises a step 3: Lock the first connector A20a and the second connector A20b of the connection unit A20, wherein the first connector A20a and the second connector A20b are moved from the unlocked position to the locked position, such that the work light is locked at the folded position.

Figure 41:
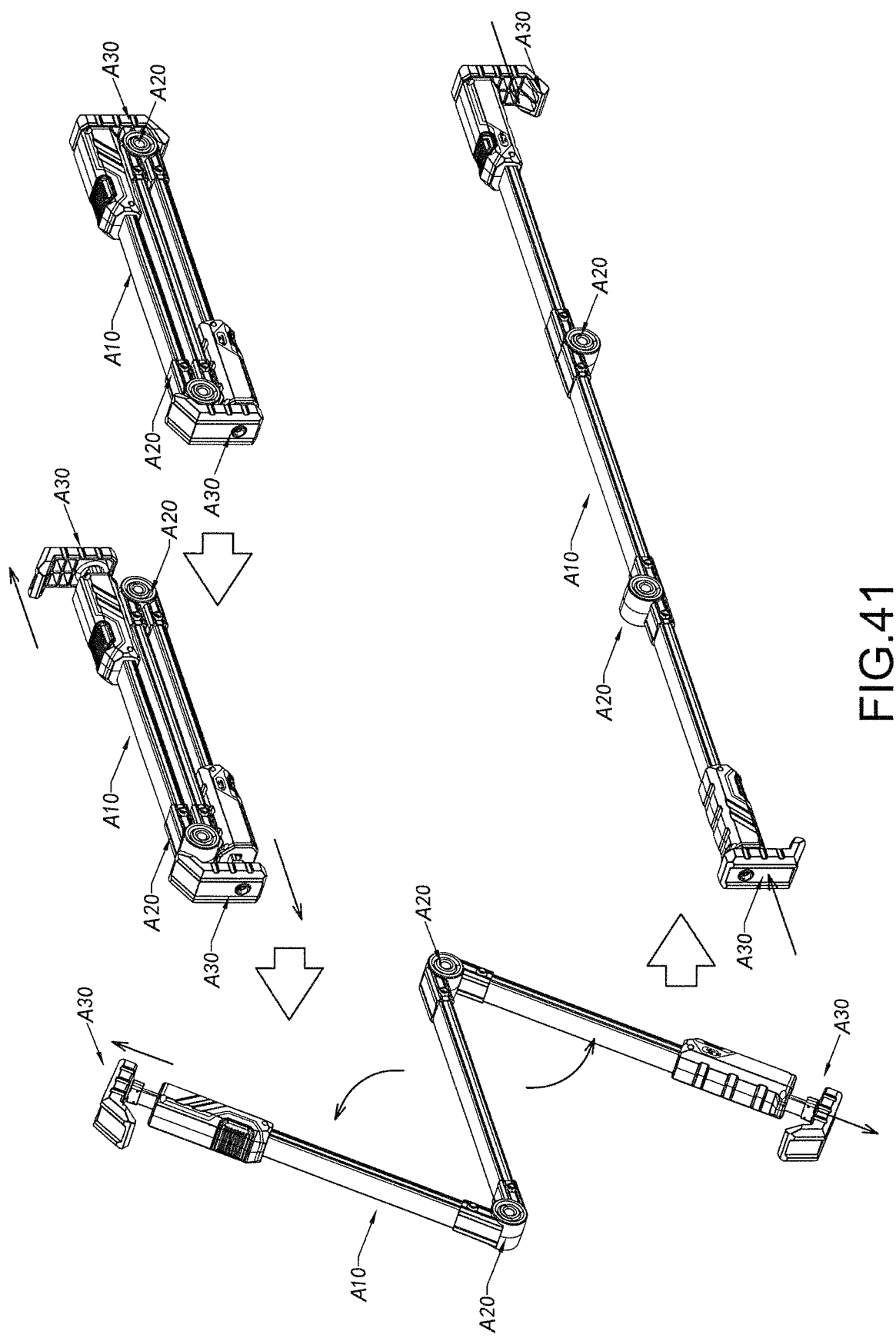
FIG. 41 illustrates a locking operation of the work light according to the third preferred embodiment of the present invention, illustrating the work light being moved from the unlocked position to the lock position.

FIG. 41 illustrates a self locking operation of the work light from the unlocked position to the locked position. The self locking method of the work light comprises the following steps. Step 1: Fold the work light at the folded position. Step 2: Rotate the self lock unit A30 to receive the connection unit A20 at the locking cavity A300 of the self lock unit A30, such that the connection unit A20 is locked up by the self lock unit A30. It is worth mentioning that the folding method of the work light is mentioned above as the folding operation thereof.

The step 2 of the self locking method of the work light further comprises the following steps. Pull the locking body A31 of the self lock unit A30 outwardly. Rotate the locking body A31 when it is pulled, such that the hooking opening A3130 of the locking body A31 is adjusted corresponding to the connection unit A20.

Figure 42:
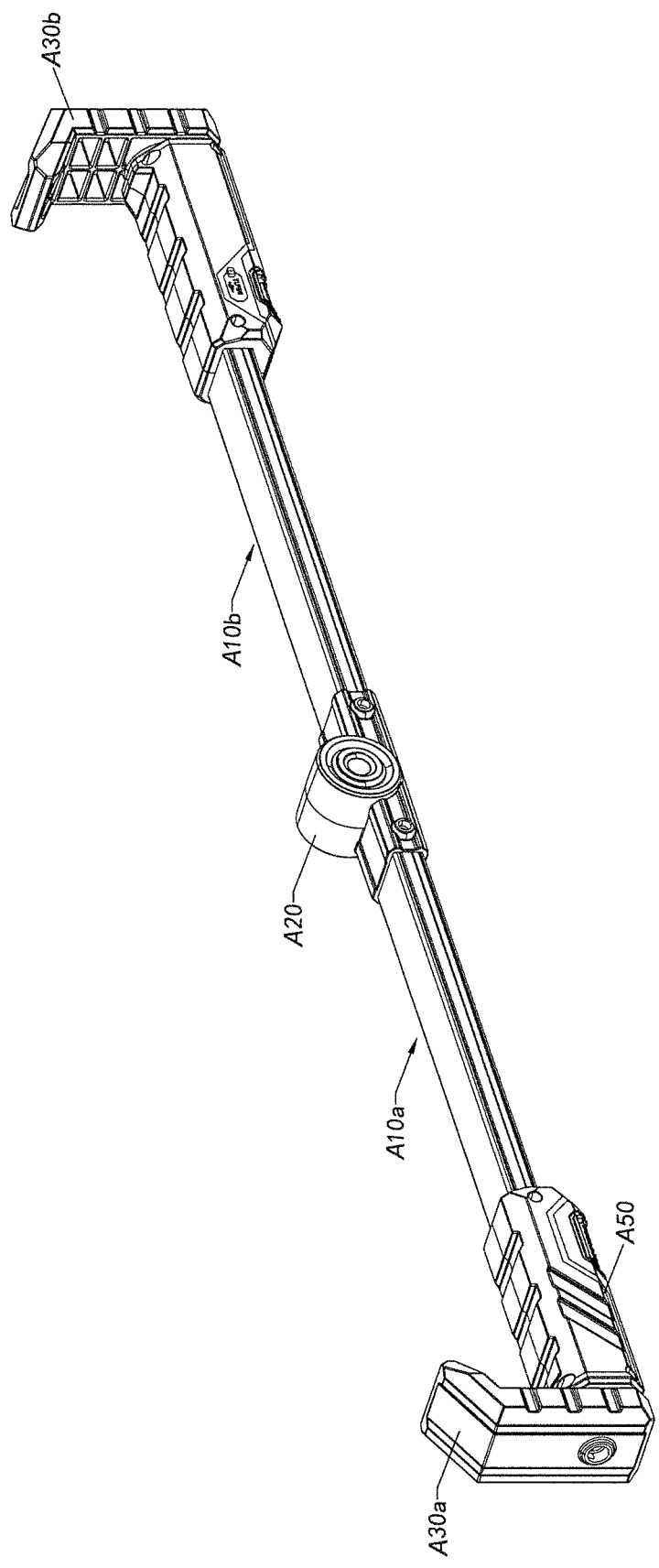
FIG. 42 is a perspective view of a work light according to a fourth preferred embodiment of the present invention, illustrating the work light at an unfolded position and an unlocked position.
Figure 43:
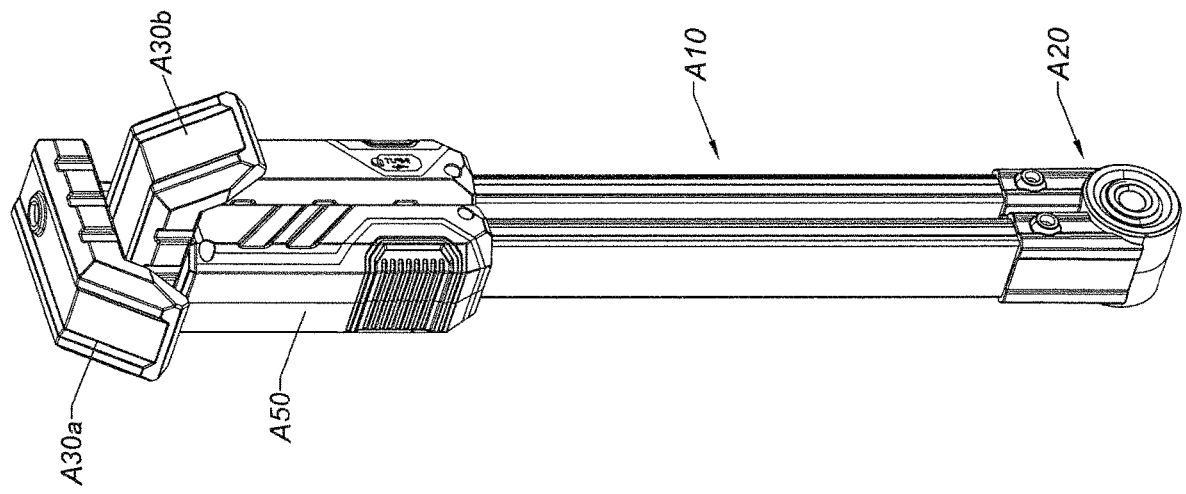
FIG. 43 is a perspective view of the work light according to the fourth preferred embodiment of the present invention, illustrating the work light at a folded position and a locked position.

As shown in FIGS. 42 and 43, a work light according to a fourth embodiment illustrates an alternative mode of the third embodiment of the present invention, wherein the difference between the third and fourth embodiments is that the work light of the fourth embodiment is constructed to have two light units A10, i.e. the first light body A10a and the second light body A10b, and one connection units A20 pivotally connecting between the first light body A10a and the second light body A10b. It is worth mentioning that the structural and functional configurations of the light unit A10, the connection unit A20, the self lock unit A30, the power supply unit A40, the handle A50, the light control A60 and the charging unit 70 of the fourth embodiment are identical to these of the third embodiment. Only difference between the third and fourth embodiments is the numbers of the light units A10 and the connection unit A20. The folding method and the self locking method of the work light of the fourth embodiment are the same as that of the third embodiment.

When the work light is moved from the unfolded position to the folded position, the light-emitting surfaces 101 of the first light body A10a and the second light body A10b face toward each other while the backlight surfaces A102 of the first light body A10a and the second light body A10b face opposite with each other. Accordingly, the connection unit A20 can be pivotally moved in a forward or reverse direction, such that the light units A10 can be folded to overlap with each other.

When the work light is in self-lock position and when the work light is in the folded position, the lock units A30 are engaged with each other. Particularly, the self lock unit A30 coupled at the first light body A10a is moved to hook at the other self lock unit A30. Alternatively, the lock unit coupled at the second light body A10b is moved to hook at the other self lock unit A30, so as to automatically lock up the work light.

Accordingly, the self lock unit A30 is constructed to have the first lock unit A30a coupled at one end of the first light body A10a at a position opposite to the connection unit A20, and the second lock unit A30b coupled at one end of the second light body A10b at a position opposite to the connection unit A20.

In one example, when the connection unit A20 is rotated to move the work light in the folded position, the first lock unit A30a is adjusted to its locked position A301 to receive the second lock unit A30b is received at the locking cavity A300 of the first lock unit A30a. In other words, the second lock unit A30b is hooked by the first lock unit A30a to self lock the work light at the folded position. It is appreciated that the rotation angle of the second lock unit A30b is adjustable to receive the first lock unit A30a at the locking cavity A300 of the second lock unit A30b, such that the first lock unit A30a and the second lock unit A30b are interlocked with each other to self lock the work light at the folded position.

Figure 44:
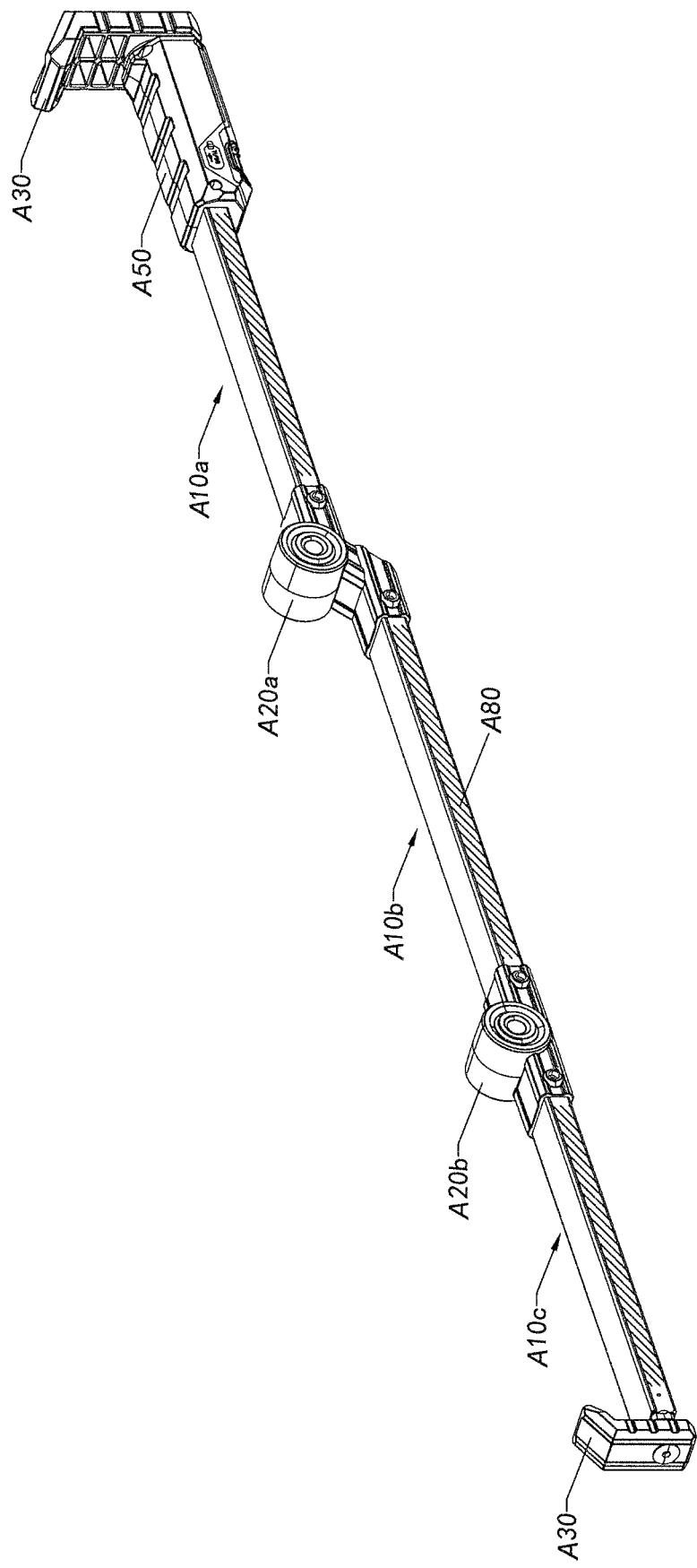
FIG. 44 is a perspective view of a work light according to a fifth preferred embodiment of the present invention, illustrating the work light at an unfolded position and an unlocked position.
Figure 45:
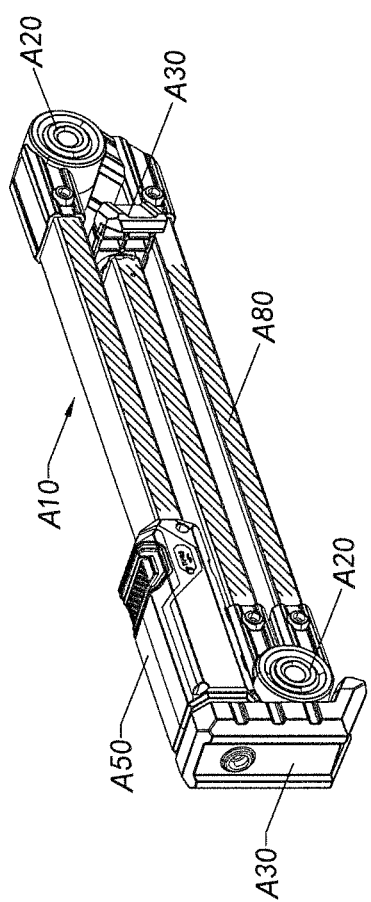
FIG. 45 is a perspective view of the work light according to the fifth preferred embodiment of the present invention, illustrating the work light at a folded position and a locked position.
Figure 46:
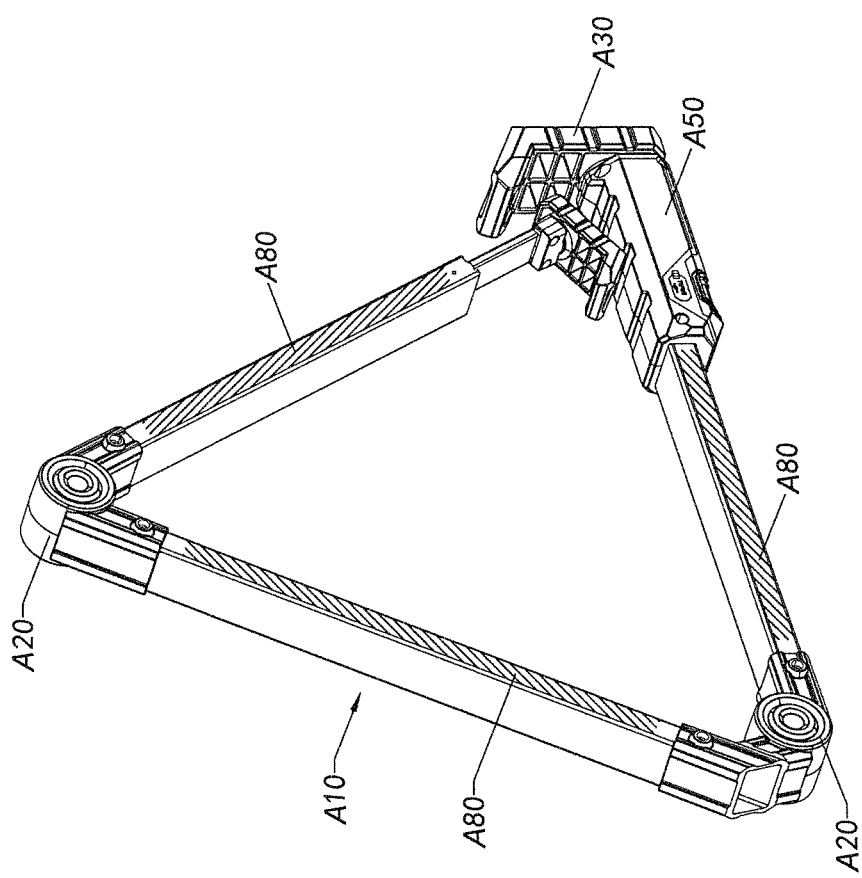
FIG. 46 is a perspective view of the work light according to the fifth preferred embodiment of the present invention, illustrating the work light being moved at a triangular configuration.

As shown in FIGS. 44 to 46, a work light according to a fifth embodiment illustrates an alternative mode of the third embodiment of the present invention, wherein the work light is constructed to have three light units A10, two connection units A20, two lock units A30, one power supply unit A40, two handles A50, one light control A60 and one charging unit A70. The structural and functional configurations of the light unit A10, the connection unit A20, the self lock unit A30, the power supply unit A40, the handle A50, the light control A60 and the charging unit A70 of the fifth embodiment are identical to these of the third embodiment. The difference between the fifth and third embodiments is the folding direction of the connection unit A20 of the work light, wherein the folding method of the fifth embodiment is different from the folding method of the third embodiment.

Accordingly, the connection unit A20 is pivotally connected the two light units A10 to enable the light units A10 being pivotally moved with each other, such that the work light is moved between the folded position and the unfolded position. The first light unit A10a and the second light unit A10c can pivotally folded above or under the second light unit A10b.

The difference of the preferred embodiment is that the rotation directions of the two connection units A20 are the same, wherein the work light has a tri-fold structure in the folded position. In other words, the first light body A10a is positioned between the second light body A10b and the third light body A10c. Alternatively, the third light body A10a can be folded at a position between the second light body A10b and the first light body A10a. The first connector A20a of the connection unit A20 is pivotally connected between the first light body A10a and the second light body A10b. The second connector A20b of the connection unit A20 is pivotally connected between the second light body A10b and the third light body A10c. By firstly pivoting the first connector A20a, the first light body A10a is pivotally folded above (or below) the second light body A10b. Then, by pivoting the second connector A20b, the third light body A10c is pivotally folded above (or below) the first light body A10a, so as to fold up the work light.

It is worth mentioning that according to the preferred embodiment of the present invention, the self locking method of the work light is different from that of the third embodiment, wherein the difference is that only one end of the self lock unit A30 is locked with the connection unit A20 to self lock up the work light.

As shown in FIG. 45, when the work light is moved at the folded position, the self lock unit A30 is rotated to its locked position A301, wherein the second connector A20b of the connection unit A20 is received in the locking cavity A300 of the self lock unit A30 and is locked by the self lock unit A30, so as to self lock up the work light.

It is worth mentioning that according to the preferred embodiment of the present invention, the work light can also be folded into a triangular support structure. Accordingly, by pivotally folding the first light body A10a and the third light body A10c from the second light body A10b via the first connector A20a and the second connector A20b of the connection unit A20, the first light body A10a, the second light body A10b and the third light body A10c form a triangular supporting structure. The two lock units A30 provided at the first light body A10a and the third light body A10c respectively are engaged with each other to lock up the work light in a triangular structure so as to ensure the work light in a stable triangular structure.

It is appreciated that when the work light is folded in a triangular structure, the work light can serve as a vehicle warning light apparatus. For example, when the vehicle is parked on the road, the work light can be placed and used as a warning light.

Correspondingly, the work lamp further comprises at least one warning unit 80 provided at one peripheral side of the light unit A10. Preferably, according to the preferred embodiment of the present invention, the warning unit A80 can be embodied, but not limited to, as reflective strips attached to the peripheral sides of the light unit A10, wherein the warning unit A80 is adapted to reflect the light from the light unit A10 to generate reflective warning signal.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A work light, comprising:
   a light unit which comprises a first light body and a second light body, wherein each of said first and second light bodies has an elongated configuration;
   a connection unit which comprises a first connector pivotally connecting to said first and second light bodies, wherein said first and second light bodies are pivotally connected with each other end-to-end via said first connector, such that said light unit is moved between a folded position that said first and second light bodies are pivotally folded to overlapped with each other and an unfolded position that said first and second light bodies are aligned end-to-end to form an elongated straight light configuration;
   a self lock unit which comprises a first lock unit rotatably coupled at a free end of said first light body to rotatably move between a locked position and an unlocked position, wherein at said locked position, said first lock unit is rotated to lock up said light unit at said folded position, and at said unlock position, said first lock unit is rotate to unlock said light unit so as to enable said light unit to move from said folded position to said unfolded position.

2. The work light, as recited in claim 1, wherein said light unit further comprises a third light body, wherein said connection unit further comprises a second connector pivotally connecting to said second and third light bodies so as to pivotally connect said second and third light bodies with each other end-to-end via said second connector, such that at said folded position, said third light body is pivotally folded to overlap with said second light body to form a tri-fold configuration, and at said unfolded position, said first, second and third light bodies are aligned end-to-end.

3. The work light, as recited in claim 2, wherein said self lock unit further comprises a second lock unit rotatably coupled at a free end of said third light body to rotatably move between a locked position and an unlocked position, wherein at said locked position, said first and second lock units are rotated to couple at said second and first connectors respectively to lock up said light unit at said folded position.

4. The work light, as recited in claim 3, wherein a structural configuration of said first lock unit is identical to a structural configuration of said second lock unit;
   wherein said first lock unit comprises a first retractable arm retractably extended from said first light body and a first locking body rotatably coupled at a free end of said first retractable arm, such that when said first retractable arm is retracted at said first light body, said first locking body is rotated to couple to said second connector to lock up said light unit;
   wherein said second lock unit comprises a second retractable arm retractably extended from said third light body and a second locking body rotatably coupled at a free end of said second retractable arm, such that when said second retractable arm is retracted at said third light body, said second locking body is rotated to couple to said first connector to lock up said light unit.

5. The work light, as recited in claim 4, wherein said first locking body comprises a retainer coupled at said first retractable arm, a rotating member rotatably coupled at said retainer, and a hooking member extended from said rotating member, wherein said first lock unit has a locking cavity formed at said hooking member, such that said hooking member not only is rotated to lock up said light unit when said second connector is received at said locking cavity but also is pulled from said first light body via said retractable arm to serve as a hook for hanging said light unit at an object.

6. The work light, as recited in claim 5, wherein said retainer further comprises a first retaining member and a second retaining member coupled at said free end of said retractable arm, wherein said rotating member has a rotating slot, wherein said retainer is disposed at said rotating slot of said rotating member, such that said retainer is adapted to be rotated relative to said rotating member.

7. The work light, as recited in claim 6, wherein said retainer further has a spring groove and comprises an elastic element and a limiting element, wherein said elastic element and said limiting element are engaged with said spring groove, wherein said rotating member further has a plurality of gear slots communicating with said spring groove, wherein said limiting element is pushed by said elastic element to engage with said gear slots, so as to limit a relative movement between said retainer and said rotating member by said limiting element to retain a relative rotation angle between said retainer and said rotating member.

8. The work light, as recited in claim 7, wherein said retractable arm comprises a retractable element retractably coupled at said first light body and a slider coupled at one end of said retractable element to restrict a displacement of the retractable element and to retain a retractable movement of the retractable element.

9. The work light, as recited in claim 8, wherein said first light body comprises an elongated light housing, at least one light source received in said light housing, and a partition wall coupled in said light housing to form a retractable chamber between said partition wall and said light housing, wherein said retractable element of said retractable arm is slidably coupled at said retractable chamber of said first light body.

10. The work light, as recited in claim 9, wherein said light housing further comprises a sliding rail inwardly protruded from an inner wall of said retractable chamber, wherein said slider of said retractable arm is slidably engaged with said sliding rail.

11. The work light, as recited in claim 10, wherein said first lock unit further comprises a traction unit retractably coupled at said retractable element and the light housing of the light unit, wherein the traction unit is adapted to be pulled to an extended position.

12. The work light, as recited in claim 3, wherein each of said first, second and third light bodies has a light emitting surface and a backlight surface opposite to said light emitting surface, wherein when said light unit is folded at said folded position, said light emitting surfaces of said first light body and said second light body face to each other, while said backlight surfaces of said second light body and said third light body face to each other.

13. The work light, as recited in claim 4, wherein said first connector comprises a first rotatable member, a second rotatable member rotatably coupled with said first rotatable member to form a stopper member cavity, and a stopper member movably disposed at said stopper member cavity.

14. The work light, as recited in claim 13, wherein said first rotatable member comprises a first stopper while said second rotatable member comprises a second stopper corresponding to and communicating with said first stopper, wherein said first stopper of said first rotatable member and said second stopper of said second rotatable member are coupled with each other to form said stopper member cavity, wherein when said stopper member is located between said first stopper of said first rotatable member and said second stopper of said second rotatable member, said first connector is in a non-rotatable position, wherein when said stopper member is moved to said second stopper of said second rotatable member, said stopper member is disengaged with said first stopper of said first rotatable member, such that said first rotatable member and said second rotatable member are adapted to be rotated with each other.

15. The work light, as recited in claim 14, wherein said stopper member comprises a stopper body and at least one tooth groove formed at an outer circumferential surface of said stopper body, wherein said first stopper of said first rotatable member has a plurality of fixed gear positions, wherein said tooth groove of the stopper member is engaged at one of said fixed gear positions of said first rotatable member.

16. The work light, as recited in claim 1, wherein said self lock unit further comprises a second lock unit rotatably coupled at a free end of said second light body to rotatably move between a locked position and an unlocked position, wherein at said locked position, said first and second lock units are rotated to couple with each other so as to lock up said light unit at said folded position.

17. The work light, as recited in claim 16, wherein a structural configuration of said first lock unit is identical to a structural configuration of said second lock unit;
wherein said first lock unit comprises a first retractable arm retractably extended from said first light body and a first locking body rotatably coupled at a free end of said first retractable arm, such that when said first retractable arm is retracted at said first light body, said first locking body is rotated to couple to said second lock unit to lock up said light unit;
wherein said second lock unit comprises a second retractable arm retractably extended from said second light body and a second locking body rotatably coupled at a free end of said second retractable arm, such that when said second retractable arm is retracted at said second light body, said second locking body is rotated to couple to said first lock unit to lock up said light unit.

18. The work light, as recited in claim 17, wherein said first locking body comprises a retainer coupled at said first retractable arm, a rotating member rotatably coupled at said retainer, and a hooking member extended from said rotating member, wherein said first lock unit has a locking cavity formed at said hooking member, such that said hooking member not only is rotated to lock up said light unit when said second lock unit is received at said locking cavity but also is pulled from said first light body via said retractable arm to serve as a hook for hanging said light unit at an object.

19. The work light, as recited in claim 17, wherein said first connector comprises a first rotatable member, a second rotatable member rotatably coupled with said first rotatable member to form a stopper member cavity, and a stopper member movably disposed at said stopper member cavity.

20. The work light, as recited in claim 17, wherein each of said first and second light bodies has a light emitting surface and a backlight surface opposite to said light emitting surface, wherein when said light unit is folded at said folded position, said light emitting surfaces of said first light body and said second light body face to each other.

21. The work light, as recited in claim 1, wherein said first and second light bodies are detachably coupled at said first connector, such that when said first and second light bodies are coupled with each other via said first connector, said first and second light bodies are electrically connected with each other.

22. The work light, as recited in claim 21, wherein said self lock unit comprises a plug head detachably inserted into said connection unit, a retention body, a holding unit, a resilient element, and two self locking elements, such that when said light unit is locked at said connection unit via said self locking elements, a corresponding end of the light unit is sleeved in said retention body to couple said plug head at said corresponding end of said light unit.

23. The work light, as recited in claim 22, wherein said self locking element has a front end, a rear end and a protruding end, wherein when said plug head is inserted into said connection unit, said light unit is coupled to said connection unit via said front end of said self locking element, wherein said rear end of said self locking element is coupled to said resilient member, wherein when said front ends of the self locking elements are pressed toward each other at the same time, said plug head is unlocked to be detached from said connection unit, so as to detachably couple said light unit with said connection unit.

24. The work light, as recited in claim 23, wherein said self locking element has a slanted sliding surface formed at said front end thereof for said self locking element being engaged and disengaged with said connection unit.

25. The work light, as recited in claim 1, further comprising a power supply unit coupled at one of said first and second light bodies to electrically connect said first and second light bodies, wherein said power supply unit comprises a battery, a control circuit, and a control switch, wherein said battery and said control circuit are received in said power supply unit while said control switch is coupled at an outer wall of said power supply unit, wherein said light unit is electrically connected to said battery, said control circuit, and said control switch so as to control an electrical connection of the light unit.

\* \* \* \* \*